(12) United States Patent
Das

(10) Patent No.: US 10,009,438 B2
(45) Date of Patent: Jun. 26, 2018

(54) TRANSACTION LOG ACCELERATION

(71) Applicant: SanDisk Technologies, Inc., Plano, TX (US)

(72) Inventor: Dhananjoy Das, Sunnyvale, CA (US)

(73) Assignee: SANDISK TECHNOLOGIES LLC, Plano, TX (US)

(\*) Notice: Subject to any disclaimer, the term of this patent is extended or adjusted under 35 U.S.C. 154(b) by 257 days.

(21) Appl. No.: 14/732,675

(22) Filed: Jun. 6, 2015

(65) Prior Publication Data

US 2016/0344834 A1 Nov. 24, 2016

Related U.S. Application Data

(60) Provisional application No. 62/164,364, filed on May 20, 2015.

(51) Int. Cl.
*G06F 15/167* (2006.01)
*H04L 29/08* (2006.01)

(52) U.S. Cl.
CPC ...... *H04L 67/2842* (2013.01); *H04L 67/1097* (2013.01)

(58) Field of Classification Search
USPC .................. 709/213, 212, 223, 224, 216
See application file for complete search history.

(56) References Cited

U.S. PATENT DOCUMENTS

| | | |
|---|---|---|
| 4,980,861 A | 12/1990 | Herdt et al. |
| 5,193,184 A | 3/1993 | Belsan et al. |
| 5,261,068 A | 11/1993 | Gaskins et al. |
| 5,325,509 A | 6/1994 | Lautzenheiser |
| 5,404,485 A | 4/1995 | Ban |
| 5,438,671 A | 8/1995 | Miles |
| 5,504,882 A | 4/1996 | Chai |
| 5,535,399 A | 7/1996 | Blitz et al. |
| 5,553,261 A | 9/1996 | Hasbun et al. |
| 5,594,883 A | 1/1997 | Pricer |
| 5,598,370 A | 1/1997 | Nijima et al. |
| 5,651,133 A | 7/1997 | Burkes |
| 5,682,497 A | 10/1997 | Robinson |
| 5,682,499 A | 10/1997 | Bakke et al. |
| 5,701,434 A | 12/1997 | Nakagawa |
| 5,754,563 A | 5/1998 | White |

(Continued)

FOREIGN PATENT DOCUMENTS

| | | |
|---|---|---|
| CN | 1771495 | 5/2006 |
| EP | 0747822 | 12/1996 |

(Continued)

*Primary Examiner* — Lan-Dai T Truong
(74) *Attorney, Agent, or Firm* — Kunzler, PC

(57) ABSTRACT

Apparatuses, systems, methods, and computer program products are disclosed for transaction log acceleration. A log module is configured to determine transaction log records indicating a sequence of operations performed on data. A commit module is configured to send transaction log records to one or more volatile memory pages accessible over a network. Volatile memory pages are configured to ensure persistence of transaction log records. A storage module is configured to send transaction log records to a non-volatile storage device in response to an acknowledgment that one or more volatile memory pages store the transaction log records.

20 Claims, 8 Drawing Sheets

(56) References Cited

U.S. PATENT DOCUMENTS

| | | |
|---|---|---|
| 5,799,140 A | 8/1998 | Niijima et al. |
| 5,799,200 A | 8/1998 | Brant et al. |
| 5,802,602 A | 9/1998 | Rahman et al. |
| 5,812,457 A | 9/1998 | Arase |
| 5,845,329 A | 12/1998 | Onishi et al. |
| 5,960,462 A | 9/1999 | Solomon et al. |
| 6,000,019 A | 12/1999 | Dykstal et al. |
| 6,014,724 A | 1/2000 | Jennett |
| 6,125,072 A | 9/2000 | Wu |
| 6,170,039 B1 | 1/2001 | Kishida |
| 6,170,047 B1 | 1/2001 | Dye |
| 6,173,381 B1 | 1/2001 | Dye |
| 6,205,521 B1 | 3/2001 | Schumann |
| 6,236,593 B1 | 5/2001 | Hong et al. |
| 6,240,040 B1 | 5/2001 | Akaogi et al. |
| 6,256,642 B1 | 7/2001 | Krueger et al. |
| 6,278,633 B1 | 8/2001 | Wong et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,515,928 B2 | 2/2003 | Sato et al. |
| 6,523,102 B1 | 2/2003 | Dye et al. |
| 6,552,955 B1 | 4/2003 | Miki |
| 6,564,285 B1 | 5/2003 | Mills |
| 6,587,915 B1 | 7/2003 | Kim |
| 6,601,211 B1 | 7/2003 | Norman |
| 6,608,793 B2 | 8/2003 | Park et al. |
| 6,625,685 B1 | 9/2003 | Cho et al. |
| 7,484,127 B2 | 1/2009 | Babu |
| 7,962,562 B1 | 6/2011 | Budhia et al. |
| 8,589,361 B2 | 11/2013 | Hu et al. |
| 8,775,718 B2 | 7/2014 | Kanevsky et al. |
| 9,148,506 B2 * | 9/2015 | Nuestro ............. H04M 3/5191 |
| 2002/0066047 A1 | 5/2002 | Olarig et al. |
| 2002/0069318 A1 | 6/2002 | Chow et al. |
| 2002/0103819 A1 | 8/2002 | Duvillier |
| 2002/0133743 A1 | 9/2002 | Oldfield et al. |
| 2002/0181134 A1 | 12/2002 | Bunker et al. |
| 2003/0028704 A1 | 2/2003 | Mukaida et al. |
| 2003/0061296 A1 | 3/2003 | Craddock et al. |
| 2003/0120669 A1 | 6/2003 | Han et al. |
| 2003/0126475 A1 | 7/2003 | Bodas |
| 2003/0145230 A1 | 7/2003 | Chiu et al. |
| 2003/0198084 A1 | 10/2003 | Fujisawa et al. |
| 2004/0003002 A1 | 1/2004 | Adelmann |
| 2004/0148360 A1 | 7/2004 | Mehra et al. |
| 2004/0186946 A1 | 9/2004 | Lee |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0141313 A1 | 6/2005 | Gorobets |
| 2005/0144361 A1 | 6/2005 | Gonzales et al. |
| 2005/0172099 A1 | 8/2005 | Lowe |
| 2005/0193166 A1 | 9/2005 | Johnson et al. |
| 2005/0240713 A1 | 10/2005 | Wu |
| 2005/0246510 A1 | 11/2005 | Retnamma et al. |
| 2005/0257017 A1 | 11/2005 | Yagi |
| 2005/0262150 A1 | 11/2005 | Krishnaswamy |
| 2005/0270927 A1 | 12/2005 | Hayashi |
| 2005/0273476 A1 | 12/2005 | Wertheimer |
| 2006/0004955 A1 | 1/2006 | Ware et al. |
| 2006/0075057 A1 | 4/2006 | Gildea et al. |
| 2006/0106990 A1 | 5/2006 | Benhase et al. |
| 2006/0149893 A1 | 7/2006 | Barfuss et al. |
| 2006/0149916 A1 | 7/2006 | Nase |
| 2006/0179263 A1 | 8/2006 | Song et al. |
| 2006/0184722 A1 | 8/2006 | Sinclair |
| 2006/0184736 A1 | 8/2006 | Benhase et al. |
| 2006/0190552 A1 | 8/2006 | Henze et al. |
| 2006/0230295 A1 | 10/2006 | Schumacher et al. |
| 2006/0248387 A1 | 11/2006 | Nicholson et al. |
| 2006/0265624 A1 | 11/2006 | Moshayedi |
| 2006/0265636 A1 | 11/2006 | Hummler |
| 2007/0016699 A1 | 1/2007 | Minami |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Nakamura |
| 2007/0088666 A1 | 4/2007 | Saito |
| 2007/0118713 A1 | 5/2007 | Guterman |
| 2007/0143566 A1 | 6/2007 | Gorobets |
| 2008/0162920 A1 * | 7/2008 | Wilson ................. G06F 9/4401 713/2 |
| 2010/0023597 A1 | 1/2010 | Lu |
| 2010/0205335 A1 | 8/2010 | Phan et al. |
| 2012/0142425 A1 * | 6/2012 | Scott ...................... A63F 13/12 463/42 |
| 2013/0097369 A1 | 4/2013 | Talagala et al. |
| 2013/0198312 A1 | 8/2013 | Tamir et al. |
| 2013/0212321 A1 | 8/2013 | Talagala et al. |
| 2014/0025877 A1 | 1/2014 | Talagala et al. |
| 2014/0059020 A1 | 2/2014 | Hu et al. |
| 2014/0195480 A1 | 7/2014 | Talagala et al. |
| 2014/0195564 A1 | 7/2014 | Talagala et al. |
| 2014/0337457 A1 | 11/2014 | Nowoczynski et al. |
| 2015/0039712 A1 | 2/2015 | Frank et al. |
| 2016/0078433 A1 * | 3/2016 | Vandervort ........ G06Q 20/3827 713/176 |
| 2016/0283584 A1 * | 9/2016 | Dubost ............. G06F 17/30306 |

FOREIGN PATENT DOCUMENTS

| | | |
|---|---|---|
| GB | 0123416 | 9/2001 |
| KR | 20000026300 | 5/2000 |
| WO | 2004099989 | 11/2004 |
| WO | 2005103878 | 11/2005 |
| WO | 2006065626 | 6/2006 |
| WO | 2008130799 | 3/2008 |
| WO | 2010053756 | 5/2010 |
| WO | 2011106394 | 9/2011 |

* cited by examiner

TRANSACTION LOG ACCELERATION

CROSS-REFERENCES TO RELATED APPLICATIONS

This application claims the benefit of U.S. Provisional Patent Application No. 62/164,364 entitled "TRANSACTION LOG ACCELERATION" and filed on May 20, 2015, for Dhananjoy Das, which is incorporated herein by reference.

TECHNICAL FIELD

This disclosure relates to transaction logs and more particularly to accelerating storage of transaction log entries using network attached hardware.

BACKGROUND

Transaction logs and other data structures are often used by applications, such as database systems, to organize and track data as the applications execute. Once an application sends an entry of a transaction log or other data structure to be stored, the application may wait for an acknowledgment before executing or processing the next transaction or event. Therefore, the speed with which an entry of a transaction log or other data structure is stored may directly affect the performance of the associated application, such as a database system or the like.

Additionally, if power is interrupted or another error is encountered while an entry of a transaction log or other data structure is being stored (e.g., while an entry is "in flight"), the entry and associated data may be lost. If an entry and associated data is lost, due to a power failure, an improper shutdown, or other error, the execution state of an associated application may also be lost, with one or more recent changes, transactions, or the like.

SUMMARY

Apparatuses for transaction log acceleration are presented. In one embodiment, a non-volatile storage device comprises a non-volatile storage medium and is in communication with a storage client over a network. A volatile memory buffer of a non-volatile storage device, in certain embodiments, is configured to receive transaction log entries of a storage client over a network. A volatile memory buffer, in a further embodiment, is configured to store transaction log entries in a non-volatile storage medium in response to a trigger. A volatile memory buffer, in one embodiment, is configured to retrieve one or more transaction log entries from a non-volatile storage medium in response to receiving an identifier from a storage client after a trigger. One or more retrieved transaction log entries, in certain embodiments, are sent from a storage client to a second non-volatile storage device over a network.

Other apparatuses for transaction log acceleration are presented. In one embodiment, a log module is configured to determine database log records indicating a sequence of operations performed on data of a database system. A commit module, in certain embodiments, is configured to send database log records to one or more volatile memory pages accessible over a network. Volatile memory pages, in one embodiment, are configured to ensure persistence of database log records. A storage module, in a further embodiment, is configured to send database log records to a non-volatile storage device in response to an acknowledgment that one or more volatile memory pages store the database log records.

Additional apparatuses for transaction log acceleration are presented. In one embodiment, an apparatus includes means for storing journal transactions in volatile memory of a storage device. An apparatus, in a further embodiment, includes means for storing journal transactions in a second storage device in response to confirming storage of the journal transactions in volatile memory of a storage device. A second storage device, in certain embodiments, has a higher latency than volatile memory of a storage device.

BRIEF DESCRIPTION OF THE DRAWINGS

In order that the advantages of this disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1:
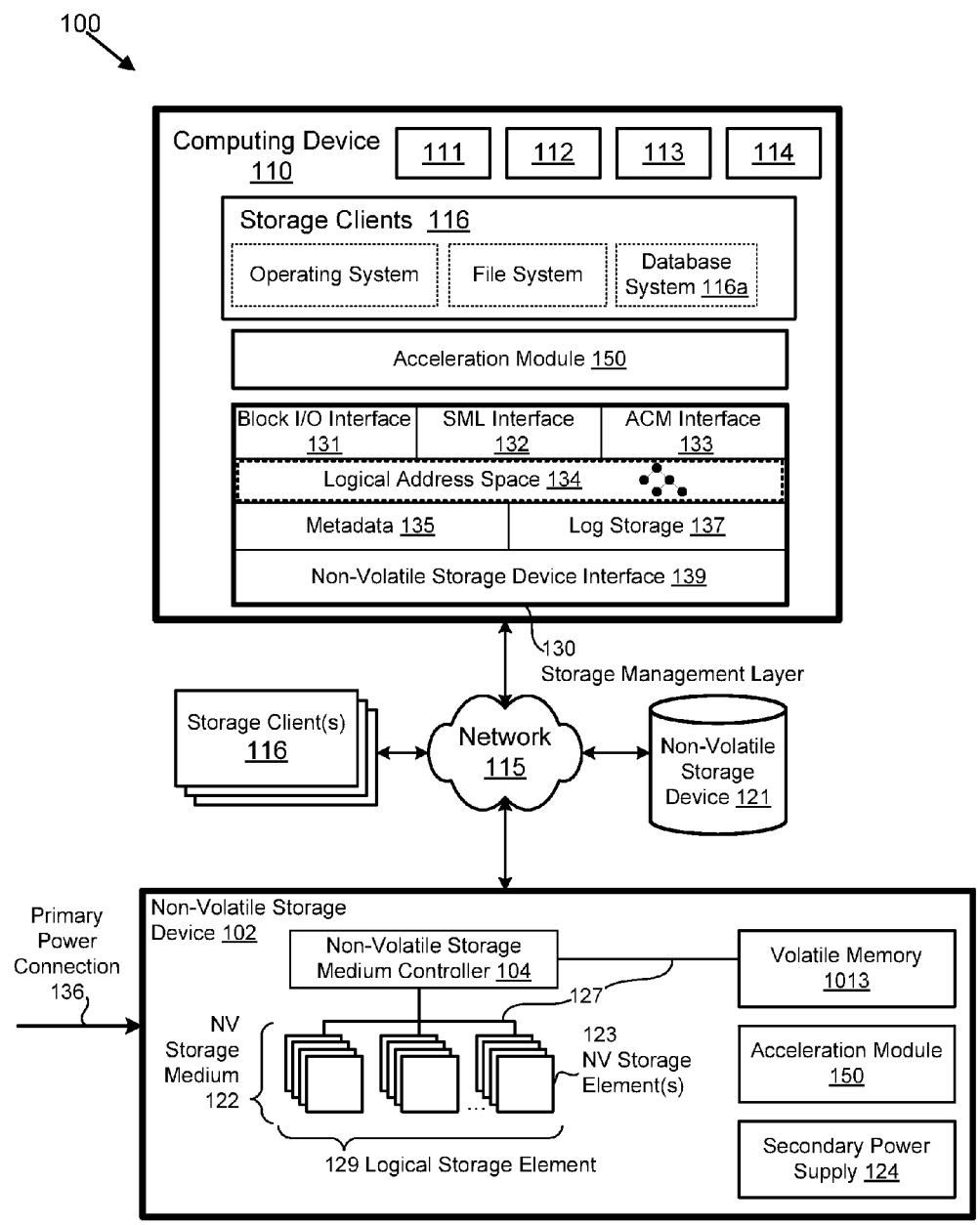
FIG. 1 is a schematic block diagram illustrating one embodiment of a system for transaction log acceleration.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 depicts one embodiment of a system 100 for transaction log acceleration. The system 100, in the depicted embodiment, comprises one or more acceleration modules 150. At least a portion of an acceleration module 150 may be part of and/or in communication with one or more of a non-volatile memory controller (e.g., a non-volatile memory media controller 104, a device driver or storage management layer (SML) 130), or the like. The acceleration module 150 may operate on a non-volatile memory system of a computing device 110, which may comprise a processor 111, volatile memory 112, a communication interface 113, or the like. The processor 111 may comprise one or more central processing units, one or more general-purpose processors, one or more application-specific processors, one or more virtual processors (e.g., the computing device 110 may be a virtual machine operating within a host), one or more embedded processors or microprocessors, one or more processor cores, or the like. The one or more communication interfaces 113 may comprise one or more network interfaces configured to communicatively couple the computing device 110 and/or the non-volatile memory controller 104, 130 to a communication network 115. The communications network 115, as used herein, comprises one or more logical or physical channels for transmitting and/or receiving data. The communications network 115 may comprise an Internet Protocol network, a Storage Area Network, a storage fabric, a local area network (LAN), a wide area network (WAN), a wired network, a wireless network, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, the acceleration module 150 may be embodied, at least in part, as one or more computer readable instructions stored on the non-transitory storage medium 114. As described in greater detail below, in certain embodiments, the computing device 110 comprises little or no non-volatile storage, using one or more non-volatile storage devices 102, 121 over the communication network 115 for non-volatile storage.

The non-volatile memory system 100, in the depicted embodiment, includes one or more acceleration modules 150. The acceleration module 150, in one embodiment, is configured to manage storage of transaction log entries for one or more storage clients 116 (e.g., a database system storage client 116a). The acceleration module 150, in certain embodiments, stores one or more transaction log entries in a volatile memory 1013 of a non-volatile storage device 102 over a network 115. The volatile memory 1013 of the non-volatile storage device 102 may be configured to automatically preserve the data it stores in a non-volatile storage medium 122 of the non-volatile storage device 102 in response to a trigger, such as a power failure, an improper shutdown, a power level failing to satisfy a threshold, or the like, thereby ensuring that the data is preserved and non-volatile, even though the volatile memory 1013 is volatile (e.g., with associated logic, such as the ACM 1011 described below). The volatile memory 1013 of the non-volatile storage device 102 may have a lower latency than the second non-volatile storage device 121, than the local computer readable storage medium 114 (e.g., a local non-volatile storage device) of the host computing device 110, or the like, even over the network 115. For example, in certain embodiments, the host computing device 110 and/or the storage client 116 may use a high performance interconnect and/or protocol such as direct memory access (DMA), $3^{rd}$ party DMA, remote DMA (RDMA), Infiniband, Fibre Channel, or the like over the network 115, to minimize latency.

A storage client 116, as used herein, may comprise software (e.g., computer executable code stored in a computer readable storage medium) and/or logic hardware configured to send, receive, or otherwise use data from a non-volatile storage device 102, 121. A storage client 116 may include a local storage client 116 operating on the computing device 110, a remote storage clients 116 accessible over the network 115 and/or network interface 113, or the like. The one or more storage clients 116 may include one or more operating systems, file systems, database systems 116a, server applications, kernel-level processes, user-level processes, applications, computing devices 110, or the like.

A database system 116a, as used herein, may comprise software (e.g., computer executable code stored in a computer readable storage medium) and/or logic hardware configured to store and/or provide organized access to data. A database system 116a may allow other clients 116 or users 116 to define, create, query, update, and/or administer databases, tables, or other collections of data, using a query language, a graphical user interface (GUI), a command line interface (CLI), or the like. A database system 116a may organize data according to one or more models, such as a relational model, a hierarchical model, an object model, a document model, an entity-relationship model, an entity-attribute-value model, and/or another model. As described above, a database system 116a may record certain transactions in a database log or other transaction log data structure. Recording transactions in transaction log may allow a storage client 116 such as a database client 116a to undo and/or redo one or more transactions, to recreate data (e.g., one or more volatile data structures lost due to a restart event of other trigger), as a backup or redundant copy of data, to replay and apply transactions on a copy of data in another location, or the like.

Once a storage client 116 sends an entry of a transaction log or other data structure to be stored, the storage client 116 may wait for an acknowledgment before executing or processing the next transaction or event. The speed (e.g., latency) with which an entry of a transaction log or other data structure is stored may directly affect the performance of the associated storage client 116, such as a database system 116a, or the like.

The volatile memory 1013, as used herein, may comprise a memory medium and/or storage medium that uses electrical power (e.g., from the primary power connection 136, from the secondary power supply 124, or the like) to maintain stored data. A volatile memory 1013 may include random access memory (RAM) such as dynamic RAM (DRAM), static RAM (SRAM), embedded block memory (BRAM), or the like. The volatile memory 1013 may comprise, and/or be segmented, divided, or allocated as one or more pages, buffers, elements, modules, or devices. In response to the volatile memory 1013 storing data, such as a transaction log entry, from a storage client 116, the acceleration module 150 may store the data in the second non-volatile storage device 121 (e.g., an intended destination for the data). By first storing data, such as database log entries or other transaction log entries, in the volatile memory 1013, which may have a lower latency, in certain embodiments, the acceleration module 150 may accelerate operation of the associated storage client 116 without sacrificing data integrity, allowing the storage client 116 to continue with the next transaction or entry before the previous transaction or entry is stored in the second non-volatile storage device 121, which may have a higher latency than the volatile memory 1013.

By separating the non-volatile storage device 102, with included volatile memory 1013, from the host computing device 110 and placing the non-volatile storage device 102 on the communications network 115, in one embodiment, storage clients 116 from multiple locations (e.g., multiple computing devices 110) on the communications network 115, may store data such as transaction log entries in the non-volatile storage device 102. In this manner, in certain embodiments, multiple storage clients 116 and/or computing devices 110 may take advantage of the low latency and/or ensured persistence of the volatile memory 1013. One or more host computing devices 110 storing data in the non-volatile storage device 102, may have little or no local non-volatile storage (e.g., may be "diskless"). Storing data such as transaction log entries (e.g., database log entries) in one or more non-volatile storage devices 102, 121, instead of or in addition to storing the data in local storage of the host computing device 110 executing the associated storage client 116 (e.g., database system 116a), in one embodiment, may facilitate faster recovery if the host computing device 110 or a component thereof fails, as the data may be immediately or quickly available to another host computing device 110 over the network 115.

In one embodiment, the acceleration module 150 may comprise executable software code, such as a device driver, SML 130, or the like, stored on the computer readable storage medium 114 for execution on the processor 111. In another embodiment the acceleration module 150 may comprise logic hardware of one or more non-volatile storage devices 102, such as a non-volatile storage medium controller 104, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the acceleration module 150 may include a combination of both executable software code and logic hardware (e.g., a controller comprising a device driver such as an SML 130 executing on a host computing device 110 and a hardware controller 104 disposed on the non-volatile storage device 102).

In one embodiment, the acceleration module 150 is configured to provide storage requests to the SML 130, to receive storage requests from the SML 130 via the network 115, or the like. The acceleration module 150 may be further configured to transfer data to/from the SML 130 and/or storage clients 116 via the network 115. Accordingly, the acceleration module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the acceleration module 150 may receive storage requests as an API call from a storage client 116, as an IO-CTL command, or the like. The acceleration module 150 is described in greater detail below with regard to FIGS. 5A and 5B.

According to various embodiments, a non-volatile storage controller (e.g., a device driver or SML 130 and/or a non-volatile storage medium controller 104) comprising the acceleration module 150 may manage one or more non-volatile storage devices 102. The non-volatile storage device(s) 102 may comprise recording, memory, and/or storage devices, such as solid-state storage device(s), that are arranged and/or partitioned into a plurality of addressable media storage locations. As used herein, a media storage location refers to any physical unit of memory or storage (e.g., any quantity of physical storage medium on a non-volatile storage device 102). Memory units and/or storage units may include, but are not limited to: pages, memory divisions, erase blocks, sectors, blocks, collections or sets of physical storage locations (e.g., logical pages, logical erase blocks, described below), or the like.

The non-volatile storage controller may comprise an SML 130, which may present a logical address space 134 to one or more storage clients 116. One example of an SML is the Virtual Storage Layer® of SanDisk Corporation of Milpitas, Calif. Alternatively, each non-volatile storage device 102 may comprise a non-volatile storage medium controller 104, which may present a logical address space 134 to the storage clients 116. As used herein, a logical address space 134 refers to a logical representation of memory resources, storage resources, or the like. The logical address space 134 may comprise a plurality (e.g., range) of logical identifiers, logical addresses, or the like. As used herein, a logical identifier or logical address refers to a unique representation for referencing a data structure, a memory resource, and/or a storage resource (e.g., data, a transaction log), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML 130 may maintain metadata 135, such as a forward index or other logical-to-physical address mapping structure, to map logical addresses of the logical address space 134 to media storage locations on the non-volatile storage device(s) 102. The SML 130 may provide for arbitrary, any-to-any mappings from logical addresses to physical storage resources. An "any-to any" mapping may map any logical address to any physical storage resource. Accordingly, there may be no pre-defined and/or pre-set mappings between logical addresses and particular, media storage locations and/or media addresses. A media address may refer to an address of a storage resource that uniquely identifies one storage resource from another to a controller that manages a plurality of storage resources. By way of example, a media address may include, but is not limited to: the address of a media storage location, a physical storage unit, a collection of physical storage units (e.g., a logical storage unit), a portion of a storage unit (e.g., a logical storage unit address and offset, range, and/or extent), or the like. Accordingly, the SML 130 may map logical addresses to physical data resources of any size and/or granularity, which may or may not correspond to the underlying data partitioning scheme of the non-volatile storage device(s) 102. For example, in some embodiments, the non-volatile storage controller 104, 130 is configured to store data within logical storage units that are formed by logically combining a plurality of physical storage units, which may allow the non-volatile storage controller 104, 130 to support many different virtual storage unit sizes and/or granularities.

A logical storage element may refer to a set of two or more non-volatile storage elements that are or are capable of being managed in parallel (e.g., via an I/O and/or control bus). A logical storage element may comprise a plurality of logical storage units, such as logical pages, logical storage divisions (e.g., logical erase blocks), and so on. A logical storage unit may refer to a logical construct combining two or more physical storage units, each physical storage unit on a respective non-volatile storage element in the respective logical storage element (e.g., each non-volatile storage element being accessible in parallel). A logical storage division may refer to a set of two or more physical storage divisions, each physical storage division on a respective non-volatile storage element in the respective logical storage element.

The logical address space 134 presented by the SML 130 may have a logical capacity, which may correspond to the number of available logical addresses in the logical address space 134 and the size and/or granularity of the data referenced by the logical addresses. For example, the logical capacity of a logical address space 134 comprising $2^{32}$ unique logical addresses, each referencing 2048 bytes (2 KiB) of data may be $2^{43}$ bytes. A kibibyte (KiB) may refer to 1024 bytes. In some embodiments, the logical address space 134 may be thinly provisioned. A "thinly provisioned" logical address space 134 may refer to a logical address space 134 having a logical capacity that exceeds the physical capacity of the underlying non-volatile storage device(s) 102. For example, the SML 130 may present a 64-bit logical address space 134 to the storage clients 116 (e.g., a logical address space 134 referenced by 64-bit logical addresses), which may exceed the physical capacity of the underlying non-volatile storage devices 102. The large logical address space 134 may allow storage clients 116 to allocate and/or reference contiguous ranges of logical addresses, while reducing the chance of naming conflicts. The SML 130 may leverage the any-to-any mappings between logical addresses and physical storage resources to manage the logical address space 134 independently of the underlying physical storage devices 102. For example, the SML 130 may add and/or remove physical storage resources seamlessly, as needed, and without changing the logical addresses used by the storage clients 116.

In some embodiments, the non-volatile storage controller 104, 130 may be configured to store data on one or more asymmetric, write-once medium 122, such as NAND flash or other solid-state storage media. As used herein, a "write once" storage medium refers to a storage medium that is reinitialized (e.g., erased) each time new data is written or programmed thereon. As used herein, an "asymmetric" storage medium refers to a storage medium 122 having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media).

The storage medium 122 may be partitioned into storage divisions that can be erased as a group (e.g., erase blocks) in order to, inter alia, account for the asymmetric properties of the medium 122 or the like. As such, modifying a single data segment in-place may require erasing the entire erase block comprising the data, and rewriting the modified data to the erase block, along with the original, unchanged data. This may result in inefficient "write amplification," which may excessively wear the medium 122. Therefore, in some embodiments, the non-volatile storage controller 104, 130 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation).

The non-volatile storage controller 104, 130 may comprise one or more processes that operate outside of the regular path for servicing of storage operations (e.g., the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client 116, identifying the logical addresses of the request, performing one or more storage operations on non-volatile storage medium 122, and returning a result, such as acknowledgement or data. Processes that occur outside of the path for servicing storage requests may include, but are not limited to: a groomer (e.g., garbage collection or other storage capacity recovery), de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile storage controller 104, 130 comprises a groomer, which is configured to reclaim storage divisions (e.g., logical or physical erase blocks) for reuse, using a garbage collection or other storage capacity recovery process. The write out-of-place paradigm implemented by the non-volatile storage controller 104, 130 may result in obsolete or invalid data remaining on the non-volatile storage medium 122. For example, overwriting data X with data Y may result in storing Y on a new storage division (e.g., rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire storage division, which is a time-consuming operation and may result in write amplification. Similarly, data that is no longer is use (e.g., deleted or trimmed data) may not be immediately removed. The non-volatile storage medium 122 may accumulate a significant amount of invalid data.

A groomer process may operate outside of the critical path for servicing storage operations. The groomer process may reclaim storage divisions so that they can be reused for other storage operations. As used herein, reclaiming a storage division refers to erasing the storage division so that new data may be stored/programmed thereon. Reclaiming a storage division may comprise relocating valid data on the storage division to a new location. The groomer may identify storage divisions for reclamation based upon one or more factors, which may include, but are not limited to: the amount of invalid data in the storage division, the amount of valid data in the storage division, wear on the storage division (e.g., number of erase cycles), time since the storage division was programmed or refreshed, and so on.

The non-volatile storage controller 104, 130 may be further configured to store data in a log format. A log format is one example of a transaction log, as described in greater detail below. As described above, a log format refers to a data format that defines an ordered sequence of storage operations performed on a non-volatile storage medium 122. In some embodiments, the log format comprises storing data in a pre-determined sequence of media addresses of the non-volatile storage medium 122 (e.g., within sequential pages and/or erase blocks of the medium 122). The log format may further comprise associating data (e.g., each packet or data segment) with respective sequence indicators. The sequence indicators may be applied to data individually (e.g., applied to each data packet) and/or to data groupings (e.g., packets stored sequentially on a storage division, such as an erase block). In some embodiments, sequence indicators may be applied to storage divisions when the storage divisions are reclaimed (e.g., erased), as described above, and/or when the storage divisions are first used to store data.

In some embodiments the log format may comprise storing data in an "append only" paradigm. The non-volatile storage controller 104, 130, using the log storage module 137 described below or the like, may maintain a current append point at a media address of the non-volatile storage device 102. The append point may be a current storage division and/or offset within a storage division. Data may then be sequentially appended from the append point. The sequential ordering of the data, therefore, may be determined based upon the sequence indicator of the storage division of the data in combination with the sequence of the data within the storage division. Upon reaching the end of a storage division, the non-volatile storage controller 104, 130 may identify the "next" available storage division (e.g., the next storage division that is initialized and ready to store data). The groomer may reclaim storage divisions comprising invalid, stale, and/or deleted data, to ensure that data may continue to be appended to the media log.

The log format described herein may allow valid data to be distinguished from invalid data based upon the contents of the non-volatile storage medium 122, and independently of other metadata. As discussed above, invalid data may not be removed from the non-volatile storage medium 122 until the storage division comprising the data is reclaimed. Therefore, multiple "versions" of data having the same context may exist on the non-volatile storage medium 122 (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

The storage management layer 130 may be configured to provide storage services to one or more storage clients 116. As described above, storage clients 116 may include local storage clients 116 operating on the computing device 110 and/or remote, storage clients 116 accessible via the network 115 and/or network interface 113. The storage clients 116 may include, but are not limited to: operating systems, file systems, database systems 116a, server applications, kernel-level processes, user-level processes, applications, or the like.

The storage management layer 130 comprises and/or is communicatively coupled to one or more non-volatile storage devices 102, 121. The one or more non-volatile storage devices 102, 121 may include different types of non-volatile storage devices including, but not limited to: solid-state storage devices, hard drives, tape drives, SAN storage resources, or the like. The one or more non-volatile storage devices 102 may comprise one or more respective non-volatile storage medium controllers 104 and non-volatile storage media 122. As illustrated in FIG. 1, The SML 130 may provide access to the one or more non-volatile storage devices 102, 121 via a traditional block I/O interface 131. Additionally, the SML 130 may provide access to enhanced functionality (e.g., a large, virtual address space 134) through the SML interface 132. The metadata 135 may be used to manage and/or track storage operations performed through any of the Block I/O interface 131, SML interface 132, cache interface, auto-commit memory (ACM) interface 133, or other, related interfaces.

The cache interface may expose cache-specific features accessible via the storage management layer 130. Also, in some embodiments, the SML interface 132 presented to the storage clients 116 provides access to data transformations implemented by the one or more non-volatile storage devices 102 and/or the one or more non-volatile storage medium controllers 104.

The SML 130 may provide storage services through one or more interfaces, which may include, but are not limited to: a block I/O interface, an ACM interface 133, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations the on one or more non-volatile storage devices 102. The SML 130 may maintain metadata 135 comprising any-to-any mappings between logical addresses and media locations, as described above.

The SML 130 may further comprise a non-volatile storage device interface 139 configured to transfer data, commands, and/or queries to the one or more non-volatile storage devices 102, 121 over the network 115, over a bus, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile storage device interface 139 may communicate with the one or more non-volatile storage devices 102, 121 using input-output control (IO-CTL) command(s), IO-CTL command extension(s), remote direct memory access, or the like. While a single non-volatile storage device interface 139 is depicted, in further embodiments, the SML 130 may comprise different interfaces 139 for the non-volatile storage device 102 including the volatile memory 1013 (e.g., auto-commit memory) and for the second non-volatile storage device 121.

The communication interface 113 may comprise one or more network interfaces configured to communicatively couple the computing device 110 and/or the non-volatile storage controller 104, 130 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile storage controller 104, 130 comprises and/or is in communication with one or more non-volatile storage devices 102, 121. Although FIG. 1 depicts a single non-volatile storage device 102 comprising a volatile memory 1013, the disclosure is not limited in this regard and could be adapted to incorporate any number of non-volatile storage devices 102 comprising a volatile memory 1013, of additional non-volatile storage devices 121, or the like.

The non-volatile storage device 102 and/or the second non-volatile storage device 121 may comprise one or more non-volatile storage media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), battery backed dynamic RAM (DRAM) and/or static random-access memory (SRAM), phase change RAM (PRAM or PCM), ferroelectric RAM (F-RAM), magnetic storage medium (e.g., hard disk, tape), optical storage medium, or the like. While the non-volatile storage medium 122 is referred to herein as "storage media," in various embodiments, the non-volatile storage medium 122 may more generally comprise a non-volatile recording medium capable of recording data, which may be referred to as a non-volatile memory medium, a non-volatile storage medium, or the like. Further, the non-volatile storage device 102, in various embodiments, may comprise a non-volatile recording device, a non-volatile memory device, a non-volatile storage device, or the like.

The non-volatile storage medium 122 may comprise one or more non-volatile storage elements 123, which may include, but are not limited to: chips, packages, die planes, die, and the like. A non-volatile storage medium controller 104 may be configured to manage storage operations on the non-volatile storage medium 122, and may comprise one or more processors, programmable processors (e.g., field-programmable gate arrays), or the like. In some embodiments, the non-volatile storage medium controller 104 is configured to store data on and/or read data from the non-volatile storage medium 122 in the contextual, log format described above, and to transfer data to/from the non-volatile storage device 102, and so on.

The non-volatile storage medium controller 104 may be communicatively coupled to the non-volatile storage medium 122 and/or the volatile memory 1013 by way of one or more buses 127 (e.g., a memory bus, a control bus, a communications bus). The bus 127 may comprise an I/O bus for communicating data to/from the non-volatile storage elements 123. The bus 127 may further comprise a control bus for communicating addressing and other command and control information to the non-volatile storage elements 123. In some embodiments, the bus 127 may communicatively couple the non-volatile storage elements 123 to the non-volatile storage medium controller 104 in parallel. This parallel access may allow the non-volatile storage elements 123 to be managed as a group, forming a logical storage element 129. As discussed above, the logical storage element may be partitioned into respective logical storage units (e.g., logical pages) and/or logical storage divisions (e.g., logical erase blocks). The logical storage units may be formed by logically combining physical storage units of each of the non-volatile storage elements. For example, if the non-volatile storage medium 122 comprises twenty-five (25) non-volatile storage elements, each logical storage unit may comprise twenty-five (25) pages (e.g., a page of each element of non-volatile storage medium 122).

A non-volatile storage controller (e.g., hardware and/or software for controlling the non-volatile storage device 102 and/or the second non-volatile storage device 121) may comprise an SML 130 and/or the non-volatile storage medium controller 104. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). The SML 130 may comprise an ACM interface 133 for storing data in the volatile memory 1013, while ensuring persistence of the data in the non-volatile storage medium 122, as described below. Alternatively, or in addition, the SML interface 132 may be provided as a separate API, service, and/or library. The SML 130 may be further configured to provide a cache interface for caching data using the non-volatile storage system 100.

As described in greater detail below, in certain embodiments, a storage client 116 may be aware of and/or configured to use the volatile memory 1013 of the non-volatile storage device 102. For example, a database system storage client 116a may comprise at least a portion of the acceleration module 150, and may be configured to send one or more database log entries or other transaction log entries to the volatile memory 1013 of the non-volatile storage device 102 (e.g., using one or more addresses of the logical address space 134 of the non-volatile storage device 102 or the like).

In a further embodiment, a storage client 116 may not be aware of and/or configured to use the volatile memory 1013 of the non-volatile storage device 102, and the acceleration module 150 may filter and/or reroute one or more transaction log entries, such as database log entries, which the storage client 116 has sent to another location, such as the second non-volatile storage device 121, to the volatile memory 1013 of the non-volatile storage device 102. Once the volatile memory 1013 stores a filtered and/or rerouted transaction log entry, in certain embodiments, the acceleration module 150 may store the transaction log entry in the original location to which the entry was sent, such as the second non-volatile storage device 121. In this manner, in certain embodiments, the acceleration module 150 may accelerate storage of a transaction log, operation of a storage client 116, or the like transparently, with little or no cooperation from the storage client 116 itself.

As described above, the SML 130 may present a logical address space 134 to the storage clients 116 (e.g., through the interfaces 131, 132, and/or 133). The SML 130 may maintain metadata 135 comprising any-to-any mappings between logical addresses in the logical address space 134 and media locations on the non-volatile storage device 102. The metadata 135 may comprise a logical-to-physical mapping structure with entries that map logical addresses in the logical address space 134 and media locations on the non-volatile storage device 102. The logical-to-physical mapping structure of the metadata 135, in one embodiment, is sparsely populated, with entries for logical addresses for which the non-volatile storage device 102 stores data and with no entries for logical addresses for which the non-volatile storage device 102 does not currently store data. The metadata 135, in certain embodiments, tracks data at a block level, with the SML 130 managing data as blocks.

The non-volatile storage system 100 may further comprise a log storage module 137, which, as described above, may be configured to store data on the non-volatile storage device 102 in a contextual, log format. The contextual, log data format may comprise associating data with a logical address on the non-volatile storage medium 122. The contextual, log format may further comprise associating data with respective sequence identifiers on the non-volatile storage medium 122, which define an ordered sequence of storage operations performed on the non-volatile storage medium 122, as described above. The non-volatile storage controller may further comprise a non-volatile storage device interface 139 that is configured to transfer data, commands, and/or queries to the non-volatile storage medium controller 104 over the network 115, as described above.

In certain embodiments, the system 100 (e.g., the non-volatile storage device 102) preserves data and/or provides power management even in the event of a power failure, power reduction, power loss, improper shutdown, restart event, or other trigger. The non-volatile storage device 102, in the depicted embodiment, has a primary power connection 136 that connects the non-volatile storage device 102 to a primary power source that provides the non-volatile storage device 102 with power to perform data storage operations such as reads, writes, erases, or the like.

The non-volatile storage device 102, under normal operating conditions or the like, may receive electric power from a primary power source over the primary power connection 136. In certain embodiments, the primary power connection 136 may connect the non-volatile storage device 102 to an external power supply, such as an electrical outlet, a power converter (e.g., a power brick), an uninterruptable power supply (UPS), an electrical generator, a battery, or another power source. In a further embodiment, the primary power connection 136 may be integrated with a network 115 connection, such as power over Ethernet (PoE) or the like.

In other embodiments, the primary power connection 136 connects the non-volatile storage device 102 to the host computing device 110, and the host computing device 110 acts as the primary power source that supplies the non-volatile storage device 102 with power. In certain embodiments, the primary power connection 136 may comprise or be integrated with a communications connection, such as a PCI connection, a PCIe connection, or the like.

The non-volatile storage device 102, in certain embodiments, implements a write data pipeline 106 and a read data pipeline 108, an example of which is described in greater detail below with regard to FIG. 2. The write data pipeline 106 may perform certain operations on data as the data is transferred from the host computing device 110 into the non-volatile storage medium 122. These operations may include, for example, error correction code (ECC) generation, encryption, compression, and others. The read data pipeline 108 may perform similar and potentially inverse operations on data that is being read out of non-volatile storage medium 122 and sent to the host computing device 110.

The non-volatile storage device 102, in the depicted embodiment, includes a secondary power supply 124. The secondary power supply 124 may provide power to the non-volatile storage device 102 in response to a power level of the primary power connection 136 failing to satisfy a threshold (e.g., complete or partial power disruption) resulting in the non-volatile storage device 102 not receiving enough electrical power over the primary power connection 136, and/or in response to another trigger. A power disruption may be an event that causes the non-volatile storage device 102 to stop receiving power over the primary power connection 136, causes a reduction in power the non-volatile storage device 102 receives over the primary power connection 136, causes power from the primary power connection 136 to fall below a predefined threshold, or the like. A predefined threshold for power received over the primary power connection 136, in certain embodiments, may be selected to allow for normal fluctuations in the level of power from the primary power connection 136.

For example, a power disruption may occur in response to the power in a building where the non-volatile storage device 102 is located failing or "going out." In various embodiments, a user action such as unplugging or improperly shutting down the non-volatile storage device 102, a failure in the primary power connection 136, a failure in the primary power supply, or the like may cause a power disruption. Numerous, varied power disruptions may cause unexpected power loss for the non-volatile storage device 102.

The secondary power supply 124 may include one or more batteries, one or more capacitors, a bank of capacitors, a separate connection to a power supply, or another path or source different than the primary power connection 136. In one embodiment, the secondary power supply 124 provides power to the non-volatile storage device 102 for at least a power hold-up time during a power disruption or other reduction in power from the primary power connection 136, or in response to another trigger. The secondary power supply 124, in a further embodiment, provides a power hold-up time long enough to enable the non-volatile storage device 102 to flush data that is not yet stored in non-volatile storage medium 122 from the volatile memory 1013 into the non-volatile storage medium 122.

As a result, the non-volatile storage device 102 may preserve data that is not permanently stored in the non-volatile storage device 102 (e.g., data stored in the volatile memory 1013) before a lack of power causes the non-volatile storage device 102 to stop functioning. In certain embodiments, the secondary power supply 124 may comprise the smallest capacitors possible that are capable of providing a predefined power hold-up time, thereby preserving space, reducing cost, and/or simplifying the non-volatile storage device 102. In one embodiment, one or more banks of capacitors are used to implement the secondary power supply 124. For example, capacitors may be more reliable, require less maintenance, and/or have a longer life than batteries or other options for providing secondary power.

In one embodiment, the secondary power supply 124 is part of an electrical circuit that automatically provides power to the non-volatile storage device 102 upon a partial or complete loss of power from the primary power connection 136, or in response to another trigger. Similarly, the system 100 may be configured to automatically accept or receive electric power from the secondary power supply 124 during a partial or complete power loss. For example, in one embodiment, the secondary power supply 124 may be electrically coupled to the non-volatile storage device 102 in parallel with the primary power connection 136, so that the primary power connection 136 charges the secondary power supply 124 during normal operation and the secondary power supply 124 automatically provides power to the non-volatile storage device 102 in response to a power loss, power failing to satisfy a threshold, or another trigger. In one embodiment, the system 100 further includes a diode or other reverse current protection between the secondary power supply 124 and the primary power connection 136, to prevent current from the secondary power supply 124 from reaching the primary power connection 136. In another embodiment, the non-volatile storage device 102 (e.g., using the auto-commit memory 1011 described below) may enable or connect the secondary power supply 124 to the non-volatile storage device 102 using a switch or the like in response to power from the primary power connection 136 failing to satisfy a threshold and/or another trigger.

Examples of data that is not yet stored in the non-volatile storage medium 122 may include data stored in the volatile memory 1013, "in flight" data held in volatile memory as the data moves through a write data pipeline 106 to be stored in the non-volatile storage medium 122, or the like. If data in the volatile memory 1013, in a write data pipeline 106, or the like is lost during a power outage or due to another trigger (e.g., is not written to the non-volatile storage medium 122 or otherwise permanently stored), data corruption and/or data loss may result.

In certain embodiments, the non-volatile storage device 102 sends an acknowledgement to the host computing device 110 at some point after the non-volatile storage device 102 receives data to be stored in the non-volatile storage medium 122. A write data pipeline 106, or a subcomponent thereof, may generate the acknowledgement. It may be advantageous for the non-volatile storage device 102 to send an acknowledgement as soon as possible after receiving the data, but not until the non-volatile storage device 102 may ensure persistence of the received data.

In certain embodiments, the non-volatile storage medium controller 104 (e.g., a write data pipeline 106) sends an acknowledgement for data before the data is actually stored in the non-volatile storage medium 122. For example, the non-volatile storage medium controller 104 may send an acknowledgement for data in response to the volatile memory 1013 storing the data, in response to the volatile memory 1013 being armed with metadata to commit the data to the non-volatile storage medium 122, or the like, as described below. In such embodiments, it may be desirable that the non-volatile storage device 102 persist data (e.g., store the data in the non-volatile storage medium 122) for which the storage controller 104 has sent an acknowledgement before the secondary power supply 124 loses power, in order to prevent data corruption and ensure the integrity of the acknowledgement sent.

As described below, the volatile memory 1013 may comprise an auto-commit memory 1011. In certain embodiments, the volatile memory 1013 is in communication with, managed by, and/or at least partially integrated with the storage controller 104. In one embodiment, the non-volatile storage medium controller 104 (e.g., the auto-commit memory 1011) initiates a power loss mode in the non-volatile storage device 102 in response to a power from the primary power connection 136 failing to satisfy a threshold, or in response to another trigger.

During the power loss mode, the non-volatile storage medium controller 104 (e.g., auto-commit memory 1011), in one embodiment, flushes data that is in the non-volatile storage device 102 (e.g., stored in the volatile memory 1013) that is not yet stored in non-volatile storage medium 122 into the non-volatile storage medium 122. In certain embodiments, the non-volatile storage medium controller 104 (e.g., auto-commit memory 1011) may adjust execution of data operations on the non-volatile storage device 102 to ensure that essential operations complete before the secondary power supply 124 loses sufficient power to complete the essential operations (e.g., during a power hold-up time that the secondary power supply 124 provides).

In certain embodiments, essential operations comprise those operations for data that has been acknowledged as having been stored, such as acknowledged write operations, write operations for data stored in the volatile memory 1013, or the like. In other embodiments, essential operations comprise those operations for data that has been acknowledged as having been stored and for data that has been acknowledged as erased. In other embodiments, essential operations comprise those operations for data that have been acknowledged as having been stored, as having been read, and/or as having been erased. The non-volatile storage medium controller 104 (e.g., auto-commit memory 1011) may terminate non-essential operations to ensure that those non-essential operations do not consume power unnecessarily and/or do not block essential operations from executing. For example, the non-volatile storage medium controller 104 (e.g., auto-commit memory 1011) may terminate erase operations, read operations, unacknowledged write operations, or the like to ensure that data stored in the volatile memory 1013 is successfully flushed to and stored in the non-volatile storage medium 122.

In one embodiment, terminating non-essential operations preserves power from the secondary power supply 124, allowing the secondary power supply 124 to provide the power hold-up time. In a further embodiment, the non-volatile storage medium controller 104 (e.g., auto-commit memory 1011) quiesces or otherwise shuts down operation of one or more subcomponents of the non-volatile storage device 102 during the power loss mode to conserve power from the secondary power supply 124. For example, in various embodiments, the non-volatile storage medium controller 104 (e.g., auto-commit memory 1011) may quiesce operation of a read data pipeline 108, of a direct memory access (DMA) engine, and/or other subcomponents of the non-volatile storage device 102 that are associated with non-essential operations.

In one embodiment, the system 100 includes one or more circuit boards, such as a motherboard or the like, that receive one or more adapters, such as a daughter card or the like, and each adapter receives one or more storage devices 102. In a further embodiment, the adapters are coupled to the circuit board using PCI-e slots of the circuit board and the storage devices 102 are coupled to the adapters using PCI-e slots of the adapters. In another embodiment, the storage devices 102 each comprise a dual in-line memory module (DIMM) of non-volatile solid-state storage media 122, such as Flash memory, or the like. In one embodiment, the circuit board, the adapters, and the storage devices 102 may be external to the host computing device 110 (e.g., located on the network 115), and may include a separate primary power connection 136. For example, the circuit board, the one or more adapters, and the one or more storage devices 102 may be housed in an external enclosure with a power supply unit (PSU) and may be in communication with the host computing device 110 over the network 115; over an external bus such as eSATA, eSATAp, SCSI, FireWire, Fiber Channel, USB, PCIe-AS; or the like.

The systems, methods, and apparatuses described above may be leveraged to implement an auto-commit memory capable of implementing memory semantic write operations (e.g., persistent writes) at or near CPU memory write granularity and speed, over the network 115, or the like. By guaranteeing that certain commit actions for the write operations will occur, even in the case of a power failure or other restart event, in certain embodiments, volatile memory 1013 such as DRAM, SRAM, BRAM, or the like, may be used as, considered as, and/or represented as non-volatile.

The auto-commit memory described herein, may be configured to ensure or guarantee that data is preserved or persisted, even while the data is stored in the volatile memory 1013. The volatile memory 1013, elements, modules, or devices described herein, may be armed or associated with auto-commit metadata defining a commit action for the non-volatile storage medium controller 104 (e.g., auto-commit memory 1011) to perform in response to a trigger. A trigger, a commit trigger, a trigger event, a commit event, or the like for the non-volatile storage medium controller 104 (e.g., auto-commit memory 1011), as used herein, may comprise an occurrence, a system state, a condition, a request, or the like, in response to which the non-volatile storage medium controller 104 (e.g., auto-commit memory 1011) is configured to perform one or more commit actions, such as flushing or preserving data from a volatile memory 1013 to the non-volatile storage medium 122. The non-volatile storage medium controller 104 (e.g., auto-commit memory 1011), in certain embodiments, may flush, stream, copy, transfer, or destage data from the volatile memory 1013 without regard to any single specific trigger event. For example, the non-volatile storage medium controller 104 (e.g., auto-commit memory 1011) may destage data from the volatile memory 1013 to the non-volatile storage medium 122 to free space in the volatile memory 1013, or the like.

In certain embodiments, a trigger for the non-volatile storage medium controller 104 (e.g., auto-commit memory 1011) may comprise a non-failure, non-power-loss, and/or non-restart event during routine runtime of the system 100, such as a volatile memory 1013 buffer becoming full, receiving a destage request, or the like. In other embodiments, a trigger may comprise a failure condition, a power-loss condition, or other restart event. A restart event, as used herein, comprises an intentional or unintentional loss or reduction of power to at least a portion of the host computing device 110 and/or a non-volatile storage device 102. A restart event may comprise a system reboot, reset, or shut-down event; a power fault, power loss, or power failure event; or another interruption or reduction of power. By guaranteeing certain commit actions, the non-volatile storage medium controller 104 (e.g., auto-commit memory 1011) may allow storage clients 116 to retrieve data (e.g., transaction log entries), resume execution states, or the like even after a restart event, may allow the storage clients 116 to persist different independent data sets, or the like.

As used herein, the term "memory semantic operations," or more generally, "memory operations," refers to operations having a granularity, synchronicity, and access semantics of volatile memory accesses, using manipulatable memory pointers, or the like. Memory semantic operations may include, but are not limited to: load, store, peek, poke, write, read, set, clear, and so on. Memory semantic operations may operate at a CPU-level of granularity (e.g., single bytes, words, cache lines, or the like), and may be synchronous (e.g., the CPU waits for the operation to complete). In certain embodiments, providing access at a larger sized granularity, such as cache lines, may increase access rates, provide more efficient write combining, or the like than smaller sized granularity access.

The volatile memory 1013 may be available to computing devices 110 and/or applications 116 (e.g., local on the computing device 110, remote over the network 115, or the like) using one or more of a variety of memory mapping technologies, including, but not limited to, memory mapped I/O (MMIO), port I/O, port-mapped JO (PMIO), Memory mapped file I/O, or the like. For example, the volatile memory 1013 may be available to computing devices and/or applications (both local and remote) using a PCI-e Base Address Register (BAR), or other suitable mechanism. The volatile memory 1013 may also be directly accessible via a memory bus of a CPU, using an interface such as a double data rate (DDR) memory interface, HyperTransport, Quick-Path Interconnect (QPI), or the like. Accordingly, the volatile memory 1013 may be accessible using memory access semantics, such as CPU load/store, direct memory access (DMA), $3^{rd}$ party DMA, remote DMA (RDMA), atomic test and set, and so on. The direct, memory semantic access to the volatile memory 1013 disclosed herein allows many of the system and/or virtualization layer calls typically required to implement committed operations to be bypassed, (e.g., call backs via asynchronous Input/Output interfaces may be bypassed). In some embodiments, the volatile memory 1013 may be mapped to one or more virtual ranges (e.g., virtual BAR ranges, virtual memory addresses, or the like). The virtual mapping may allow multiple computing devices and/or applications to share a single ACM address range (e.g., access the same ACM simultaneously, within different virtual address ranges). The volatile memory 1013 may be mapped into an address range of a physical memory address space addressable by a CPU 111 so that the CPU 111 may use load/store instructions to read and write data directly to the volatile memory 1013 using memory semantic accesses. A CPU 111, in a further embodiment, may map the physically mapped volatile memory 1013 into a virtual memory address space, making the volatile memory 1013 available to user-space processes or the like as virtual memory.

The volatile memory 1013 may be pre-configured to commit its contents upon detection of a restart condition (or other pre-determined triggering event) and, as such, operations performed on the volatile memory 1013 may be viewed as being "instantly committed." For example, an application 116 may perform a "write-commit" operation on the volatile memory 1013 using memory semantic writes that operate at or near CPU memory granularity and speed, without the need for separate corresponding "commit" commands, which may significantly increase the performance of applications 116 affected by write-commit latencies. As used herein, a write-commit operation may be an operation in which an application 116 writes data to a memory location (e.g., using a memory semantic access), and then issues a subsequent commit command to commit the operation (e.g., to persistent storage or other commit mechanism).

Applications 116 whose performance is based on write-commit latency, the time delay between the initial memory write and the subsequent persistent commit operation, may attempt to reduce this latency by leveraging a virtual memory system (e.g., using a memory backed file). In this case, the application 116 may perform high-performance memory semantic write operations in system RAM 112, but, in order to commit the operations, must perform subsequent "commit" commands to persist each write operation to the backing file (or other persistent storage). Accordingly, each write-commit operation may comprise its own separate commit command. For example, in a database logging application, each log transaction must be written and committed before a next transaction is logged. Similarly, messaging systems (e.g., store and forward systems) may write and commit each incoming message, before receipt of the message can be acknowledged. The write-commit latency, therefore, may comprise a relatively fast memory semantic write followed by a much slower operation to commit the data to persistent storage. Write-commit latency may include several factors including, access times to persistent storage, system call overhead (e.g., translations between RAM addresses, backing store LBA, or the like), and so on. Examples of applications 116 that may benefit from reduced write-commit latency include, but are not limited to: database logging applications (e.g., a database system 116), file system logging, messaging applications (e.g., store and forward), semaphore primitives, or the like.

The systems, apparatuses, and methods for transaction log acceleration using auto-commit memory disclosed herein may be used to increase the performance of write-commit latency bound applications 116 by providing direct access to a memory region at any suitable level of addressing granularity including byte level, page level, cache-line level, or other memory region level, that may be guaranteed to be committed in the event of a system failure or other restart event, without the application 116 issuing a separate commit command. Accordingly, the write-commit latency of an application 116 may be reduced to the latency of a memory semantic access (e.g., a single write over a system bus, an RDMA transaction over the network 115, an Infiniband transaction, or the like).

The acceleration module 150, in certain embodiments, may use or cooperate with the volatile memory 1013, as described herein, to provide transaction log acceleration to clients 116 (e.g., a database system, an operating system, virtual operating platform, guest operating system, application, process, thread, entity, utility, user, or the like) with many of the benefits and speed of volatile memory 1013 and the persistence of the non-volatile storage medium 122.

A data structure, as used herein, comprises an organized arrangement, group, or set of data. A data structure may be organized according to a predefined pattern or schema, may comprise metadata such as pointers, sequence numbers, labels, identifiers, or the like to facilitate organization of and access to the included data. Data structures may include, but are not limited to, a log (e.g., a transaction log, a sequential log, an application log, a database log, a binary log, an audit trail, a journal, a transaction journal, a database journal, a linked list), a queue (e.g., a first-in-first-out or FIFO queue, a buffer), a stack (e.g. a last-in-first-out or LIFO stack), a tree (e.g., a binary tree, B-tree, B+ tree, B* tree, ternary tree, K-ary tree, space-partitioning tree, decision tree), a linked-list (e.g., singly linked list, doubly linked list, self-organizing list, doubly connected edge list), a hash (e.g., a hash list, hash table, hash tree, hash array), an array (e.g., a table, map, bit array, bit field, bitmap, matrix, sparse array), a heap (e.g., a binary heap, binomial heap, Fibonacci heap, ternary heap, D-ary heap), a graph (e.g., directed graph, directed acyclic graph, binary decision diagram, graph-structured stack, multigraph, hypergraph, adjacency list), or other data structure.

One example of a data structure is a transaction log (TLOG). As used herein, a transaction log may comprise a data structure that includes an ordered sequence of entries. A transaction log (e.g., a sequential log, an application log, a database log, a binary log, an audit trail, a journal, a transaction journal, a database journal, a linked list), in certain embodiments, includes sequential, historical, or chronological entries, such as a history or list of updates made to a database system 116a or database table, transactions executed by and/or on a database system 116a or other application 116, or the like. A transaction log entry or record may include enough information regarding each transaction to either rollback or undo the transaction, or to redo or reapply the transaction. For example, an entry or record of a transaction log such as a database log may include an update log record (e.g., recording an update or change in a database system 116a or other storage client 116), a compensation log record (e.g., recording the rollback of a change in a database system 116a or other storage client 116), a commit record (e.g., recording a decision to commit a transaction), an abort record (e.g., recording a decision to abort and/or roll back a transaction), a checkpoint record (e.g., recording that a checkpoint has been made, to accelerate recovery or the like), a completion record (e.g., recording that a transaction is complete, has been fully committed, aborted, or the like).

In addition to or instead of being stored sequentially or chronologically, in certain embodiments, a transaction log may include sequence information for each entry or transaction, such as a timestamp, a sequence number, a link to a previous or next entry, or the like. A transaction log may also include other types of metadata, such as a transaction identifier (e.g., a reference to a database transaction that generated the log record), a type (e.g., a label describing the type of database log record), or the like. While a transaction log is primarily described herein with regard to the acceleration module 150, the description is equally applicable to other types of data structures, such as the example data structures listed above.

The acceleration module 150 may provide an interface, such as an application programming interface (API), shared library, hardware interface, a communications bus, one or more IO control (IOCTL) commands, a network interface, or the like, over which a client 116 may create, update, delete, or otherwise access one or more types of transaction log data structures. In certain embodiments, a client 116, such as a database system 116a, may be unaware of the non-volatile storage device 102 and/or the auto-commit memory 1011, and the acceleration module 150 and/or the SML 130 may filter or intercept transaction log entries from the client 116, so that the client 116 does not access the interface of the acceleration module 150 directly.

A data structure, in certain embodiments, is persistent if the data structure remains accessible to a client 116 in some form after a restart event or other trigger, which may be ensured or guaranteed by the non-volatile storage medium controller 104 (e.g., auto-commit memory 1011), as described herein. The acceleration module 150 may associate a persistent logical identifier with a transaction log data structure and/or with a client 116 (e.g., a database system 116a), which the client 116 may use to access the transaction log data structure both before and after a restart event. For example, the acceleration module 150 may cooperate with a file system module 1558 as described below with regard to FIG. 4 to provide access to a transaction log data structure as a file system file with a filename, a filename and an offset, or the like. In other embodiments, a persistent logical identifier may comprise a logical unit number (LUN) identifier (ID) from a LUN namespace, a LUN ID and an offset, a logical identifier for a persistent memory namespace for the ACM 1011 as described below, a logical block address (LBA) or LBA range from a namespace of the non-volatile storage device 102, or another persistent logical identifier.

To make efficient use of the volatile memory 1013, which may have a smaller storage capacity than the non-volatile storage medium 122, and to provide the access speed of the volatile memory 1013 and the persistence of the non-volatile storage medium 122, as a client 116 writes data to a transaction log data structure (e.g., in the foreground) at an input rate, the acceleration module 150 may cooperate with the ACM 1011 to destage, copy, transfer, migrate, and/or move data from volatile memory buffers 1013 to the non-volatile storage medium 122 and/or to the non-volatile storage device 121 (e.g., in the background) at a transfer rate that matches or exceeds the input rate over time, so that the data does not overrun the one or more volatile memory buffers 1013 allocated to the transaction log data structure. The acceleration module 150, in one embodiment, may block, delay, throttle, govern, or otherwise limit the input rate at which a client 116 writes data to a transaction log data structure. In this manner, the acceleration module 150 may mask or hide the volatile memory 1013 and/or non-volatile storage medium 122 from a client 116 such that the client 116 perceives the access speed and benefits of the volatile memory 1013 and the persistence of the non-volatile storage medium 122, without being aware of the complexities of the tiered architecture that the acceleration module 150 uses to provide these benefits.

The acceleration module 150, in certain embodiments, may enforce one or more rules for a data structure (e.g., a transaction log). For example, each different type of data structure may be defined or structured by a set of one or more rules, restrictions, definitions, or the like. The rules may define one or more allowed or acceptable data operations for a data structure. For a transaction log, the rules may include that entries must be sequential, that data entries may not be overwritten or updated once written, or the like. Different types of data structures may have different rules. For example, a queue may have a strict FIFO rule, a stack may have a strict LIFO rule, a tree may have a rule defining a strict order or hierarchy for data entries or nodes, a data structure may have a rule requiring certain data types or required fields or entries, or the like.

In certain embodiments, by providing an interface that enforces one or more rules for a data structure, the acceleration module 150 may prevent an application 116 or other client 116 from inadvertently or accidentally overwriting or otherwise violating the integrity of a transaction log data structure, ensuring that the transaction log data structure satisfies the data structure's strict definition, or the like. Because the acceleration module 150 may provide data structures that are non-volatile or persistent, errors in data structure integrity (e.g., an overwritten data structure, an improper entry in a data structure, or the like) may otherwise persist after a restart event or reboot, and would not be cleared or reset as would errors in a volatile data structure.

The acceleration module 150, in certain embodiment, may provide an interface or library that integrates with and/or provides an operating system, a file system, one or more applications, a database system 116a, or other clients 116 access to the hardware capabilities of the volatile memory 1013 and/or the non-volatile storage medium 122 in a substantially transparent manner, thereby providing transaction log data structures accessible via a library, a filename or other persistent logical identifier, or the like. Because the acceleration module 150 manages the tiered hierarchy of the volatile memory 1013, the non-volatile storage medium 122 (e.g., the storage management layer 130), a file system (e.g., the file system module 1558 described below), in one embodiment, the acceleration module 150 may provide the benefits of the ACM 1011 for transaction log acceleration, even with a small amount of volatile memory 1013 for the ACM 1011 relative to storage capacity of the non-volatile storage medium 122.

In certain embodiments, the acceleration module 150 may provide substantially transparent integration of transaction log data structures with a file system. For example, a client 116 may access a transaction log data structure using file system semantics, as a file with a filename, using a filename and an offset, or the like, while the acceleration module 150 manages the transfer of data of the data structure between the ACM buffers 1013 (e.g., volatile memory 1013, volatile memory buffers 1013, volatile memory modules 1013, volatile memory elements 1013, volatile memory pages 1013) of the ACM 1011 and the non-volatile storage medium 122, may enforce one or more rules for the data structure (e.g., prevent a file for a data structure from being overwritten, ensure a file for a data structure is append-only, ensure entries of a file for a data structure are sequential, or the like), so that the client 116 is spared such responsibilities. In this manner, an application 116 or other client 116 may receive the benefits of the acceleration module 150 and/or the ACM 1011 for transaction log acceleration while using a standard library, file system I/O, or other interface.

In a further embodiment, the acceleration module 150 may filter and/or intercept transaction log entries from a client 116. For example, at least a portion of the acceleration module 150 may execute on the host computing device 110, as a filter driver, as a layer in a storage stack, as part of the SML 130 or a device driver for the non-volatile storage device 102 and/or the non-volatile storage device 121, as part of a memory system 1018, or the like, and may be configured to receive requests to store transaction log entries from one or more storage clients 116, such as a database system 116a. In other embodiments, a storage client 116, such as a database system 116a, may be aware of and configured to use the acceleration module 150 and/or the non-volatile storage device 102, and may send requests to store transaction log entries to the acceleration module 150 directly.

Figure 2:
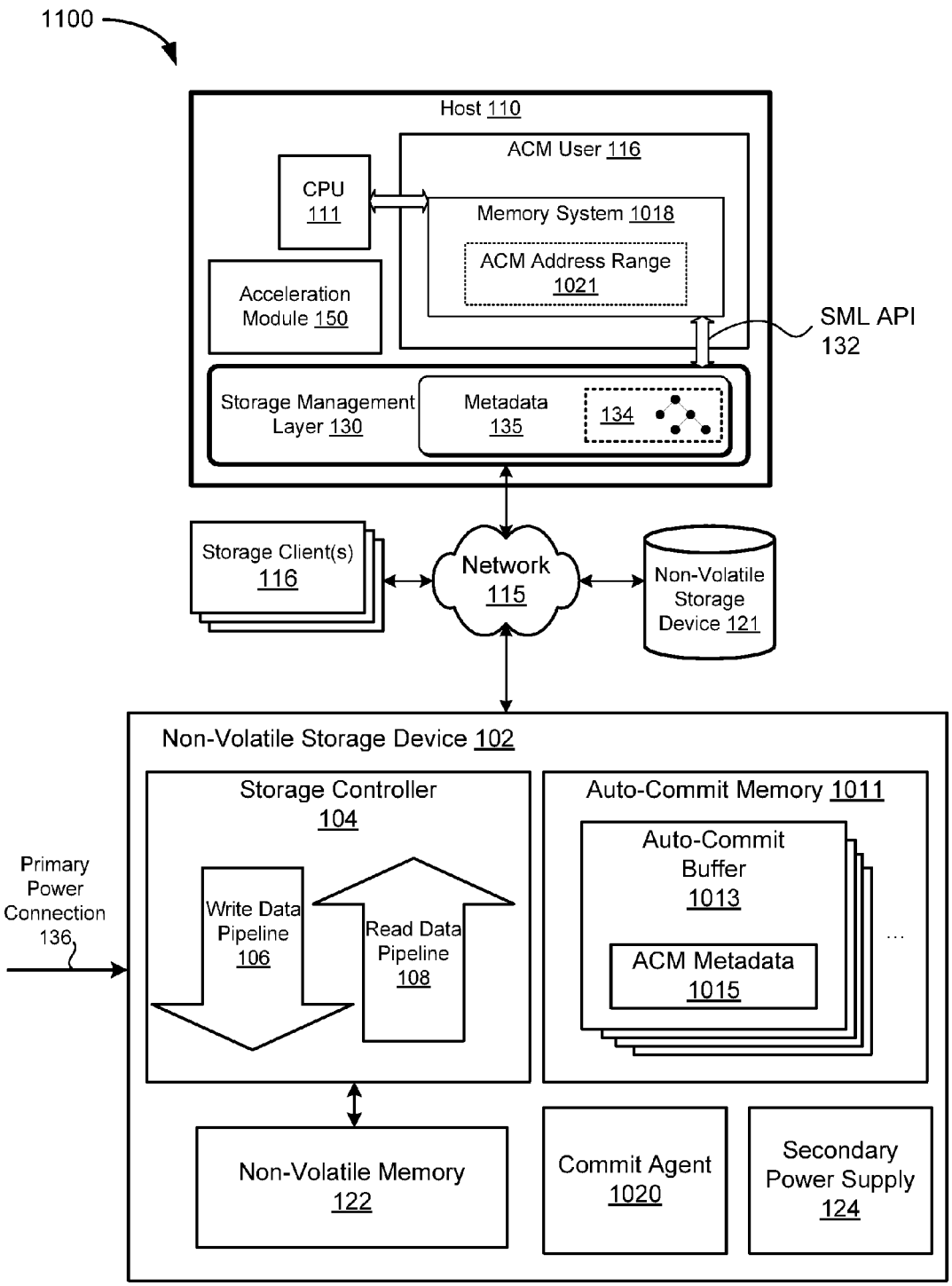
FIG. 2 is a block diagram illustrating another embodiment of a system for transaction log acceleration.

FIG. 2 is a block diagram of a system 1100 comprising one embodiment of an acceleration module 150 and an auto-commit memory (ACM) 1011. In one embodiment, an auto-commit memory 1011 comprises a low-latency, high reliability memory medium, which may be exposed to the acceleration module 150 and/or other ACM users 116 for direct memory semantic access, at a memory semantic access and address granularity level of at least byte level, combined with logic and components together configured to restore the same state of data stored in the ACM memory buffer 1013 that existed prior to a restart event or other trigger and the same level of memory semantic access to data stored in the auto-commit memory 1011 after the restart event or other trigger. In certain embodiments, the ACM 1011 guarantees that data stored in the ACM 1011 will be accessible after a restart event or other trigger. The ACM 1011, in one embodiment, comprises a volatile memory medium 1013 coupled to a controller 104, logic, and other components that commit data to a non-volatile storage medium 122 when necessary or when directed by an ACM user 116. In a further embodiment, the ACM 1011 may include a natively non-volatile storage medium such as phase change memory (PCM or PRAM), and a triggered commit action may process data on the non-volatile storage medium 122 in response to a restart event such that the data remains available to an owner 116 of the data after the restart event.

Accordingly, when data is written to the ACM 1011, it may not initially be "committed" per se (e.g., is not necessarily stored on a persistent memory medium 122 and/or state); rather, a pre-configured process may be setup to preserve the ACM data and its state, if a restart event or other trigger occurs while the ACM data is stored in the ACM 1011. The pre-configuring of this restart survival process is referred to herein as "arming." The ACM 1011 may be capable of performing the pre-configured commit action autonomously and with a high degree of assurance, despite the system 1100 experiencing failure conditions, another restart event, and/or another trigger. As such, an entity 116 that stores data on the ACM 1011 may consider the data to be "instantaneously committed" or safe from loss or corruption, at least as safe as if the data were stored in a non-volatile storage device such as a hard disk drive, tape storage medium, or the like.

In embodiments where the ACM 1011 comprises a volatile memory medium 1013, the ACM 1011 may make the volatile memory medium 1013 appear as a non-volatile memory and/or non-volatile storage, may present the volatile memory 1013 as a non-volatile medium, or the like, because the ACM 1011 preserves data, such as ACM data and/or ACM metadata 1015, across system restart events or other triggers. The ACM 1011 may allow a volatile memory medium 1013 to be used as a non-volatile memory medium by determining that a trigger event, such as a restart or failure condition, has occurred, copying the contents of the volatile memory medium 1013 to a non-volatile storage medium 122 during a hold-up time after the trigger event, and copying the contents back into the volatile memory medium 1013 from the non-volatile storage medium 122 after the trigger event is over, power has been restored, the restart event has completed, or the like.

In one embodiment, the ACM 1011 is at least byte addressable. A non-volatile memory medium 122 of the ACM 1011, in certain embodiments, may be natively byte addressable, directly providing the ACM 1011 with byte addressability. In another embodiment, a non-volatile memory medium 122 of the ACM 1011 is not natively byte addressable, but a volatile memory medium 1013 of the ACM 1011 is natively byte addressable, and the ACM 1011 writes or commits the contents of the byte addressable volatile memory medium 1013 to the non-byte addressable non-volatile memory medium 122 of the ACM 1011 in response to a trigger event, so that the volatile memory medium 1013 renders the ACM 1011 byte addressable.

The ACM 1011 may be accessible to one or more computing devices, such as the host 110. As used herein a computing device (e.g., the host 110) refers to a computing device capable of accessing an ACM 1011. The ACM 1011 may be in communication with the host 110 over a data network 115; the host 110 may be a computing device that houses the ACM 1011 as a peripheral; the ACM 1011 may be attached to a system bus of the host 110; and/or the ACM 1011 may otherwise be in communication with the host 110. The host 110, in certain embodiments, may access the ACM 1011 hosted by another computing device. The access may be implemented using any suitable communication mechanism, including, but not limited to: RDMA, Infiniband, CPU programmed JO (CPIO), port-mapped JO (PMIO), memory-mapped JO (MMIO), a Block interface, a PCI-e bus, or the like. The host 110 may comprise one or more ACM users 116. As used herein, an ACM user 116 refers to an entity (e.g., hardware and/or software) configured to access the ACM 1011, directly or indirectly, such as a host computing device 110, a database system 116a, operating system (OS), virtual operating platform (e.g., an OS with a hypervisor), a guest OS, application, process, thread, entity, utility, user, or another storage client 116.

One or more ACM buffers 1013, in certain embodiments, may be mapped into an address range of a physical memory address space addressable by a CPU 111, a kernel, or the like of the host device 110, such as the memory system 1018 described below, over the network 115, over a bus (e.g., a PCI bus), or the like. For example, one or more ACM buffers 1013 may be mapped as directly attached physical memory, as MMIO addressable physical memory over a PCI-e bus, or otherwise mapped as one or more pages of physical memory. At least a portion of the physically mapped ACM buffers 1013, in a further embodiment, may be mapped into a virtual memory address space, accessible to user-space processes or the like as virtual memory.

Allowing ACM users 116 to directly address the ACM buffers 1013, in certain embodiments, bypasses one or more layers of the traditional operating system memory stack of the host device 110, providing direct load/store operation access to kernel-space and/or user-space applications. An operating system, using a kernel module, an application programming interface, the storage management layer (SML) 130 described below, or the like, in one embodiment, maps and unmaps ACM buffers 1013 to and from the memory system 1018 for one or more ACM users 116, and the ACM users 116 may directly access an ACM buffer 1013 once the operating system maps the ACM buffer 1013 into the memory system 1018. In a further embodiment, the operating system may also service system flush calls for the ACM buffers 1013, or the like.

The storage management layer 130 and/or the SML API 132 described below, in certain embodiments, provide an interface for ACM users 116, an operating system 116, a database system 116a, and/or other entities to request certain ACM functions, such as a map function, an unmap function, a flush function, and/or other ACM functions. To perform a flush operation in response to a flush request, the ACM 1011 may perform a commit action for each ACM buffer 1013 associated with the flush request. Each ACM buffer 1013 is committed as indicated by the ACM metadata 1015 of the associated ACM buffer 1013. A flush function, in various embodiments, may be specific to one or more ACM buffers 1013, system-wide for all ACM buffers 1013, or the like. In one embodiment, a CPU 111, an operating system, or the like for the host 110 may request an ACM flush operation in response to, or as part of a CPU cache flush, a system-wide data flush for the host 110, or another general flush operation.

An ACM user 116, an operating system, or the like may request a flush operation to maintain data consistency prior to performing a maintenance operation, such as a data snapshot or a backup, to commit ACM data prior to reallocating an ACM buffer 1013, to prepare for a scheduled restart event, or for other circumstances where flushing data from an ACM buffer 1013 may be beneficial. An ACM user 116, an operating system, or the like, in certain embodiments, may request that the ACM 1011 map and/or unmap one or more ACM buffers 1013 to perform memory management for the ACM buffers 1013; to reallocate the ACM buffers 1013 between applications or processes; to allocate ACM buffers 1013 for new data, applications, or processes; to transfer use of the ACM buffers 1013 to a different host 110 (in shared ACM 1011 embodiments); or to otherwise manipulate the memory mapping of the ACM buffers 1013. In another embodiment, the storage management layer 130 may dynamically allocate, map, and/or unmap ACM buffers 1013 using a resource management agent as described below.

Since the ACM 1011, in certain embodiments, may be guaranteed to auto-commit the data stored thereon in the event of a trigger event, the host 110, ACM user 116, or the like may view data written to the ACM 1011 as being instantaneously "committed" or non-volatile, as the host 110 or ACM user 116 may access the data both before and after the trigger event. While a restart event, in one embodiment, may cause an ACM user 116 such as a database system 116a to be re-started or re-initialized, the data stored in the ACM 1011 may be in the same state/condition after the restart event as it was before the restart event. The host 110 may, therefore, write to the ACM 1011 using memory write semantics (and/or at CPU speeds and granularity), without the need for explicit commit commands by relying on the pre-configured trigger of the ACM 1011 to commit the data in the event of a restart or other trigger event.

The ACM 1011 may comprise a plurality of auto-commit buffers 1013, each comprising respective ACM metadata 1015. As discussed below, the ACM metadata 1015 may include data to facilitate committing of ACM data in response to a triggering event for the auto-commit buffer 1013, such as a logical identifier for data in the ACM buffer 1013, an identifier of a commit agent 1020, instructions for a commit process or other processing procedure, security data, or the like. The auto-commit buffers 1013 may be of any suitable size, from a single sector, page, byte, or the like, to a virtual or logical page size (e.g., 80 to 400 kb). The size of the auto-commit buffers 1013 may be adapted according to the storage capacity of the underlying non-volatile storage medium 122, and or hold-up time available from the secondary power supply 124.

In one embodiment, the ACM 1011 may advertise or present to the host 110, to ACM users 116, or the like, a storage capacity of the ACM buffers 1013 that is larger than an actual storage capacity of memory of the ACM buffers 1013. To provide the larger storage capacity, the ACM 1011 may dynamically map and unmap ACM buffers 1013 to the memory system 1018 and to the non-volatile backing memory 122 of the ACM 1011. For example, the ACM 1011 may provide virtual address ranges for the ACM buffers 1013, and demand page data and/or ACM buffers 1013 to the non-volatile storage medium 122 as ACM buffer 1013 accesses necessitate. In another embodiment, for ACM buffers 1013 that are armed to commit to one or more predefined LBAs of the non-volatile storage medium 122, the ACM 1011 may dynamically move the ACM data and ACM metadata 1015 from the ACM buffers 1013 to the associated LBAs of the non-volatile storage medium 122, freeing storage capacity of the ACM buffers 1013 to provide a larger storage capacity. The ACM 1011 may further return the ACM data and ACM metadata 1015 back to one or more ACM buffers 1013 as ACM buffers become available, certain addresses outside the data of currently loaded ACM buffers 1013 are requested, or the like, managing storage capacity of the ACM buffers 1013.

The ACM 1011 may be pre-configured or "armed" to implement one or more "triggered commit actions" in response to a restart condition, or other, pre-determined condition or trigger. As used herein, a restart condition or event may include, but is not limited to a software or hardware shutdown/restart of a host 110, a failure in a host 110 computing device, a failure of a component of the host 110 (e.g., failure of the network or a bus), a software fault (e.g., an fault in software running on the host 110 or other computing device), a loss of the primary power connection 136, an invalid shutdown, power from the primary power connection 136 failing to satisfy a threshold, or another event that may cause the loss of data stored in a volatile memory 1013.

In one embodiment, a restart event comprises the act of the host 110 commencing processing after an event that may cause the loss of data stored within a volatile memory of the host 110 or a component in the host 110. The host 110 may commence/resume processing once the restart condition or event has finished, a primary power source 136 is available, and the like.

The ACM 1011 may be configured to detect that a restart event/condition or other trigger has occurred and/or respond to a restart event or other trigger by initiating a recovery stage. During a recovery stage, the ACM 1011 may restore the data of the ACM 1011 to the state prior to the restart event or other trigger. Alternatively, or in addition, during the recovery stage, the ACM 1011 may complete processing of ACM data or ACM metadata 1015 needed to satisfy a guarantee that data in the ACM 1011 is available to ACM users 116 after the restart event or other trigger. Alternatively, or in addition, during the recovery stage, the ACM 1011 may complete processing of ACM data or ACM metadata 1015 needed to satisfy a guarantee that data in the ACM 1011 is committed after the restart event. As used herein, "commit" may mean that data in the ACM 1011 is protected from loss or corruption even after the restart event or other trigger and is persisted as required per the arming information associated with the data. In certain embodiments, the recovery stage includes processing ACM data and ACM metadata 1015 such that the ACM data is persisted, even though a restart event or other trigger occurred.

As used herein, a triggered commit action is a pre-configured commit action that is armed to be performed by the ACM 1011 in response to a triggering event (e.g., a restart event, a flush command, or other pre-determined event or trigger). In certain embodiments, the triggered commit action persists at least enough ACM data and/or ACM metadata 1015 to make data of the ACM 1011 available after a system restart, to satisfy a guarantee of the ACM 1011 that the data will be accessible to an ACM user 116 after a restart event, or other trigger. In certain embodiments, this guarantee is satisfied, at least in part, by committing and/or persisting data of the ACM 1011 to non-volatile storage medium 122. A triggered commit action may be completed before, during, and/or after a restart event or other trigger. For example, the ACM 1011 may write ACM data and ACM metadata 1015 to a predefined temporary location in the non-volatile storage medium 122 during a hold-up time after a restart event, and may copy the ACM data back into the ACM buffers 1013, to an intended location in the non-volatile storage medium 122, or perform other processing once the restart event is complete.

A triggered commit action may be "armed" when the ACM 1011 is requested and/or a particular ACM buffer 1013 is allocated for use by a host 110. In some embodiments, an ACM 1011 may be configured to implement a triggered commit action in response to other, non-restart conditions. For example, an operation directed to a particular logical address (e.g., a poke), may trigger the ACM 1011, a flush operation may trigger the ACM 1011, or the like. This type of triggering may be used to commit the data of the ACM 1011 during normal operation (e.g., non-restart or non-failure conditions).

The arming may occur when an auto-commit buffer 1013 is mapped into the memory system 1018 of the host 110. Alternatively, arming may occur as a separate operation. As used herein, arming an auto-commit buffer 1013 comprises performing the necessary configuration steps needed to complete the triggered action when the action is triggered. Arming may include, for example, providing the ACM metadata 1015 to the ACM 1011 or the like. In certain embodiments, arming further includes performing the necessary configuration steps needed to complete a minimal set of steps for the triggered action, such that the triggered action is capable of completing after a trigger event. In certain embodiments, arming further includes verifying the arming data (e.g., verifying that the contents of the auto-commit buffer 1013, or portion thereof, can be committed as specified in the ACM metadata 1015) and verifying that the ACM 1011 is capable and configured to properly perform the triggered action without error or interruption.

The verification may ensure that once armed, the ACM 1011 can implement the triggered commit action when required. If the ACM metadata 1015 cannot be verified (e.g., the logical identifier or other ACM metadata 1015 is invalid, corrupt, unavailable, or the like), the arming operation may fail; memory semantic operations on the auto-commit buffer 1013 may not be allowed unit the auto-commit buffer 1013 is successfully armed with valid ACM metadata 1015. For example, an auto-commit buffer 1013 that is backed by a hard disk having a one-to-one mapping between LBA and physical address, may fail to arm if the LBA provided for the arming operation does not map to a valid (and operational) physical address on the disk. Verification in this case may comprise querying the disk to determine whether the LBA has a valid, corresponding physical address and/or using the physical address as the ACM metadata 1015 of the auto-commit buffer 1013.

The armed triggered commit actions may be implemented in response to the ACM 1011 (or other entity) detecting and/or receiving notification of a triggering event, such as a restart condition. In some embodiments, an armed commit action is a commit action that can be performed by the ACM 1011, and that requires little or no further communication with the host 110 or other devices external to the "isolation zone" of the ACM 1011 (discussed below). Accordingly, the ACM 1011 may be configured to implement triggered commit actions autonomously of the host 110 and/or other components thereof. The ACM 1011 may guarantee that triggered commit actions can be committed without errors and/or despite external error conditions. Accordingly, in some embodiments, the triggered commit actions of the ACM 1011 do not comprise and/or require potentially error-introducing logic, computations, and/or calculations. In some embodiments, a triggered commit action comprises committing data stored on the volatile ACM 1011 to a persistent storage location. In other embodiments, a triggered commit action may comprise additional processing of committed data, before, during, and/or after a triggering event, as described below. The ACM 1011 may implement pre-configured triggered commit actions autonomously; the ACM 1011 may be capable of implementing triggered commit actions despite failure or restart conditions in the host 110, loss of primary power, or another trigger. The ACM 1011 may implement triggered commit actions independently due to arming the ACM 1011 as described above.

The ACM metadata 1015 for an ACM buffer 1013, in certain embodiments, identifies the data of the ACM buffer 1013. For example, the ACM metadata 1015 may identify an owner 116 of the data, may describe the data itself, or the like. In one embodiment, an ACM buffer 1013 may have multiple levels of ACM metadata 1015, for processing by multiple entities or the like. The ACM metadata 1015 may include multiple nested headers that may be unpackaged upon restart, and used by various entities or commit agents 1020 to determine how to process the associated ACM data to fulfill the triggered commit action as described above. For example, the ACM metadata 1015 may include block metadata, file metadata, application level metadata (e.g., database system 116a metadata), process execution point or callback metadata, and/or other levels of metadata. Each level of metadata may be associated with a different commit agent 1020, or the like. In certain embodiments, the ACM metadata 1015 may include security data, such as a signature for an owner of the associated ACM data, a pre-shared key, a nonce, or the like, which the ACM 1011 may use during recovery to verify that a commit agent 1020, an ACM user 116, or the like is authorized to access committed ACM metadata 1015 and/or associated ACM data. In this manner, the ACM 1011 may prevent ownership spoofing or other unauthorized access. In one embodiment, the ACM 1011 does not release ACM metadata 1015 and/or associated ACM data until a requesting commit agent 1020, ACM user 116, or the like provides valid authentication, such as a matching signature or the like.

One or more commit agents 1020, in certain embodiments, process ACM data (e.g., transaction log entries) based on the associated ACM metadata 1015 to execute a triggered commit action. A commit agent 1020, in various embodiments, may comprise software, such as a device driver, a kernel module, the storage management layer 130, a thread, a user space application, or the like, and/or hardware, such as the controller 104. A commit agent may be configured to interpret ACM metadata 1015 and to process the associated ACM data (e.g., transaction log entries) according to the ACM metadata 1015. In embodiments with multiple commit agents 1020, the ACM metadata 1015 may identify one or more commit agents 1020 to process the associated ACM data (e.g., transaction log entries). The ACM metadata 1015 may identify a commit agent 1020, in various embodiments, by identifying a program/function of the commit agent 1020 to invoke (e.g., a file path of the program), by including computer executable code of the commit agent 1020 (e.g., binary code or scripts), by including a unique identifier indicating which of a set of registered commit agents 1020 to use, and/or by otherwise indicating a commit agent 1020 associated with committed ACM metadata 1015. The ACM metadata 1015, in certain embodiments, may be a functor or envelope which contains the information, such as function pointer and bound parameters for a commit agent 1020, to commit the ACM data (e.g., transaction log entries) upon restart recovery.

In one embodiment, a primary commit agent 1020 processes ACM metadata 1015, and hands-off or transfers ACM metadata 1015 and/or ACM data (e.g., transaction log entries) to one or more secondary commit agents 1020 identified by the ACM metadata 1015. A primary commit agent 1020, in one embodiment, may be integrated with the ACM 1011, the controller 104, or the like. An ACM user 116 or other third party, in certain embodiments, may provide a secondary commit agent 1020 for ACM data (e.g., transaction log entries) that the ACM user 116 or other third party owns, and the primary commit agent 1020 may cooperate with the provided secondary commit agent 1020 to process the ACM data. The one or more commit agents 1020 for ACM data (e.g., transaction log entries), in one embodiment, ensure and/or guarantee that the ACM data (e.g., transaction log entries) remains accessible to an owner 116 of the ACM data (e.g., transaction log entries) after a restart event. As described above with regard to triggered commit actions, a commit agent 1020 may process ACM metadata 1015 and associated ACM data (e.g., transaction log entries) to perform one or more triggered commit actions before, during, and/or after a trigger event, such as a failure or other restart event.

In one embodiment, a commit agent 1020, in cooperation with the ACM 1011 or the like, may store the ACM metadata 1015 in a persistent or non-volatile location (e.g., the non-volatile memory medium 122) in response to a restart or other trigger event. The commit agent 1020 may store the ACM metadata 1015 at a known location, may store pointers to the ACM metadata 1015 at a known location, may provide the ACM metadata 1015 to an external agent or data store, or the like so that the commit agent 1020 may process the ACM metadata 1015 and associated ACM data (e.g., transaction log entries) once the restart event or other trigger has completed. The known location may include one or more predefined logical block addresses or physical addresses of the non-volatile storage medium 122, a predefined file, or the like. In certain embodiments, hardware of the ACM 1011 is configured to cooperate to write the ACM metadata 1015 and/or pointers to the ACM metadata 1015 at a known location. In one embodiment, the known location may be a temporary location that stores the ACM data (e.g., transaction log entries) and ACM metadata 1015 until the host 110 has recovered from a restart event and the commit agent 1020 may continue to process the ACM data (e.g., transaction log entries) and ACM metadata 1015. In another embodiment, the location may be a persistent location associated with the ACM metadata 1015.

In response to completion of a restart event or other trigger, during recovery, in one embodiment, a commit agent 1020 may locate and retrieve the ACM metadata 1015 from the non-volatile storage medium 122, from a predefined location or the like. The commit agent 1020, in response to locating and retrieving the ACM metadata 1015, locates the ACM data (e.g., transaction log entries) associated with the retrieved ACM metadata 1015. The commit agent 1020, in certain embodiments, may locate the ACM data (e.g., transaction log entries) in a substantially similar manner as the commit agent 1020 locates the ACM metadata 1015, retrieving ACM data from a predefined location, retrieving pointers to the ACM data from a predefined location, receiving the ACM data from an external agent or data store, or the like. In one embodiment, the ACM metadata 1015 identifies the associated ACM data (e.g., transaction log entries) and the commit agent 1020 uses the ACM metadata 1015 to locate and retrieve the associated ACM data. For example, the commit agent 1020 may use a predefined mapping to associate ACM data with ACM metadata 1015 (e.g., the Nth piece of ACM data may be associated with the Nth piece of ACM metadata 1015 or the like), the ACM metadata 1015 may include a pointer or index for the associated ACM data, or another predefined relationship may exist between committed ACM metadata 1015 and associated ACM data. In another embodiment, an external agent may indicate to the commit agent 1020 where associated ACM data (e.g., transaction log entries) is located.

In response to locating and retrieving the ACM metadata 1015 and associated ACM data (e.g., transaction log entries), the commit agent 1020 may interpret the ACM metadata 1015 and process the associated ACM data based on the ACM metadata 1015. For example, in one embodiment, the ACM metadata 1015 may identify a block storage volume and LBA(s) where the commit agent 1020 is to write the ACM data (e.g., transaction log entries) upon recovery. In another embodiment, the ACM metadata 1015 may identify an offset within a file within a file system where the commit agent 1020 is to write the ACM data (e.g., transaction log entries) upon recovery. In a further embodiment, the ACM metadata 1015 may identify an application specific persistent object where the commit agent 1020 is to place the ACM data (e.g., transaction log entries) upon recovery, such as a database record or the like. The ACM metadata 1015, in an additional embodiment, may indicate a procedure for the commit agent 1020 to call to process the ACM data (e.g., transaction log entries), such as a delayed procedure call or the like. In an embodiment where the ACM 1011 advertises or presents volatile ACM buffers 1013 as non-volatile storage, the ACM metadata 1013 may identify an ACM buffer 1013 where the commit agent 1020 is to write the ACM data (e.g., transaction log entries) upon recovery.

In certain embodiments, the ACM metadata 1015 may identify one or more secondary commit agents 1020 to further process the ACM metadata 1015 and/or associated ACM data (e.g., transaction log entries). A secondary commit agent 1020 may process ACM metadata 1015 and associated ACM data (e.g., transaction log entries) in a substantially similar manner to the commit agent 1020 described above. Each commit agent 1020 may process ACM data (e.g., transaction log entries) in accordance with a different level or subset of the ACM metadata 1015, or the like. The ACM metadata 1015 may identify a secondary commit agent 1020, in various embodiments, by identifying a program/function of the secondary commit agent 1020 to invoke (e.g., a file path of the program), by including computer executable code of the secondary commit agent 1020, by including a unique identifier indicating which of a set of registered secondary commit agents 1020 to use, and/or by otherwise indicating a secondary commit agent 1020 associated with committed ACM metadata 1015.

In one embodiment, a secondary commit agent 1020 processes a remaining portion of the ACM metadata 1015 and/or of the ACM data (e.g., transaction log entries) after a previous commit agent 1020 has processed the ACM metadata 1015 and/or the ACM data. In a further embodiment, the ACM metadata 1015 may identify another non-volatile medium separate from the ACM 1011 for the secondary commit agent 1020 to persist the ACM data (e.g., transaction log entries) even after a host experiences a restart event. By committing the ACM metadata 1015 and the associated ACM data (e.g., transaction log entries) from the ACM buffers 1013 in response to a trigger event, such as a failure or other restart condition, and processing the ACM metadata 1015 and the associated ACM data once the trigger event has completed or recovered, the ACM 1011 may guarantee persistence of the ACM data and/or performance of the triggered commit action(s) defined by the ACM metadata 1015.

The ACM 1011 is communicatively coupled to a host 110 (e.g., over the network 115, over a bus, or the like), which, like the host computing device 110 described above, may comprise one or more database systems 116a, operating systems 116, virtual machines 116, applications 116, a processor complex 111, a central processing unit 111 (CPU), and the like. In the FIG. 2 example, these entities are referred to generally as ACM users 116. Accordingly, as used herein, an ACM user 116 may refer to a database system, an operating system, a virtual machine operating system (e.g., hypervisor), an application, a library, a CPU fetch-execute algorithm, or other program or process.

A database system 116a, as described above, may comprise software and/or hardware configured to store and/or provide organized access to data. A database system 116a may allow other clients 116 or users 116 to define, create, query, update, and/or administer databases, tables, or other collections of data, using a query language, a graphical user interface (GUI), a command line interface (CLI), or the like. A database system 116a may organize data according to one or more models, such as a relational model, a hierarchical model, an object model, a document model, an entity-relationship model, an entity-attribute-value model, and/or another model. As described above, a database system 116a may record certain transactions in a database log or other transaction log data structure. Recording transactions in transaction log may allow a storage client 116 such as a database client 116a to undo and/or redo one or more transactions, to recreate data (e.g., one or more volatile data structures lost due to a restart event of other trigger), as a backup or redundant copy of data, to replay and apply transactions on a copy of data in another location, or the like.

The ACM 1011 may be communicatively coupled to the host 110 (as well as the ACM users 116) via a network 115, a bus, such as a system bus, a processor's memory exchange bus, or the like (e.g., HyperTransport, QuickPath Interconnect (QPI), PCI bus, PCI-e bus, or the like). In some embodiments, a bus comprises the primary power connection 136 (e.g., the non-volatile storage device 102 may be powered over a communication bus).

The ACM 1011 may be tightly coupled to the device used to perform the triggered commit actions (e.g., the non-volatile storage device 102). For example, the ACM 1011 may be implemented on the same device, peripheral, card, or within the same "isolation zone" as the controller 104 and/or secondary power source 124. The tight coupling of the ACM 1011 to the components used to implement the triggered commit actions defines an "isolation zone," which may provide an acceptable level of assurance (e.g., based on industry standards and/or another metric) that the ACM 1011 is capable of implementing the triggered auto-commit actions in the event of a restart condition or other trigger. In the FIG. 2 example, the isolation zone of the ACM 1011 is provided by the tight coupling of the ACM 1011 with the autonomous controller 104 and secondary power supply 124.

The controller 104 may comprise an I/O controller, such as a network controller (e.g., a network interface controller), storage controller, dedicated restart condition controller or ACM controller, or the like. The controller 104 may comprise firmware, hardware, a combination of firmware and hardware, or the like. In the FIG. 2 example, the controller 104 comprises a storage controller, such as the storage controller 104 and/or non-volatile storage device controller described above. The controller 104 may be configured to operate independently of the host 110. As such, the controller 104 may be used to implement the triggered commit action(s) of the ACM 1011 despite the restart conditions discussed above, such as failures in the host 110 (and/or ACM users 116) and/or loss of the primary power connection 136.

The ACM 1011, in the depicted embodiment, is powered by a primary power connection 136, which may be provided by an external power supply, an internal power supply unit (PSU), a system bus, the host 110, or the like. In certain embodiments, the ACM 1011 also includes and/or is coupled to a secondary power source 124. The secondary power source 124 may power the ACM 1011 in the event of a failure to the primary power connection 136, and/or another trigger. The secondary power source 124 may be capable of providing at least enough power to enable the ACM 1011 and/or controller 104 to autonomously implement at least a portion of a pre-configured triggered commit action(s) when the primary power connection 136 has failed, fallen below a threshold, or the like. The ACM 1011, in one embodiment, commits or persists at least enough data (e.g., ACM data and/or ACM metadata 1015) while receiving power from the secondary power source 124, to allow access to the data once the primary power connection 136 has been restored. In certain embodiments, as described above, the ACM 1011 may perform at least a portion of the pre-configured triggered commit action(s) after the primary power connection 136 has been restored, using one or more commit agents 1020 or the like.

The ACM 1011 may comprise one or more volatile memory buffers 1013. In the FIG. 2 example, the ACM 1011 includes one or more volatile auto-commit buffers 1013. The auto-commit buffers 1013 may be implemented using a volatile Random Access Memory (RAM). In some embodiments, the auto-commit buffers 1013 may be embodied as independent components of the ACM 1011 (e.g., in separate RAM modules). Alternatively, the auto-commit buffers 1013 may be implemented on embedded volatile memory (e.g., BRAM) available within the controller 104, a processor complex 111, an FPGA, or other component of the ACM 1011.

Each of the auto-commit buffers 1013 may be pre-configured (armed) with a respective triggered commit action. In some embodiments, each auto-commit buffer 1013 may comprise its own, respective ACM metadata 1015. The ACM metadata 1015, in some embodiments, identifies how and/or where the data stored on the auto-commit buffer 1013 is to be committed. In some examples, the ACM metadata 1015 may comprise a logical identifier (e.g., an object identifier, logical block address (LBA), file name, storage client 116 identifier, or the like) associated with the data in the auto-commit buffer 1013. The logical identifier may be predefined. In one embodiment, when an auto-commit buffer 1013 is committed, the data therein may be committed with the ACM metadata 1015 (e.g., the data may be stored at a physical storage location corresponding to the logical identifier, in association with the logical identifier, with the logical identifier, or the like). To facilitate committing of ACM data (e.g., transaction log entries) during a hold-up time after a restart event or other trigger, the ACM 1011 may write ACM data and ACM metadata 1015 in a single atomic operation, such as a single page write or the like. To permit writing of ACM and ACM metadata 1015 in a single atomic operation, the ACM buffers 1013 may be sized to correspond to a single write unit for a non-volatile storage medium that is used by the ACM 1011. In some embodiments, the ACM metadata 1015 may comprise a network address, an LBA, or another identifier of a commit location for the data.

In a further embodiment, a logical identifier may associate data of an auto-commit buffer 1013 with an owner of the data, such as a database system 116 or other storage client 116, so that the data and the owner maintain the ownership relationship after a restart event. For example, the logical identifier may identify an application, an application type, a process ID, an ACM user 116, or another entity of a host device 110, so that the ACM data (e.g., transaction log entries) is persistently associated with the identified entity. In one embodiment, a logical identifier may be a member of an existing namespace, such as a file system namespace, a user namespace, a process namespace, a logical address space 134, or the like. In other embodiments, a logical identifier may be a member of a new or separate namespace, such as an ACM namespace. For example, a globally unique identifier namespace, as may be used in distributed systems for identifying communicating entities, may be used as an ACM namespace for logical identifiers. The ACM 1011 may process committed ACM data (e.g., transaction log entries) according to a logical identifier for the data once a restart event has completed. For example, the ACM 1011 may commit the ACM data (e.g., transaction log entries) to a logical identifier associated with a temporary location in response to a restart event or other trigger, and may write the ACM data (e.g., transaction log entries) to a persistent location identified by another logical identifier during recovery after the restart event.

As described above, the ACM 1011 may be tightly coupled with the components used to implement the triggered commit actions (e.g., the ACM 1011 is implemented within an "isolation zone"), which ensures that the data on the ACM 1011 will be committed in the event of a restart condition. As used herein, a "tight coupling" refers to a configuration wherein the components used to implement the triggered commit actions of the ACM 1011 are within the same "isolation zone," or two or more distinct trusted "isolation zones," and are configured to operate despite external failure or restart conditions, such as the loss of power, invalid shutdown, host 110 failures, or the like. FIG. 2 illustrates a tight coupling between the ACM 1011, the auto-commit buffers 1013, the controller 104, which is configured to operate independently of the host 110, and the secondary power source 124, which is configured to power the controller 104 and the ACM 1011 (including the auto-commit buffers 1013) while the triggered commit actions are completed. Examples of a tight coupling include but are not limited to including the controller 104, the secondary power source 124, and the auto-commit buffers 1013 on a single printed circuit board (PCB), within a separate peripheral and/or appliance in electronic communication with the host 110, or the like. In other embodiments, the ACM 1011 may be tightly coupled to a different set of components (e.g., redundant host devices, redundant communication buses, redundant controllers, alternative power supplies, or the like).

The ACM 1011 may be accessible by the host 110 and/or ACM users 116 running thereon. Access to the ACM 1011 may be provided using memory access semantics, such as CPU load/store commands, DMA commands, 3rd party DMA commands, RDMA commands, atomic test and set commands, manipulatable memory pointers, network requests, or the like. In some embodiments, memory semantic access to the ACM 1011 is implemented over the network 115 (e.g., using RDMA and/or Infiniband), over a bus (e.g., using a PCI-e BAR as described below), or the like.

In a memory semantic paradigm, ACM users 116 running on the host 110 may access the ACM 1011 via a memory system 1018 of the host 110. The memory system 1018 may comprise a memory management unit, virtual memory system, virtual memory manager, virtual memory subsystem (or similar memory address space) implemented by an operating system, a virtualization system (e.g., hypervisor), an application, or the like. A portion of the ACM 1011 (e.g., one or more auto-commit buffers 1013) may be mapped into the memory system 1018, such that memory semantic operations implemented within the mapped memory address range (ACM address range 1021) are performed on the ACM 1011.

The storage management layer 130, in certain embodiments, allocates and/or arbitrates the storage capacity of the ACM 1011 between multiple ACM users 116, using a resource management agent or the like. The resource management agent of the storage management layer 130 may comprise a kernel module provided to an operating system of the host device 110, a device driver, a thread, a user space application, or the like. In one embodiment, the resource management agent determines how much storage capacity of the ACM buffers 1013 to allocate to an ACM user 116 and how long the allocation is to last. Because, in certain embodiments, the ACM 1011 commits or persists data across restart events, the resource management agent may allocate storage capacity of ACM buffers 1013 across restart events.

The resource management agent may assign different ACM buffers 1013 to different ACM users 116, such as different kernel and/or user space applications. The resource management agent may allocate ACM buffers 1013 to different usage types, may map ACM buffers 1013 to different non-volatile storage medium 122 locations for destaging, or the like. In one embodiment, the resource management agent may allocate the ACM buffers 1013 based on commit agents 1020 associated with the ACM buffers 1013 by the ACM metadata 1015 or the like. For example, a master commit agent 1020 may maintain an allocation map in ACM metadata 1015 identifying allocation information for ACM buffers 1013 of the ACM 1011 and identifying, in one embodiment, one or more secondary commit agents 1020, and the master commit agent 1020 may allocate a portion of the ACM buffers 1013 to each of the secondary commit agents 1020. In another embodiment, commit agents 1020 may register with the resource management agent, may request resources such as ACM buffers 1013 from the resource management agent, or the like. The resource management agent may use a predefined memory management policy, such as a memory pressure policy or the like, to allocate and arbitrate ACM buffer 1013 storage capacity between ACM users 116.

In some embodiments, establishing an association between an ACM address range 1021 within the memory system 1018 and the ACM 1011 may comprise pre-configuring (arming) the corresponding auto-commit buffer(s) 1013 with a triggered commit action. As described above, this pre-configuration may comprise associating the auto-commit buffer 1013 with a logical identifier or other metadata, which may be stored in the ACM metadata 1015 of the buffer 1013. As described above, the ACM 1011 may be configured to commit the buffer data to the specified logical identifier in the event of a restart condition, or to perform other processing in accordance with the ACM metadata 1015.

Memory semantic access to the ACM 1011 may be implemented using any suitable address and/or device association mechanism. In some embodiments, memory semantic access is implemented by mapping one or more auto-commit buffers 1013 of the ACM 1011 into the memory system 1018 of the host 110. In some embodiments, this mapping may be implemented over the network 115, using a bus, or the like. For example, a bus may comprise a PCI-e (or similar) communication bus, and the mapping may comprise associating a Base Address Register (BAR) of an auto-commit buffer 1013 of the ACM 1011 on the bus with the ACM address range 1021 in the memory system 1018 (e.g., the host 110 mapping a BAR into the memory system 1018).

The association may be implemented by an ACM user 116 (e.g., by a virtual memory system of an operating system or the like), through an API of a storage layer, such as the storage management layer (SML) 130. The storage management layer 130 may be configured to provide access to the auto-commit memory 1011 to ACM users 116. The storage management layer 130 may comprise a driver, kernel-level application, user-level application, library, or the like. The storage management layer 130 may provide a SML API 132 comprising, inter alia, an API for mapping portions of the auto-commit memory 1011 into the memory system 1018 of the host 110, for unmapping portions of the auto-commit memory 1011 from the memory system 1018 of the host 110, for flushing the ACM buffers 1013, for accessing and managing transaction log data structures using the acceleration module 150, or the like.

The storage management layer 130 may be configured to maintain metadata 135, which may include a forward index 134 comprising associations between logical identifiers of a logical address space and physical storage locations on the auto-commit memory 1011 and/or persistent storage medium 122. In some embodiments, ACM 1011 may be associated with one or more virtual ranges that map to different address ranges of a BAR (or other addressing mechanism). The virtual ranges may be accessed (e.g., mapped) by different ACM users 116. Mapping or exposing a PCI-e ACM BAR to the host memory 1018 may be enabled on demand by way of a SML API 132 call.

The SML API 132 may comprise interfaces for mapping an auto-commit buffer 1013 into the memory system 1018. In some embodiments, the SML API 132 may extend existing memory management interfaces, such as malloc, calloc, or the like, to map auto-commit buffers 1013 into the virtual memory range of ACM user applications 116 (e.g., a malloc call through the SML API 132 may map one or more auto-commit buffers 1013 into the memory system 1018). Alternatively, or in addition, the SML API 132 may comprise one or more explicit auto-commit mapping functions, such as "ACM alloc," "ACM free," or the like. Mapping an auto-commit buffer 1013 may further comprise configuring a memory system 1018 of the host to ensure that memory operations are implemented directly on the auto-commit buffer 1013 (e.g., prevent caching memory operations within a mapped ACM address range 1021).

The association between the ACM address range 1021 within the host memory system 1018 and the ACM 1011 may be such that memory semantic operations performed within a mapped ACM address range 1021 are implemented directly on the ACM 1011 (e.g., without intervening system RAM, or other intermediate memory, in a typical write commit operation, additional layers of system calls, or the like). For example, a memory semantic write operation implemented within the ACM address range 1021 may cause data to be written to the ACM 1011 (e.g., on one or more of the auto-commit buffers 1013). Accordingly, in some embodiments, mapping the ACM address range 1021 may comprise disabling caching of memory operations within the ACM address range 1021, such that memory operations are performed on an ACM 1011 and are not cached by the host (e.g., cached in a CPU cache, in host volatile memory, or the like). Disabling caching within the ACM address range 1021 may comprise setting a "non-cacheable" flag attribute associated with the ACM range 1021, when the ACM range 1021 is defined.

As discussed above, establishing an association between the host memory system 1018 and the ACM 1011 may comprise "arming" the ACM 1011 to implement a predetermined triggered commit action. The arming may comprise providing the ACM 1011 with a logical identifier (e.g., a logical block address, a file name, a network address, a stripe or mirroring pattern, or the like). The ACM 1011 may use the logical identifier to arm the triggered commit action. For example, the ACM 1011 may be triggered to commit data to a persistent storage medium using the logical identifier (e.g., the data may be stored at a physical address corresponding to the logical identifier and/or the logical identifier may be stored with the data in a log-based data structure). Arming the ACM 1011 allows the host 110 to view subsequent operations performed within the ACM address range 1021 (and on the ACM 1011) as being "instantly committed," enabling memory semantic write granularity (e.g., byte level operations) and speed with instant commit semantics.

Memory semantic writes such as a "store" operation for a CPU are typically synchronous operations such that the CPU completes the operation before handling a subsequent operation. Accordingly, memory semantic write operations performed in the ACM memory range 1021 can be viewed as "instantly committed," obviating the need for a corresponding "commit" operation in the write-commit operation, which may significantly increase the performance of ACM users 116 affected by write-commit latency. The memory semantic operations performed within the ACM memory range 1021 may be synchronous. Accordingly, ACM 1011 may be configured to prevent the memory semantic operations from blocking (e.g., waiting for an acknowledgement from other layers, such as the bus, or the like). Moreover, the association between ACM address range 1021 and the ACM 1011 allow memory semantic operations to bypass system calls (e.g., separate write and commit commands and their corresponding system calls) that are typically included in write-commit operations.

Data transfer between the host 110 and the ACM 1011 may be implemented using any suitable data transfer mechanism including, but not limited to: the host 110 performing processor JO operations (PIO) with the ACM 1011 via the bus; the ACM 1011 (or other device) providing one or more DMA engines or agents (data movers) to transfer data between the host 110 and the ACM 1011; the host 110 performing processor cache write/flush operations; or the like.

As discussed above, an ACM may be configured to automatically perform a pre-configured triggered commit action in response to detecting certain conditions (e.g., restart or failure conditions, or another trigger). In some embodiments, the triggered commit action may comprise committing data stored on the ACM 110 to a persistent storage medium 122. Accordingly, in some embodiments, the ACM 1011 may comprise and/or be in communication with a persistent storage medium 122.

The ACM 1011 may be integrated with and/or tightly coupled to the non-volatile storage device 102 and/or the controller 104. The controller 104, in the depicted embodiment, comprises a write data pipeline 106 and a read data pipeline 108. The non-volatile storage device 102 may be capable of persisting data on a non-volatile storage medium 122, such as NAND flash or another solid-state storage medium.

The data on the ACM 1011 may be committed to the persistent storage 122 in accordance with the ACM metadata 1015, such as a logical identifier or the like. The ACM 1011, in certain embodiments, may commit the data to a temporary location for further processing after a restart event, may commit the data to a final intended location, or the like as, described above. In embodiments where the non-volatile storage medium 122 is a sequential storage device, committing the data may comprise storing the logical identifier or other ACM metadata 1015 with the contents of the auto-commit buffer 1013 (e.g., in a packet or container header), to an append point of a sequential, log-based writing structure, or the like. In embodiments where the non-volatile storage medium 122 comprises magnetic media (e.g., a hard disk drive) or the like having a 1:1 mapping between logical identifier and physical address, the contents of the auto-commit buffer 1013 may be committed to the storage location to which the logical identifier maps. Since the logical identifier or other ACM metadata 1015 associated with the data is pre-configured (e.g., armed), the ACM 1011 may implement a triggered commit action independently of the host 110. The secondary power supply 124 may supply power to the volatile auto-commit buffers 1013 of the ACM 1011 until the triggered commit actions are completed (e.g., confirmed to be completed), until the triggered commit actions are performed to a point at which the ACM 1011 may complete the triggered commit actions during recovery after a restart event, or the like.

In some embodiments, the ACM 1011 commits data in a way that maintains an association between the data and its corresponding logical identifier (per the ACM metadata 1015). In embodiments where the non-volatile storage medium 122 comprises a hard disk, the data may be committed to a storage location corresponding to the logical identifier, which may be outside of the isolation zone 1301 described below (e.g., using a logical identifier to physical address conversion). In other embodiments in which the non-volatile storage medium 122 comprises a sequential medium, such as a solid-state storage medium, the data may be stored sequentially and/or in a log-based format as described above. A sequential storage operation may comprise storing the contents of an auto-commit buffer 1013 with a corresponding logical identifier (e.g., as indicated by the ACM metadata 1015). In one embodiment, the data of the auto-commit buffer 1013 and the corresponding logical identifier are stored together on the medium 122 according to a predetermined pattern. In certain embodiments, the logical identifier is stored before the contents of the auto-commit buffer 1013. The logical identifier may be included in a header of a packet comprising the data, or in another sequential and/or log-based format. The association between the data and logical identifier may allow a data index to be reconstructed, or the like.

As described above, the auto-commit buffers 1013 of the ACM 1011 may be mapped into the memory system 1018 of the host 110, enabling the ACM users 116 of access these buffers 1013 using memory access semantics. In some embodiments, the mappings between logical identifiers and auto-commit buffers 1013 may leverage a virtual memory system of the host 110.

For example, an address range within the memory system 1018 may be associated with a "memory mapped file." A memory mapped file may comprise a virtual memory abstraction in which a file, portion of a file, or block device is mapped into the memory system 1018 address space for more efficient memory semantic operations on data of the non-volatile storage device 102. An auto-commit buffer 1013 may be mapped into the host memory system 1018 as a memory mapped file or a similar abstraction. The ACM memory range 1021 may, therefore, be represented by a memory mapped file. The backing file may be stored on the non-volatile storage medium 122 within the isolation zone 1301 (See FIG. 5 below) or another network attached non-volatile storage device 102 also protected by an isolation zone 1301. The auto-commit buffers 1013 may correspond to a file, a portion of a file (e.g., the file itself may be very large, exceeding the capacity of the auto-commit buffers 1013 and/or the non-volatile storage medium 122), or the like.

When a portion of a file is mapped to an auto-commit buffer 1013, the ACM user 116 (or other entity) may identify a desired offset within the file and the range of blocks in the file that will operate with ACM characteristics (e.g., have ACM semantics). This offset may have a predefined logical identifier and the logical identifier and range may be used to trigger committing the auto-commit buffer(s) 1013 mapped within the file. Alternatively, a separate offset for a block (or range of blocks) into the file may serve as a trigger for committing the auto-commit buffer(s) 1013 mapped to the file. For example, a memory operation (e.g., load, store, poke, or the like) being performed on data in the separate offset or range of blocks may comprise a trigger event that causes the auto-commit buffer(s) 1013 mapped to the file to be committed.

The underlying logical identifier may change, however (e.g., due to changes to other portions of the file, file size changes, or the like). When a change occurs, the storage management layer 130 (e.g., via the SML API 132, an ACM user 116, the acceleration module 150, or other entity) may update the ACM metadata 1015 of the corresponding auto-commit buffers 1013. In some embodiments, the storage management layer 130 may be configured to query the host 110 (e.g., database system 116*a*, operating system, hypervisor, or other application 116) for updates to the logical identifier of files associated with auto-commit buffers 1013. The queries may be initiated by the SML API 132 and/or may be provided as a hook (e.g., callback mechanism) into the host 110. When the ACM user 116 no longer needs the auto-commit buffer 1013, the storage management layer 130 may de-allocate the buffer 1013 as described above. De-allocation may further comprise informing the host 110 that updates to the logical identifier are no longer needed, or the like.

In some embodiments, a file may be mapped across multiple storage devices (e.g., the storage devices may be formed into a RAID group, may comprise a virtual storage device, or the like). Associations between auto-commit buffers 1013 and the file may be updated to reflect the file mapping. This may allow the auto-commit buffers 1013 to commit the data to the proper storage device. The ACM metadata 1015 of the auto-commit buffers 1013 may be updated in response to changes to the underlying file mapping and/or partitioning as described above. Alternatively, the file may be "locked" to a particular mapping or partition while the auto-commit buffers 1013 are in use. For example, if a remapping/repartitioning of a file is required, the corresponding auto-commit buffers 1013 may commit data to the file, and then be re-associated with the file under the new mapping/partitioning scheme. The SML API 132 may comprise interfaces and/or commands for using the storage management layer 130 to lock a file, release a file, and/or update ACM metadata 1015 in accordance with changes to a file.

Committing the data to solid-state and/or non-volatile storage 122 may comprise the storage controller 104 accessing data from the ACM 1011 auto-commit buffers 1013, associating the data with the corresponding logical identifier (e.g., labeling the data), and/or injecting the labeled data into the write data pipeline 106. In some embodiments, to ensure there is a page program command capable of persisting the ACM data (e.g., transaction log entries), the storage controller 104 maintains two or more pending page programs during operation. The ACM data (e.g., transaction log entries) may be committed to the non-volatile storage medium 122 before writing the power loss identifier (power-cut fill pattern) described above.

Although a single auto-commit memory 1011 is depicted, in other embodiments, the system 1100 may comprise a plurality of auto-commit memories 1011. In the FIG. 4 example, memory semantic accesses implemented by the host 110 may be stored on a plurality of ACMs 1011. In some embodiments, host data may be mirrored between multiple ACMs 1011. The mirroring may be implemented using a multi-cast bus, rebroadcasting data from a first ACM 1011 to a second ACM 1011, or the like. The ACMs 1011 may be local to one another (e.g., on the same local bus), on different systems or hosts 110 in communication over the network 115, or the like.

Figure 3:
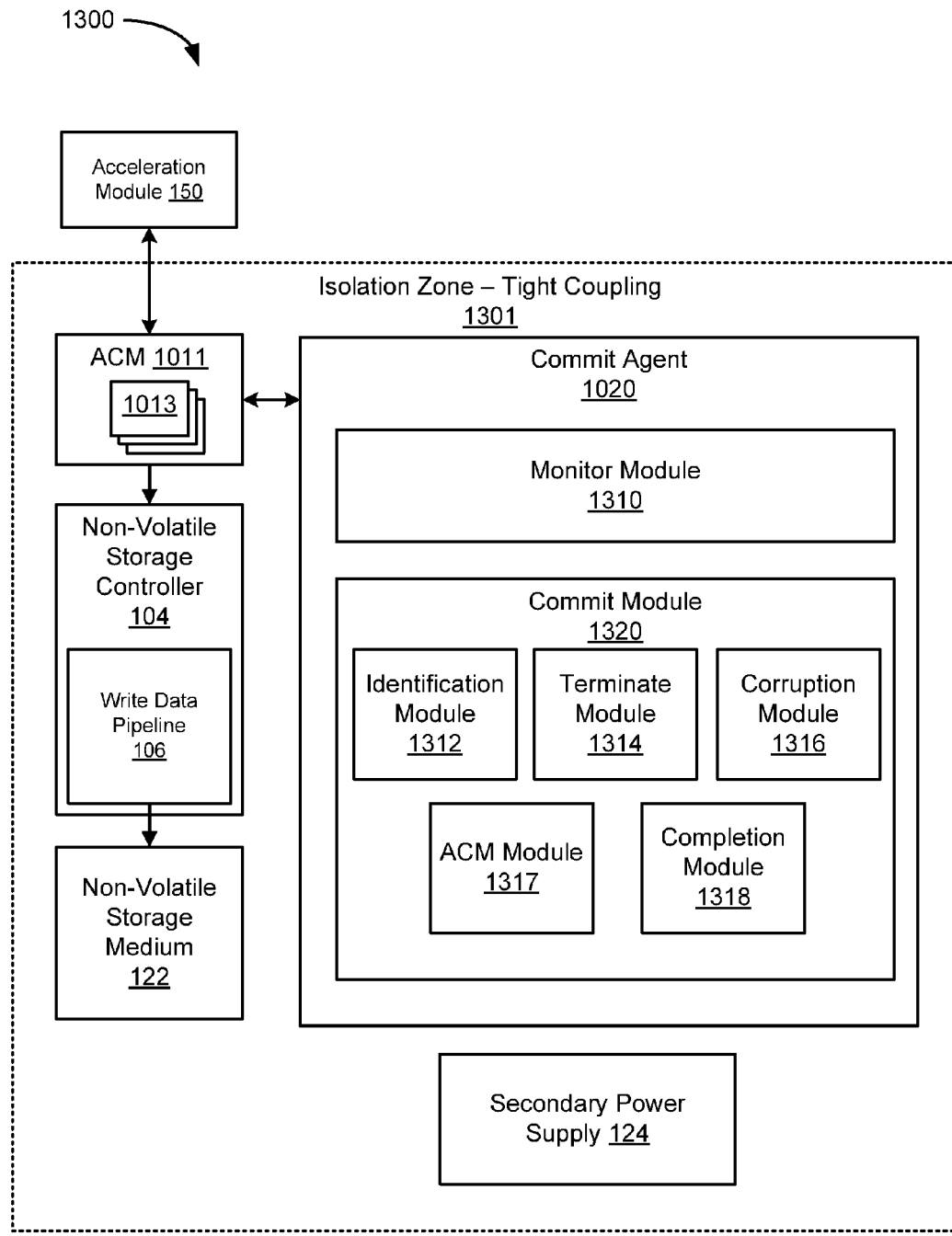
FIG. 3 is a block diagram illustrating a further embodiment of a system for transaction log acceleration.

FIG. 3 is a block diagram 1300 of one embodiment of a commit agent 1020 within an isolation zone 1301. The commit agent 1020 may be tightly coupled (e.g., within an isolation zone 1301) to the auto-commit memory 1011, the non-volatile storage controller 104, the non-volatile storage medium 122, and/or the secondary power supply 124, one or more of which may be in communication with and/or may cooperate with the acceleration module 150 to provide transaction log acceleration. The tight coupling may comprise implementing one or more of these components 1122, 1011, 104, 122, and/or 124 on the same die, in the same peripheral device, on the same card (e.g., the same PCB), on the same network appliance, within a pre-defined isolation zone 1301, or the like. The tight coupling may ensure that the triggered commit actions of the ACM buffers 1013 are committed in the event of a restart condition or other trigger.

The commit agent 1020, in the depicted embodiment, includes a monitor module 122, which may be configured to detect restart conditions or another trigger, such as power loss or the like, on the primary power connection 136 or the like. The monitor module 122 may be configured to sense or detect triggering events, such as restart conditions (e.g., shutdown, restart, power failures, communication failures, host or application failures, a power level that fails to satisfy a threshold, or the like) and, in response, to cause the commit module 1320 to initiate the commit loss mode of the commit agent 1020 (e.g., failure loss mode) and/or to trigger the operations of other modules, such as modules 1312, 1314, 1316, 1317, and/or 1318. The commit module 1320, in the depicted embodiment, includes an identification module 1312, a terminate module 1314, a corruption module 1316, and a completion module 1318.

The identification module 1312 may be configured to identify triggered commit actions to be performed for each ACM buffer 1013 of the ACM 1011. The identification module 1312 may prioritize operations based on relative importance, with acknowledged operations being given a higher priority than non-acknowledged operations. The contents of auto-commit buffers 1013 that are armed to be committed may be assigned a high priority due to the "instant commit" semantics supported thereby. In some embodiments, the ACM triggered commit actions may be given a higher priority than the acknowledged contents of the write data pipeline 106. Alternatively, the contents of armed auto-commit buffers 1013 may be assigned the "next-highest" priority, or the like. The priority assignment may be user configurable (e.g., via an API, IO control (IOCTL) command, GUI, CLI, or the like).

The termination module 1314 may terminate non-essential operations to allow "essential" to continue. The termination module 1314 may be configured to hold up portions of the ACM 1011 that are "armed" to be committed (e.g., armed auto-commit buffers), and may terminate power to non-armed (unused) portions of the auto-commit memory 1011. The termination module 1314 may be further configured to terminate power to portions of the ACM 1011 (e.g., individual auto-commit buffers 1013) as the contents of those buffers are committed.

The corruption module 1316 may identify corrupt (or potentially corrupt) data in the write data pipeline 106. The corruption module 1316 may be further configured to identify corrupt ACM data 1011 (e.g., data that was written to the ACM 1011 during a power disturbance or other restart condition). The corruption module 1316 may be configured to prevent corrupt data on the ACM 1011 from being committed in a triggered commit action.

An ACM module 1317 may be configured to access armed auto-commit buffers in the auto-commit memory 1011, identify the ACM metadata 1015 associated therewith (e.g., label the data with the corresponding logical identifier per the ACM metadata 1015), and inject the data (and/or metadata 1015) into the write data pipeline 106 of the non-volatile storage controller 104. In some embodiments, the logical identifier (or other ACM metadata 1015) of the auto-commit buffer 1013 may be stored in the buffer 1013 itself. In this case, the contents of the auto-commit buffer 1013 may be streamed directly into a sequential and/or log-based storage device 102 without first identifying and/or labeling the data. The ACM module 1317 may inject data before or after data currently in the write data pipeline 106. In some embodiments, data committed from the ACM 1011 is used to "fill out" the remainder of a write buffer of the write data pipeline 106 (e.g., after removing potentially corrupt data). If the remaining capacity of the write buffer is insufficient, the write buffer may be written to the non-volatile storage 122, and a next write buffer may be filled with the remaining ACM data.

As discussed above, in some embodiments, the non-volatile storage controller 104 may maintain an armed write operation (e.g., logical page write) to store the contents of the write data pipeline 106 in the event of power loss or another trigger. When used with an ACM 1011, two (or more) armed write operations (logical page writes) may be maintained to ensure the contents of both the write data pipeline 106, and all the armed buffers 1013 of the ACM 1011 can be committed in the event of a restart condition or another trigger. Because a logical page in a write buffer may be partially filled when a trigger event occurs, the write buffer may be sized to hold at least one more logical page of data than the total of all the data stored in all ACM buffers 1013 of the ACM 1011 and the capacity of data in the write data pipeline 106 that has been acknowledged as persisted. In this manner, there may be sufficient capacity in the write buffer to complete the persistence of the ACM 1011 in response to a trigger event. Accordingly, the auto-commit buffers 1013 may be sized according to the amount of data the ACM 1011 is capable of committing. Once this threshold is met, in certain embodiments, the storage management layer 130 may reject requests to use ACM buffers 1013 until more becomes available, may destage or otherwise move data from the ACM buffers 1013 to the non-volatile storage medium 122, or the like.

The completion module 1318 may be configured to flush the write data pipeline 106 regardless of whether the certain buffers, packets, and/or pages are completely filled. The completion module 1318 may be configured to perform the flush (e.g., and insert the related padding data) after data on the ACM 1011 (if any) has been injected into the write data pipeline 106. The completion module 1318 may be further configured to inject completion indicator into the write data pipeline 106, which may be used to indicate that a restart condition or other trigger occurred (e.g., a restart condition fill pattern). This fill pattern may be included in the write data pipeline 106 after injecting the triggered data from the ACM 1011, or the like.

As discussed above, the secondary power supply 124 may be configured to provide sufficient power to store the contents of the ACM 1011 as well as "in flight" or pending data in the write data pipeline 106. Storing this data may comprise one or more write operations (e.g., page program operations), in which data is persistently stored on the non-volatile storage medium 122. In the event a write operation fails, another write operation, on a different storage location, may be attempted. The attempts may continue until the data is successfully persisted on the non-volatile storage medium 122. The secondary power supply 124 may be configured to provide sufficient power for each of a plurality of such page program operations to complete. Accordingly, in certain embodiments, the secondary power supply 124 may be configured to provide sufficient power to complete double (or more) page program write operations as required to store the data of the ACM 1011 and/or write data pipeline 106.

Figure 4:
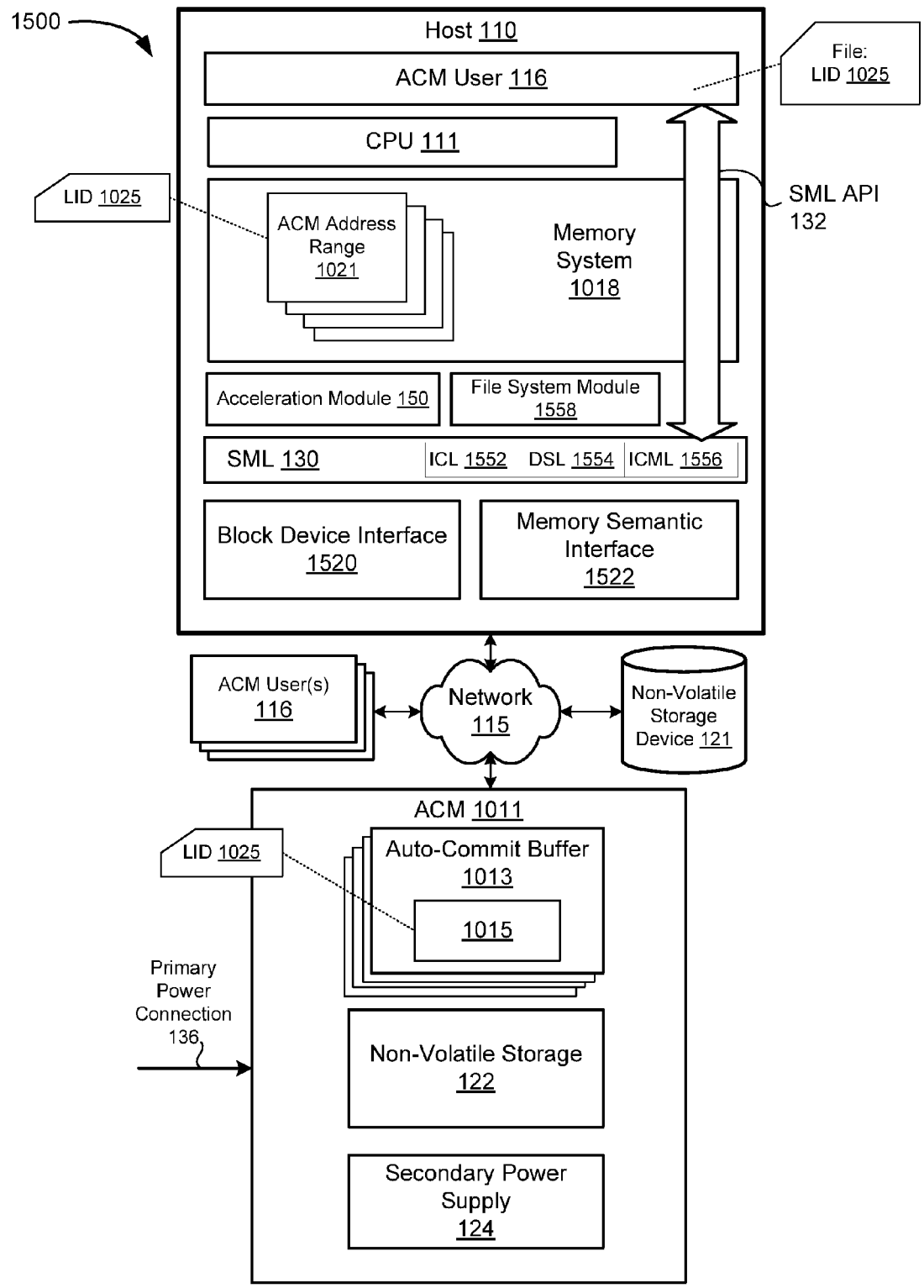
FIG. 4 is a block diagram illustrating an additional embodiment of a system for transaction log acceleration.

FIG. 4 is a block diagram 1500 depicting a host computing device 110 with an acceleration module 150 accessing an ACM 1011 using memory access semantics, providing transaction log acceleration in cooperation with a file system module 1558 and/or a storage management layer 130 (e.g., the storage management layer 130 described above). The host computing device 110 may comprise a processor complex/CPU 111, which may include, but is not limited to, one or more of a general purpose processor, an application-specific processor, a reconfigurable processor (e.g., FPGA), a processor core, a combination of processors, a processor cache, a processor cache hierarchy, or the like. In one embodiment, the processor complex 111 comprises a processor cache, and the processor cache may include one or more of a write combine buffer, an L1 processor cache, an L2 processor cache, an L3 processor cache, a processor cache hierarchy, and other types of processor cache. One or more ACM users 116 (e.g., operating systems, database systems 116a, applications, and so on) operate on the host 110.

The host 110 may be communicatively coupled to the ACM 1011 via the network 115, via a bus (e.g., a PCI-e bus), or the like. Portions of the ACM 1011 may be made accessible to the host 110 by mapping one or more auto-commit buffers 1013 into the memory system 1018 of the host 110. In some embodiments, mapping comprises associating an address range within the host memory system 1018 with an auto-commit buffer 1013 of the ACM 1011. These associations may be enabled using the SML API 132 and/or storage management layer 130 available on the host 110.

The storage management layer 130 may comprise libraries and/or provide interfaces (e.g., SML API 132) to implement the memory access semantics described above. The API 132 may be used to access the ACM 1011 using memory access semantics via a memory semantic access module 1522. Other types of access, such as access to the non-volatile storage 122, to the non-volatile storage device 121, or the like may be provided via a block device interface 1520 or the like.

The storage management layer 130 may be configured to memory map auto-commit buffers 1013 of the ACM 1011 into the memory system 1018 (via the SML API 132). The memory map may use a virtual memory abstraction of the memory system 1018. For example, a memory map may be implemented using a memory mapped file abstraction. In this example, the operating system (or application) 116 designates a file to be mapped into the memory system 1018. The file is associated with a logical identifier (LID) 1025 (e.g., logical block address, storage client 116 identifier), which may be maintained by a file system, an operating system 116, the acceleration module 150, or the like.

The memory mapped file may be associated with an auto-commit buffer 1013 of the ACM 1013. The association may be implemented by the storage management layer 130 using the network 115, a bus, or the like. The storage management layer 130 may associate the address range of the memory mapped file (e.g., in the memory system 1018) with a device address of an auto-commit buffer 1013 on the ACM 1011. In the FIG. 4 example, the ACM address range 1021 in the memory system 1018 is associated with the auto-commit buffer 1013.

As discussed above, providing memory access semantics to the ACM 1011 may comprise "arming" the ACM 1011 to commit data stored thereon in the event of failure or other restart. The pre-configured arming ensures that, in the event of a restart, data stored on the ACM 1011 will be committed to the proper logical identifier. The pre-configuration of the trigger condition enables applications 116 to access the auto-commit buffer 1013 using "instant-commit" memory access semantics. The logical identifier used to arm the auto-commit buffer may be obtained from an operating system, the memory system 1018 (e.g., virtual memory system), a storage client 116 such as a database system 116a, the acceleration module 150, or the like.

The storage management layer 130 may be configured to arm the auto-commit buffers 1013 with a logical identifier (e.g., automatically, by callback, and/or via the SML API 132). Each auto-commit buffer 1013 may be armed to commit data to a different logical identifier (e.g., different LBA, persistent identifier, or the like), which may allow the ACM 1011 to provide memory semantic access to a number of different, concurrent ACM users 116. In some embodiments, arming an auto-commit buffer 1013 comprises setting the ACM metadata 1015 with a logical identifier. In the FIG. 4 example, the ACM address range 1021 may be associated with the logical identifier 1025, and the ACM metadata 1015 of the associated auto-commit buffer may be armed with the corresponding logical identifier 1025.

The storage management layer 130 may arm an auto-commit buffer using an I/O control (IOCTL) command comprising the ACM address range 1021, the logical identifier 1025, and/or an indicator of which auto-commit buffer 1013 is to be armed. The storage management layer 130 (e.g., through the SML API 132) may provide an interface to disarm or "detach" the auto-commit buffer 1013. The disarm command may cause the contents of the auto-commit buffer 1013 to be committed as described above (e.g., committed to the non-volatile storage device 122). A detach may further comprise "disarming" the auto-commit buffer 1013 (e.g., clearing the ACM metadata 1015). The storage management layer 130 may be configured to track mappings between address ranges in the memory system 1018 and auto-commit buffers 1013 so that a detach command is performed automatically.

Alternatively, or in addition, the storage management layer 130 may be integrated into the operating system (and/or virtual operating system, e.g., hypervisor) of the host 110. This may allow the auto-commit buffers 1013 to be used by a virtual memory demand paging system. The operating system may (through the SML API 132 or other integration technique) map/arm auto-commit buffers for use by ACM users 116. The operating system may issue commit commands when requested by an ACM user 116 and/or its internal demand paging system. Accordingly, the operating system may use the ACM 1011 as another, generally available virtual memory resource.

Once an ACM user 116, the acceleration module 150, or the like has mapped the ACM address range 1021 to an auto-commit buffer 1013 and has armed the buffer 1013, the ACM user 116, the acceleration module 150, or the like may access the resource using memory access semantics, and may consider the memory accesses to be "logically" committed as soon as the memory access has completed. The ACM user 116 may view the memory semantic accesses to the ACM address range 1021 to be "instantly committed" because the ACM 1011 is configured to commit the contents of the auto-commit buffer (to the logical identifier 1025) regardless of experiencing restart conditions. Accordingly, the ACM user 116 may not be required to perform separate write and commit commands (e.g., a single memory semantic write is sufficient to implement a write-commit). Moreover, the mapping between the auto-commit buffer 1013 and the ACM 1011 disclosed herein removes overhead due to function calls, system calls, and even a hypervisor (if the ACM user 116 is running in a virtual machine) that typically introduce latency into the write-commit path. The write-commit latency time of the ACM user 116 may therefore be reduced to the time required to access the ACM 1011 itself.

The storage management layer 130 may be configured to provide a "consistency" mechanism for obtaining a consistent state of the ACM 1011 (e.g., a barrier, snapshot, or logical copy). The consistency mechanism may be implemented using metadata maintained by the storage management layer 130, which, as described above, may track the triggered auto-commit buffers 1013 in the ACM 1011. A consistency mechanism may comprise the storage management layer 130 committing the contents of all triggered auto-commit buffers 1013, such that the state of the persistent storage is maintained (e.g., store the contents of the auto-commit buffers 1013 on the non-volatile storage 122, or other persistent storage).

A DMA engine, RDMA engine, or the like may be used to perform bulk and/or low latency data transfers between an ACM user 116, the acceleration module 150, or the like and the ACM 1011. In some embodiments, the ACM 1011 may implement one or more DMA engines and/or RDMA engines, which may be allocated and/or accessed by ACM users 116 and/or the acceleration module 150 using the storage management layer 130 (e.g., through the SML API 132). The DMA engines may comprise local DMA transfer engines for transferring data on a local, system bus, RDMA transfer engines for transferring data using the network 115, or the like.

In some embodiments, the storage management layer 130 may comprise libraries and/or publish APIs adapted to a particular set of ACM users 116. For example, the storage management layer 130 may provide or cooperate with the acceleration module 150, which may be adapted for applications whose performance is tied to write-commit latency, such as transaction logs (e.g., a database system 116a, file system, and/or other transaction log client 116), store and forward messaging systems, persistent object caching, storage device metadata, and the like. The acceleration module 150 may provide an Instant Committed Log Library or the like for a persistent transaction log, or another interface for a different transaction log data structure.

The acceleration module 150 may provide mechanisms for mapping auto-commit buffers 1013 of the ACM 1011 into the memory system 1018 of an ACM user 116 as described above. ACM users 116 (or the acceleration module 150 itself) may implement an efficient "supplier/consumer" paradigm for auto-commit buffer 1013 allocation, arming, and access. For example, a "supplier" thread or process (e.g., in the application space of the ACM users 116) may be used to allocate and/or arm auto-commit buffers 1013 for the ACM user 116 (e.g., map auto-commit buffers 1013 to address ranges within the memory system 1018 of the host 110, arm the auto-commit buffers 1013 with a logical identifier, and so on). A "consumer" thread or process of the ACM user 116 and/or the acceleration module 150 may then accesses the pre-allocated auto-commit buffers 1013. In this approach, allocation and/or arming steps may be taken out of the write-commit latency path of the consumer thread. The consumer thread of the ACM user 116 and/or the acceleration module 150 may consider memory semantic accesses to the memory range mapped to the triggered auto-commit buffers 1013 (e.g., the ACM memory range 1021) as being "instantly committed" as described above.

Performance of the consumer thread(s) of the ACM user 116 and/or of the acceleration module 150 may be enhanced by configuring the supplier threads of the acceleration module 150 to allocate and/or arm auto-commit buffers 1013 in advance. When a next auto-commit buffer 1013 is needed, the ACM user 116 may have access to a pre-allocated/armed buffer 1013 from a pool maintained by the supplier. The supplier may also perform cleanup and/or commit operations when needed. For example, if data written to an auto-commit buffer 1013 is to be committed to persistent storage 122, a supplier thread (or another thread outside of the write-commit path) may cause the data to be committed (e.g., using the SML API 132). Committing the data may comprise reallocating and/or re-arming the auto-commit buffer 1013 for a consumer thread of the ACM user 116 as described above.

The "supplier/consumer" approach described above may be used to implement a "rolling buffer" for transaction logs or other data structures. An ACM user 116 may be configured to use a pre-determined amount of "rolling" data. For example, an ACM user 116 may implement a message queue that stores the "last 20 inbound messages" and/or the ACM user 116 may manage directives for a non-volatile storage device (e.g., persistent trim directives or the like). A supplier thread may allocate auto-commit buffers 1013 having at least enough capacity to hold the "rolling data" needed by the ACM user 116 (e.g., enough capacity to hold the last 20 inbound messages). A consumer thread may access the buffers 1013 using memory access semantics (load and store calls) as described above.

The SML API 132 (and/or supplier thread of the ACM user 116) may monitor the use of the auto-commit buffers 1013. When the consumer thread nears the end of its auto-commit buffers 1013, the supplier thread may re-initialize the "head" of the buffers 1013, by causing the data to be committed (e.g., if necessary), mapping the data to another range within the memory system 1018, and arming the auto-commit buffer 1013 with a corresponding logical identifier 1025. As the consumer continues to access the buffers 1013, the consumer stores new data at a new location that "rolls over" to the auto-commit buffer 1013 that was re-initialized by the supplier thread, and continues to operate. In some cases, data written to the rolling buffers 1013 described above may never be committed to persistent storage 122, 121 (e.g., unless a restart condition or other triggering condition occurs). Moreover, if the capacity of the auto-commit buffers 1013 is sufficient to hold the rolling data of the ACM user 116, the supplier threads may not have to perform re-initialize/re-arming described above. Instead, the supplier threads may simply re-map auto-commit buffers 1013 that comprise data that has "rolled over" (and/or discard the "rolled over" data therein).

In its simplest form, a rolling buffer may comprise two ACM buffers 1013, and the storage management layer 130 may write to one ACM buffer 1013 for an ACM user 116 while destaging previously written data from the other ACM buffer 1013 to a storage location, such as the non-volatile storage medium 122 or the like. In response to filling one ACM buffer 1013 and completing a destaging process of the other ACM buffer 1013, the storage management layer 130 may transparently switch the two ACM buffers 1013 such that the ACM user 116 writes to the other ACM buffer 1013 during destaging of the one ACM buffer 1013, in a ping-pong fashion. The storage management layer 130 may implement a similar rolling process with more than two ACM buffers 1013. The acceleration module 150, in certain embodiments, includes and/or supports one or more transaction log API functions. An ACM user 116 may use the acceleration module 150, in these embodiments, to declare or initialize a transaction log data structure.

As a parameter to a transaction log API command to create a transaction log data structure, based on metadata from a database system 116a, based on an intercepted transaction log entry request, or the like, in one embodiment, the acceleration module 150 may receive a storage location, such as a location in a namespace and/or address space of the non-volatile storage 122 or the like, to which the storage management layer 130 may commit, empty, and/or destage data of the transaction log from two or more ACM buffers 1013 in a rolling or circular manner as described above, such as a location in the non-volatile storage medium 122, a location in the non-volatile storage device 121, or the like. Once an ACM user 116 has initialized or declared a transaction log data structure, in one embodiment, the use of two or more ACM buffers 1013 to implement the transaction log data structure is substantially transparent to the ACM user 116, with the performance and benefits of the ACM 1011. The use of two or more ACM buffers 1013, in certain embodiments, is transparent when the destage rate for the two or more ACM buffers 1013 is greater than or equal to the rate at which the ACM user 116 writes to the two or more ACM buffers 1013. The acceleration module 150, in one embodiment, provides byte-level writes to a transaction log data structure using two or more ACM buffers 1013.

In another example, a supplier thread may maintain four (4) or more ACM buffers 1013. A first ACM buffer 1013 may be armed and ready to accept data from the consumer, as described above. A second ACM buffer 1013 may be actively accessed (e.g., filled) by a consumer thread, as described above. A third ACM buffer 1013 may be in a pre-arming process (e.g., re-initializing, as described above), and a fourth ACM buffer 1013 may be "emptying" or "destaging" (e.g., committing to persistent storage 122, 121, as described above).

In certain embodiments, the acceleration module 150 may provide access to transaction log data structures as files in a file system, such as the depicted file system module 1558. The file system module 1558, in one embodiment, may comprise a file system of the host device 110, and may be provided by an operating system, a storage subsystem, or the like. In a further embodiment, the file system module 1558 may comprise a direct file system (DFS) for the ACM 1011 and/or the non-volatile storage medium 122, bypassing one or more operating system or storage subsystem layers or the like to provide efficient, streamlined access to transaction log data structures directly.

For example, in one embodiment, the file system module 1558 may lay out files directly in a sparse logical address space provided by the storage management layer 130, which the storage management layer 130, the file system module 1558, the metadata module 1912 described below, or the like may map directly to physical locations in the ACM buffers 1013 and/or the non-volatile storage medium 122. The file system module 1558, in a further embodiment, may use or cooperate with the storage management layer 130 and/or the ACM 1011 to perform block allocations, ACM buffer 1013 allocations, and/or atomic data updates, each for the acceleration module 150 or other storage clients. The file system module 1558 may support one or more file system interfaces or APIs such as open, close, read, write, pread, pwrite, lseek, mmap, or other requests or commands. The file system module 1558 may comprise a kernel module in kernel-space, a user module in user-space, or a combination of modules in both kernel-space and user-space. The file system module 1558, in certain embodiments, may be integrated with the storage management layer 130, a storage controller 104, or the like, or may be an independent module of computer executable program code and/or logic hardware.

As described above, the auto-commit memory module 1011, an associated commit agent 1020, or the like may be configured to commit, copy, transfer, synchronize, destage, persist, or preserve data from the volatile ACM buffers 1013 to the non-volatile storage medium 122 and/or to the second non-volatile storage device 121, in response to a trigger such as a commit event, a restart event, a synchronize or destage request, a change in state, a change in condition, a change in a factor, a change in an attribute, a region of an auto-commit buffer 1013 becoming full, or the like based on ACM metadata 1015. Committing data, in one embodiment, may comprise copying or transferring the data from an ACM buffer 1013 to a location in the non-volatile storage medium 122 and/or the second non-volatile storage device 121. In a further embodiment, data is considered committed as soon as an ACM buffer 1013 has been armed or configured with ACM metadata 1015 defining or indicating a commit action for the data, due to the auto-commit memory module 1011's guarantee of persistence.

The acceleration module 150, in one embodiment, may be configured to provide data for a transaction log data structure (e.g., input data for a data structure from a client 116) to the auto-commit memory module 1011 for writing to one or more ACM buffers 1013 so that the transaction log data structure is committed and/or ensured to be persisted in the non-volatile storage medium 122 of the non-volatile storage device 102, and/or in the second non-volatile storage device 121. The acceleration module 150 may use one or more ACM primitive operations to manage transaction log acceleration using the auto-commit memory module 1011. For example, in various embodiments, the acceleration module 150 may use an ACM populate operation to load data of a transaction log data structure into an ACM buffer 1013, may use an ACM destage operation to destage, copy, transfer, and/or move data of a transaction log data structure from an ACM buffer 1013 to the non-volatile storage medium 122, may use an ACM barrier or ACM checkpoint operation to ensure consistency of data of a transaction log data structure stored in an ACM buffer 1013, or the like. In a further embodiment, one or more ACM buffers 1013 may be mapped into virtual memory of the host device 110 or the like, and the acceleration module 150 may write, store, or load data into an ACM buffer 1013 using memory semantic operations, as described above.

As described above, the storage management layer 130 may be configured to store data in the non-volatile storage medium 122 sequentially, in a sequential or chronological log-based writing structure 2140 as described below with regard to FIG. 6. The storage management layer 130 may map logical addresses of data to physical locations storing the data in the non-volatile storage medium 122 using a logical-to-physical address mapping structure 2000 as described below with regard to FIG. 6. Transaction log data structures of the acceleration module 150, in certain embodiments, may be accessible as files of the file system module 1558 using file names. Transaction log data structures, files of the file system module 1558, or the like may be associated with logical identifiers (e.g., LBAs) in a logical address space provided by the storage management layer 130, which may comprise a sparse logical address space that is larger than a physical storage capacity of the non-volatile storage device 102. The acceleration module 150, the file system module 1558, and/or the storage management layer 130 may track which portions of a transaction log data structure, a file, or the like are stored in the ACM buffers 1013 and which portions are stored in the non-volatile storage medium 122 and/or in the non-volatile storage device 121, maintaining such mappings in file system metadata for the file system module 1558 or the like.

In this manner, in certain embodiments, the file system module 1558 may provide access to a plurality of files using filenames, offsets, or the like and the files (e.g., transaction log data structures or other files) may be stored in the ACM buffers 1013, the non-volatile storage medium 122 and/or in both the ACM buffers 1013 and the non-volatile storage medium 122. Such cooperation between the acceleration module 150, the file system module 1558, the storage management layer 130, and/or the auto-commit memory module 1011 may be hidden or masked from applications or other clients, who may receive the access speed of the volatile ACM buffers 1013, the persistence of the non-volatile storage medium 122, and the convenience of file system access to transaction log data structures without managing or awareness of the underlying complexities.

Because the file system module 1559, in certain embodiments, is configured to provide access to files physically located in the ACM buffers 1013 and/or the non-volatile storage medium 122, transaction log data structures that are associated with filenames and accessible as files through the file system module 1558, in one embodiment, may be accessed (e.g., written to and/or read from) using the block device interface 1520, the memory semantic interface 1522, and/or file system operations provided by the file system module 1558. In one embodiment, the file system module 1558 opens a file as an ACM container, with each block of data mapped to a location either in the ACM buffers 1013 or the non-volatile storage medium 122, and the mapping is updated as new data of the file is written, as data of the file is destaged from an ACM buffer 1013 to the non-volatile storage medium 122, or the like.

In certain embodiments, instead of or in addition to using a volatile memory namespace, such as a physical memory namespace, a virtual memory namespace, or the like and/or instead of or in addition to using a storage namespace, such as a file system namespace, a logical unit number (LUN) namespace, or the like, one or more commit agents 1020, as described above, may implement an independent persistent memory namespace for the ACM 1011, for associating transaction logs and/or entries with storage clients 116, or the like. For example, a volatile memory namespace, which may be accessed using an offset in physical and/or virtual memory, is not persistent or available after a restart event such as a reboot, failure event, or the like and a process that owned the data in physical and/or virtual memory prior to the restart event typically no longer exists after the restart event. Alternatively, a storage namespace may be accessed using a file name and an offset, a LUN ID and an offset, or the like. While a storage namespace may be available after a restart event, a storage namespace may have too much overhead for use with the ACM 1011. For example, saving a state for each executing storage client 116 using a file system storage namespace may result in a separate file for each storage client 116, which may not be an efficient use of the ACM 1011.

The one or more commit agents 1020 and/or the controller 104, in certain embodiments, provide ACM users 116 with a new type of persistent memory namespace for the ACM 1011 that is persistent through restart events without the overhead of a storage namespace. One or more processes, such as an ACM user 116, in one embodiment, may access the persistent memory namespace using a unique identifier associated with the ACM user 116, such as a globally unique identifier (GUID), universal unique identifier (UUID), or the like so that data stored by a first process for the ACM user 116 prior to a restart event is accessible to a second process for the ACM user 116 after the restart event using a unique identifier, without the overhead of a storage namespace, a file system, or the like.

The unique identifier, in one embodiment, may be assigned to an ACM user 116 by a commit agent 1020, the controller 104, the acceleration module 150, or the like. In another embodiment, an ACM user 116 may determine its own unique identifier. In certain embodiments, the persistent memory namespace is sufficiently large and/or ACM users 116 determine a unique identifier in a predefined, known manner (e.g., based on a sufficiently unique seed value, nonce, or the like) to reduce, limit, and/or eliminate collisions between unique identifiers. In one embodiment, the ACM metadata 1015 includes a persistent memory namespace unique identifier associated with an owner of an ACM buffer 1013, an owner of one or more pages of an ACM buffer 1013, or the like, such as an ACM user 116 (e.g., a database system 116a).

In one embodiment, the one or more commit agents 1020, the acceleration module 150, and/or the controller 104 provide a persistent memory namespace API to ACM users 116, over which the ACM users 116 may access the ACM 1011 using the persistent memory namespace. In various embodiments, the one or more commit agents 1020 and/or the controller 104 may provide a persistent memory namespace API function to transition, convert, map, and/or copy data from an existing namespace, such as a volatile memory namespace or a storage namespace, to a persistent memory namespace; a persistent memory namespace API function to transition, convert, map, and/or copy data from a persistent memory namespace to an existing namespace, such as a volatile memory namespace or a storage namespace; a persistent memory namespace API function to assign a unique identifier such as a GUID, a UUID, or the like; a persistent memory namespace API function to list or enumerate ACM buffers 1013 associated with a unique identifier; a persistent memory namespace API function to export or migrate data associated with a unique identifier so that an ACM user 116 such as an application and/or process (e.g., a database system 116a) may take its ACM data to a different host 110, to a different ACM 1011, or the like; and/or other persistent memory namespace API functions for the ACM 1011.

For example, an ACM user 116, in one embodiment, may use a persistent memory namespace API function to map one or more ACM buffers 1013 of a persistent memory namespace into virtual memory of an operating system of the host 110, or the like, and the mapping into the virtual memory may end in response to a restart event while the ACM user 116 may continue to access the one or more ACM buffers 1013 after the restart event using the persistent memory namespace. In certain embodiments, the storage management layer 130 and/or the acceleration module 150 may provide the persistent memory namespace API in cooperation with the one or more commit agents 1020 and/or the controller 104.

The persistent memory namespace, in certain embodiments, is a flat non-hierarchical namespace of ACM buffers 1013 (and/or associated ACM pages), indexed by the ACM metadata 1015. The one or more commit agents 1020, the acceleration module 150, and/or the controller 104, in one embodiment, allow the ACM buffers 1013 to be queried by ACM metadata 1015. In embodiments where the ACM metadata 1015 includes a unique identifier, in certain embodiments, an ACM user 116 may query or search the ACM buffers 1013 by unique identifier to locate ACM buffers 1013 (and/or stored data, such as a transaction log) associated with a unique identifier. In a further embodiment, the one or more commit agents 1020 and/or the controller 104 may provide one or more generic metadata fields in the ACM metadata 1015 such that an ACM user 116 may define its own ACM metadata 1015 in the generic metadata field, or the like. The one or more commit agents 1020, the acceleration module 150, and/or the controller 104, in one embodiment, may provide access control for the ACM 1011, based on unique identifiers, or the like.

In one embodiment, an ACM buffer 1013 may be a member of a persistent memory namespace and one or more additional namespaces, such as a volatile namespace, a storage namespace or the like. In a further embodiment, the one or more commit agents 1020, the acceleration module 150, and/or the controller 104 may provide multiple ACM users 116 with simultaneous access to the same ACM buffers 103. For example, multiple ACM users 116 of the same type and/or with the same unique identifier, multiple instances of a single type of ACM user 116, multiple processes of a single ACM user 116, or the like may share one or more ACM buffers 1013. Multiple ACM users 116 accessing the same ACM buffers 1013, in one embodiment, may provide their own access control for the shared ACM buffers 1013, such as a locking control, turn-based control, moderator-based control, or the like.

Figure 5A:
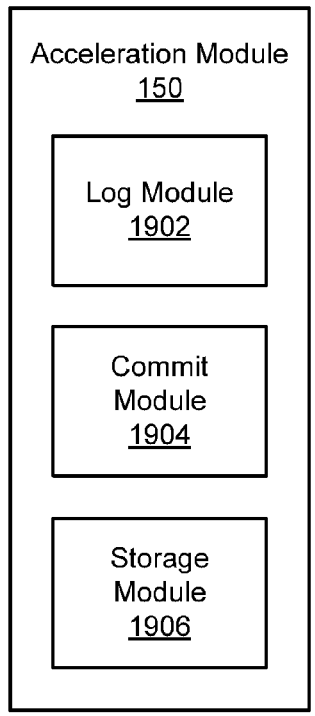
FIG. 5A is a schematic block diagram illustrating one embodiment of an acceleration module.

FIG. 5A depicts one embodiment of an acceleration module 150. The acceleration module 150, in certain embodiments, may be substantially similar to the various embodiments of the acceleration module 150 described above. In other embodiments, the acceleration module 150 may include, may be integrated with, and/or may be in communication with the storage management layer 130, the storage controller 104, and/or the commit agent 1020.

In general, the acceleration module 150 stores transaction log data structure entries from a storage client 116 such as a database system 116a in a volatile memory 1013 of the ACM 1011, at least temporarily, to accelerate storage of the transaction log data structure entries. In the depicted embodiment, the acceleration module 150 includes a log module 1902, a commit module 1904, and a storage module 1906.

As described above, in certain embodiments, the acceleration module 150 and/or the ACM 1011 enable clients such as the ACM users/storage clients 116 to access transaction log data structures using fast, byte-addressable, persistent memory, combining benefits of volatile memory and non-volatile storage for persisting data structures. Auto-commit logic inside the hardware of the non-volatile storage device 102, such as the auto-commit memory 1011 described above, in certain embodiments, provides power-cut protection for data structures written to the auto-commit buffers 1013 of the ACM 1011. The acceleration module 150 and/or its sub-modules, in various embodiments, may at least partially be integrated with a device driver (e.g., a software controller) executing on the processor 111 of the host computing device 110 such as the storage management layer 130, may at least partially be integrated with a hardware controller 104 of the ACM 1011 and/or non-volatile storage device 102, as microcode, firmware, logic circuits, or the like, or may be divided between a device driver and a hardware controller 104, 104, or the like.

In one embodiment, the log module 1902 is configured to determine one or more transaction log records (e.g., database log entries, journal records, or the like) indicating a sequence of operations performed on data, such as database records, database tables, files, metadata, user data, management data, or the like. In certain embodiments, the log module 1902 is part of or cooperates with a storage client 116 (e.g., a database system 116a) to generate transaction log records based on one or more events, transactions, and/or operations of the storage client 116. For example, a storage client 116, such as a database system 116a or the like, may be aware of, configured to use, and/or compatible with the acceleration module 150 and/or the ACM 1011, and may provide one or more transaction log records (e.g., database log entries, journal records, or the like) directly to the log module 1902.

In a further embodiment, the log module 1902 may intercept, filter, or otherwise monitor one or more transaction log records sent by a storage client 116 such as a database system 116a or the like (e.g., without knowledge of the storage client 116). For example, a storage client 116 may send one or more transaction log records (e.g., database log entries, journal records, or the like) to the non-volatile storage device 121 or another different location (e.g., using the block I/O interface 131 or the like) and the log module 1902 may intercept, filter, or otherwise monitor the one or more transaction log records. In this manner, in certain embodiments, the log module 1902 may allow storage clients 116 which are not natively compatible with and/or aware of the ACM 1011 to receive the benefits of the ACM 1011 for accelerating storage of transaction log records. The log module 1902 may intercept or otherwise receive transaction log records using an existing or standard interface, using a filter driver, overloading an interface, using LD_PRELOAD, intercepting or trapping a segmentation fault, using an IOCTL command, using a custom transaction log interface, or the like.

In certain embodiments, the log module 1902 may be configured to intercept, filter, or otherwise monitor transaction log records, database log entries, journal records, or the like according to one or more characteristics. For example, the log module 1902 may intercept, filter, and/or monitor each transaction log record from one or more selected storage clients 116, of a predefined type or class, destined and/or addressed for a selected location (e.g., for the non-volatile storage device 121, for the non-volatile storage medium 122, for a range of one or more logical addresses, or the like), and/or based on one or more other characteristics. In one embodiment, the one or more characteristics are user configurable and/or selectable, through a user interface such as a GUI, a CLI, a configuration file, or the like.

At least a portion of the log module 1902 may be part of, integrated with, and/or in communication with the storage management layer 130, a device driver for the non-volatile storage device 102 and/or for the non-volatile storage device 121 or other controller executing on the host computing device 110, a filter driver, an operating system, a file system, or the like of the host computing device 110. In another embodiment, the log module 1902 may comprise software, firmware, and/or logic hardware of a device located on the network 115, such as a network interface card (NIC), a router, a switch, a modem, a firewall, a network appliance, or the like.

The log module 1902, in certain embodiments, provides an interface whereby an application 116 or other storage client 116 (e.g., a database system 116a) may access transaction log data structures stored in the ACM buffers 1013 and/or the non-volatile storage medium 122, whether the ACM buffers 1013 are natively volatile or non-volatile, regardless of the type of medium used for the ACM buffers 1013, regardless of whether the data structures are stored in the ACM buffers 1013, the non-volatile storage medium 122, or a combination of both the ACM buffers 1013 and the non-volatile storage medium 122.

Instead of or in addition to the above methods of accessing the ACM 1011, such as using a memory map (e.g., mmap) interface, in certain embodiments, the log module 1902 may use the ACM 1011 to expose transaction log data structures to applications or other clients using an API, shared library, file system namespace or other persistent logical identifiers, or the like as described above. The log module 1902, in certain embodiments, may bypass one or more operating system and/or kernel layers, which may otherwise reduce performance of the ACM 1011, complicate access to transaction log data structures, or the like, increasing access times, introducing delays, or the like. The log module 1902, in various embodiments, may provide access to transaction log data structures using an existing I/O interface or namespace, such as a standard read/write API, a file system namespace, a LUN namespace, or the like or may provide a custom transaction log interface.

In one embodiment, the log module 1902 is configured to monitor, detect, intercept, or otherwise receive requests for transaction log data structures from applications or other clients, such as the ACM users/storage clients 116 described above, another module, a host computing device 110, or the like (e.g., instead of or in addition to filtering or intercepting transaction log entries). The log module 1902 may receive data requests over an API, a shared library, a communications bus, the SML interface 132, or another interface. As used herein, a data request may comprise a storage request, a memory request, a file request, a transaction log request, an auto-commit request, or the like to access a data structure, such as an open, write/append, synchronize, close, map, and/or transaction log allocation request.

As described below with regard to the identifier module 1910, in certain embodiments, a transaction log data structure and/or a storage client 116 may be associated with a persistent logical identifier. Accordingly, a transaction log request may include a persistent logical identifier of the associated transaction log data structure. A logical identifier, in one embodiment, is a member of a namespace. As used herein, a namespace comprises a container or range of logical or physical identifiers that index or identify data, data locations, data structures, or the like. As described above, examples of namespaces may include a file system namespace, a LUN namespace, a logical address space, a storage namespace, a virtual memory namespace, a persistent ACM namespace, a volatile memory namespace, an object namespace, a network namespace, a global or universal namespace, a BAR namespace, or the like.

A logical identifier may indicate a namespace to which a data structure belongs. In one embodiment, a logical identifier may comprise a file name or other file identifier and/or an offset from a file system namespace, a LUN ID and an offset from a LUN namespace, an LBA or LBA range from a storage namespace, one or more virtual memory addresses from a virtual memory namespace, an ACM address from a persistent ACM namespace, a volatile memory address from a volatile memory namespace of the host device 110, an object identifier, a network address, a GUID, UUID, or the like, a BAR address or address range from a BAR namespace, or another logical identifier. In a further embodiment, a logical identifier may comprise a label or a name for a namespace, such as a directory, a file path, a device identifier, or the like. In another embodiment, a logical identifier may comprise a physical address or location for a data structure. As described above, certain namespaces, and therefore namespace identifiers, may be temporary or volatile, and may not be available to an ACM user/storage client 116 or other client after a restart event. Other namespaces, and associated logical identifiers, may be persistent, such as a file system namespace, a LUN namespace, a persistent ACM namespace, or the like, and data structures associated with the persistent namespace may be accessible to an ACM user/storage client 116 after a restart event using the persistent logical identifier.

The log module 1902, in one embodiment, may receive an open request from a client to open or initialize a transaction log data structure. In a further embodiment, the log module 1902 may receive a write request (e.g., for a transaction log data structure, an append request) from a client to write and/or append data to a transaction log data structure, using the ACM buffers 1013 or the like. The log module 1902, in another embodiment, may receive a synchronize request, a destage request, or the like to trigger copying, destaging, transferring, migrating, or synchronization of a data structure from an ACM buffer 1013 to the non-volatile storage medium 122, to the non-volatile storage device 121, or the like. The log module 1902, in one embodiment, may receive a close request from a client to close, lock, delete, clear, or otherwise finish a data structure. In a further embodiment, the log module 1902 may receive a map request to map a region of ACM 1011 (e.g., one or more ACM buffers 1013, pages, cache lines, memory locations, ranges of memory locations, or the like) into virtual memory of the storage client 116 on the host device 110. The log module 1902, in another embodiment, may receive an allocation request to allocate one or more regions of the ACM 1011 for storing a data structure, a portion of a data structure, or the like.

The log module 1902, in certain embodiments, may receive transaction log requests in user-space. As used herein, kernel-space may comprise an area of memory (e.g., volatile memory, virtual memory, main memory) of the host computing device 110; a set of privileges, libraries, or functions; a level of execution; or the like reserved for a kernel, operating system, or other privileged or trusted processes or applications. User-space, as used herein, may comprise an area of memory (e.g., volatile memory, virtual memory, main memory) of the host computing device 110; a set of privileges, libraries, or functions; a level of execution; or the like available to untrusted, unprivileged processes or applications.

Due to access control restrictions, privilege requirements, or the like for kernel-space, providing a device driver, library, API, or the like for the ACM 1011 in kernel-space may have greater delays than in user-space. Further, use of a storage stack of a kernel or operating system, in certain embodiments, may introduce additional delays. An operating system or kernel storage stack, as used herein, may comprise one or more layers of device drivers, translation layers, file systems, caches, and/or interfaces provided in kernel-space, for accessing a data storage device. The acceleration module 150, in certain embodiments, may provide direct access to transaction log data structures and/or to the ACM 1011 by bypassing and/or replacing one or more layers of an operating system or kernel storage stack, reading and writing data structures directly between the ACM buffers 1013 and/or the non-volatile storage medium 122 and user-space or the like. In a further embodiment, the log module 1902 may receive transaction log requests in user-space from user-space applications 116 or other storage clients 116 and in kernel-space from kernel-space applications 116 or other storage clients 116.

In one embodiment, the commit module 1904 is configured to send one or more transaction log records (e.g., from the log module 1902) to one or more volatile memory pages 1013 accessible over the network 115. As described above, the volatile memory pages 1013 may be configured to ensure persistence of data written to the volatile memory 1013, such as transaction log records. The commit module 1904 may write one or more transaction log records to the volatile memory 1013 (e.g., ACM buffers 1013) using RDMA, Infiniband, memory access semantics, CPU load/store commands, DMA commands, 3rd party DMA commands, atomic test and set commands, manipulatable memory pointers, network requests, PCI-e BAR, or the like. As described above, writing data to the volatile memory 1013 over the network 115 may have a lower latency than writing data directly to the non-volatile storage medium 122; to local storage of the host computing device 110, if any; to the non-volatile storage device 121; or the like, because the ACM 1011 may have the low latency of volatile memory 1013 (e.g., RAM) and the ensured persistence of the non-volatile storage medium 122.

In one embodiment, the commit module 1904 is configured to receive, retrieve, transfer, or otherwise process input data (e.g., transaction log entries) from a client 116 for writing, updating, or appending to a transaction log data structure. For example, a write request or append request received by the log module 1902 may include or reference data to be written or appended to a transaction log data structure identified by the request, which the commit module 1904 may use to write the data to the ACM buffers 1013. In one embodiment, the commit module 1904 may write data of write requests to the ACM buffers 1013 itself. In another embodiment, the commit module 1904 may monitor one or more regions of the ACM buffers 1013 or may receive an alert/notification that a client 116 has written data to the one or more regions of the ACM buffers 1013, or the like.

In one embodiment, a write request, a transaction log request, or the like may indicate where in a transaction log data structure the associated data is to be written (e.g., to which node, field, row, column, entry, or the like). In other embodiments, a location for data may be defined by a rule, definition, or schema for a type of transaction log data structure, such as an append-only persistent transaction log or the like. A write request, append request, or the like, in one embodiment, may include data structure metadata to be written with the associated write data (e.g., a timestamp, a sequence number, a label, an identifier, a pointer, or the like). In another embodiment, the commit module 1904 may determine data structure metadata to be written with associated write data based on a state of a transaction log data structure, based on metadata for a transaction log data structure from the metadata module 1912, by incrementing a pointer, a sequence number, or an identifier for a transaction log data structure, or the like.

The commit module 1904, in certain embodiments, may write data to a data structure, store data in a data structure, append data to a data structure, or the like by writing or storing the data into a region of the ACM buffers 1013, which may guarantee or ensure persistence of the data should a failure condition, restart event, or other trigger occur. In certain embodiments, if a transaction log data structure has not been allocated a memory region in the ACM buffers 1013 or the like, the commit module 1904 may write data of a transaction log data structure to the non-volatile storage medium 122. In other embodiments, the commit module 1904 may cooperate with the identifier module 1910 and/or the auto-commit memory module 1011 to allocate a memory region of the ACM buffers 1013 to a transaction log data structure in response to a write request, an append request, or the like for the transaction log data structure.

The commit module 1904 may cooperate with the metadata module 1912, the file system module 1558, the storage management layer 130, and/or the auto-commit memory module 1011 to update logical-to-physical mappings, file system metadata, or the like for one or more logical identifiers of an updated transaction log data structure. For example, in response to an append request for a transaction log, the commit module 1904 and/or the metadata module 1912 may extend a file length associated with a file of the transaction log by the file system module 1558, add an entry in a logical-to-physical mapping structure mapping a range of LBAs for the updated data to a location in the ACM buffers 1013 storing the data, increment a pointer identifying an append point of the transaction log, or the like.

To provide the fast write times of the ACM buffers 1013 to applications 116 or other storage clients 116 writing to transaction log data structures, even with relatively small amounts or capacities of ACM buffers 1013, in one embodiment, the commit module 1904 may cooperate with the storage module 1906 described below to use memory regions of the ACM buffers 1013 as a ring buffer, a ping-pong buffer, a rolling buffer, a sliding window, or the like, alternating between different memory regions of the ACM buffers 1013 for writing data of a transaction log data structure, while the storage module 1906 destages, copies, or transfers data from a memory region not being written to. In this manner, the commit module 1904 may reuse or overwrite a region of memory of the ACM buffers 1013 only after the storage module 1906 has already destaged, copied, transferred, committed, or otherwise persisted the previously written data, providing efficient use of the ACM buffers 1013 while still ensuring persistence.

In other embodiments, the storage module 1906 does not destage transaction log entries from the non-volatile storage device 102 (e.g., destaging transaction log entries may require additional information regarding an associated storage client 116, an original target destination for the transaction log entries, or the like), and the associated storage client 116 and/or the storage module 1906 may instead write the transaction log entries from the host computing device 110 to the non-volatile storage device 121, in response to the commit module 1904 storing the transaction log entries in the volatile memory 1013. The commit module 1904 may clear, erase, delete, flush, trim, evict, or otherwise remove one or more transaction log entries (e.g., database log records, journal records) from the non-volatile storage device 102 (e.g., the volatile memory 1013 and/or the non-volatile storage medium 122), in response to the non-volatile storage device 121 storing the one or more transaction log entries, to free storage capacity for additional transaction log entries or other data.

In one embodiment, the storage module 1906 is configured to send one or more transaction log records to the non-volatile storage device 121. For example, the storage module 1906 may send one or more transaction log records to the non-volatile storage device 121 in response to an acknowledgment from the non-volatile storage device 102 that one or more volatile memory pages 1013 and/or the non-volatile storage medium 122 store the one or more transaction log records.

In one embodiment, the storage module 1906 stores, caches, and/or buffers one or more transaction log entries received by the log module 1902 until the storage module 1906 receives an acknowledgment that the volatile memory 1013 and/or the non-volatile storage medium 122 store the one or more transaction log entries, so that the storage module 1906 may write the one or more transaction log entries to the non-volatile storage device 121 directly from the host computing device 110, instead of reading the one or more transaction log entries from the non-volatile storage device 102. In a further embodiment, in response to a restart event or other trigger (e.g., a power interruption event) causing the storage module 1906 to lose one or more transaction log entries (e.g., the storage module 1906 failing to send the one or more transaction log entries to the non-volatile storage device 121 prior to the trigger), the storage module 1906 may receive the one or more transaction log entries from the non-volatile storage device 102 (e.g., from the volatile memory 1013 and/or from the non-volatile storage medium 122) and may send the received one or more transaction log entries from the non-volatile storage device 102 to the non-volatile storage device 121 after recovery from the restart event or other trigger (e.g., a power interruption event), as described below with regard to the recovery module 1908.

The storage module 1906, in certain embodiments, may send and/or write the one or more transaction log entries to an original target location for the one or more transaction log entries, such as a location to which the storage client 116 originally sent the one or more transaction log entries, before the log module 1902 intercepted and/or filtered the one or more transaction log entries. For example, a database system 116a or other storage client 116 may send one or more transaction log entries for storage in the second/different non-volatile storage device 121 and the log module 1902 may intercept and/or filter the one or more transaction log entries before they are sent to and/or written to the non-volatile storage device 121, as described above. The storage module 1906 may hold or queue the one or more intercepted/filtered transaction log entries until the commit module 1904 stores the one or more transaction log entries in the volatile memory 1013 and/or the non-volatile storage medium 122, in response to which the storage module 1906 may send and/or write the one or more transaction log entries to their originally intended destination in the non-volatile storage device 121.

In embodiments where the storage module 1906 sends one or more transaction log entries to the non-volatile storage device 121 from the host computing device 110, at least a portion of the storage module 1906 may be part of, integrated with, and/or in communication with the storage management layer 130, a device driver for the non-volatile storage device 102 and/or for the non-volatile storage device 121 or other controller executing on the host computing device 110, a filter driver, an operating system, a file system, or the like executing on the host computing device 110. In this manner, in certain embodiments, the non-volatile storage device 102, the non-volatile storage medium controller 104, and/or the ACM 1011 may have little or no knowledge of the non-volatile storage device 121, of original target destinations for one or more transaction log entries, settings and/or preferences of a storage client 116, or the like.

In a further embodiment, the storage module 1906 may be at least partially disposed on the non-volatile storage device 102, as part of the non-volatile storage medium controller 104, the ACM 1011, or the like (e.g., hardware logic, firmware, microcode, computer executable instructions stored on a non-transitory computer readable medium, an FPGA, an ASIC, or the like). The commit module 1904, in such an embodiment, may send a target location from a storage client 116 for one or more transaction log entries, to the storage module 1906 on the non-volatile memory device 102, with the one or more transaction log entries or the like. For example, the commit module 1904 may send a logical identifier (e.g., a range of one or more LBAs or the like), a physical address, or the like for the one or more transaction log entries to be stored in the non-volatile storage device 121. In response to storing the one or more transaction log entries in the volatile memory 1013, the storage module 1906, in such an embodiment, may send the one or more transactional log entries from the non-volatile storage device 102 to the location in the non-volatile storage device 121, over the network 115 or the like.

In one embodiment, the storage module 1906 may be configured to destage data from the ACM buffers 1013 to the non-volatile storage medium 122, such as transaction log data structure data that the commit module 1904 has written to the ACM buffers 1013 as described above. The storage module 1906, in certain embodiments, cleans or destages data of the ACM buffers 1013 that the non-volatile storage medium 122 and/or the non-volatile storage device 121 does not yet store, such as new data, updated data, or the like. A location for the data in the non-volatile storage medium 122, such as an LBA, a physical address, or the like, may be indicated by ACM metadata 1015 or other triggered commit metadata as described above. The storage module 1906, in certain embodiments, copies, transfers, destages, moves, or writes data from the ACM buffers 1013 to the non-volatile storage medium 122 itself, based on ACM metadata 1015, a dirty data bitmap, transaction log metadata from the metadata module 1912, or the like.

In a further embodiment, the storage module 1906 may cause data to be copied, transferred, destaged, moved, or written from the ACM buffers 1013 to the non-volatile storage medium 122, by triggering the auto-commit memory module 1011, a commit agent 1020, a commit agent 1020, or the like to perform a commit action for the data identified or defined by ACM metadata 1015 for the data. For example, as described above, the auto-commit buffers 1013 may be armed with ACM metadata 1015 to perform a commit action for preserving or persisting stored data. The storage module 1906 may utilize this pre-arming for destaging, committing, or transferring data from the auto-commit buffers 1013 to the non-volatile storage medium 122.

While the commit module 1904, in certain embodiments, may operate as a foreground process, writing data or allowing data to be written to the ACM buffers 1013 in the foreground, the storage module 1906, in certain embodiments, may operate as a background process. For example, in one embodiment, the storage module 1906 may destage, copy, transfer, move, or synchronize data periodically, lazily, during system downtime, during a period of low traffic, or the like. In one embodiment, the storage module 1906 may destage, copy, transfer, move, or synchronize data in response to a trigger. The trigger may be the same or substantially similar to the trigger for a commit action described above with regard to the ACM metadata 1015. In a further embodiment, the commit module 1904 may trigger the storage module 1906 based on an input rate, thereby controlling a transfer rate of the storage module 1906.

The storage module 1906, in another embodiment, may be triggered in response to an amount of data of a transaction log data structure stored in a region of the ACM buffers 1013 exceeding a predefined threshold. For example, if the ACM buffers 1013 are organized into 4 KB pages, the storage module 1906 may be triggered in response to the commit module 1904 filling a 4 KB page to destage, copy, transfer, or move the data from the 4 KB page to the non-volatile storage medium 122. In another embodiment, the storage module 1906 may be triggered in response to the commit module 1904 writing an amount of data equal to a page size or other region size of the non-volatile storage medium 122, based on an architecture of the non-volatile storage medium 122 or the like. In a further embodiment, the storage module 1906 may be triggered periodically, in response to an elapsed time period since a previous trigger or the like. In one embodiment, the storage module 1906 may be triggered by a monitoring device or monitoring module associated with the memory of the ACM buffers 1013, such as the commit module 1904, the auto-commit memory module 1011, or another module. In a further embodiment, the storage module 1906 may be triggered by a synchronization request, a destage request, or the like that the log module 1902 receives from a client 116. The storage module 1906, in further embodiments, may be triggered by another determined change in state, change in condition, factor, or attribute of memory of the one or more ACM buffers 1013. In other embodiments, the storage module 1906 does not destage data from the volatile memory 1013 to the non-volatile memory medium 122, but recovers storage capacity of the volatile memory 1013 by sending the data to the second non-volatile storage device 121, as described above.

In one embodiment, the storage module 1906 may copy, destage, transfer, or write data from a memory region of the ACM buffers 1013 to the non-volatile storage medium 122 in a manner that preserves an association of the data with a logical identifier of the transaction log data structure, as described below with regard to the identifier module 1910. For example, the storage module 1906 may write a storage client 116 identifier, a transaction log identifier, a transaction log entry identifier, a filename, a range of logical addresses, or another logical identifier to the non-volatile storage medium 122 with the data, may update a logical-to-physical mapping structure with a new physical location for the data, may provide a new physical location for the data to the SML 130, may update file system metadata indicating that the data is stored in the non-volatile storage medium 122, or the like. By ensuring that data remains associated with a persistent logical identifier, in certain embodiments, the storage module 1906 ensures that the transaction log data structure remains accessible to a client 116 using the persistent logical identifier.

As described above with regard to the commit module 1904, the storage module 1906 and the commit module 1904 may cooperate to use two or more regions of the ACM buffers 1013 as a ring buffer, a ping-pong buffer, a rolling buffer, a sliding window, or the like, alternating between different memory regions of the ACM buffers 1013 for storing data of a transaction log data structure, while the commit module 1904 writes data to a memory region from which the storage module 1906 is not currently writing data to the non-volatile storage device 121, making efficient use of the ACM buffers 1013 while still ensuring persistence.

Figure 5B:
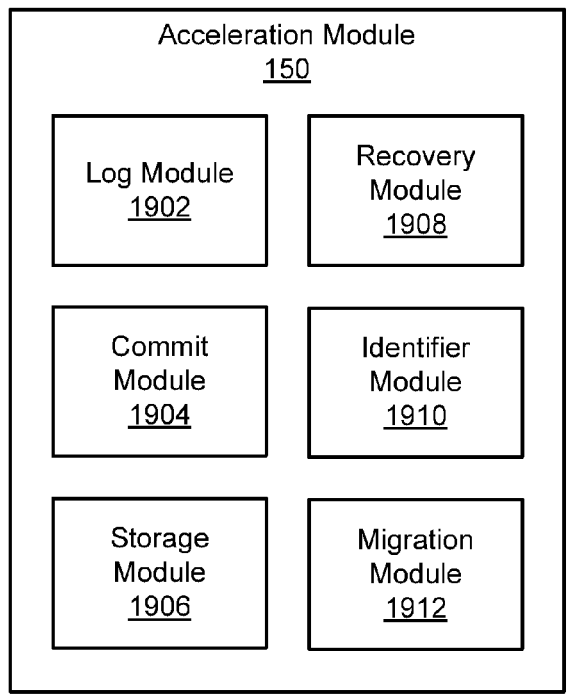
FIG. 5B is a schematic block diagram illustrating another embodiment of an acceleration module.

FIG. 5B depicts another embodiment of an acceleration module 150. In one embodiment, the acceleration module 150 may be substantially similar to one or more of the acceleration modules 150 described above. In the depicted embodiment, the acceleration module 150 of FIG. 5B includes a log module 1902, a commit module 1904, a storage module 1906 and further includes a recovery module 1908, an identifier module 1910, and a migration module 1912.

In one embodiment, the recovery module 1908 is configured to retrieve and/or receive one or more transaction log records (e.g., database log entries, journal records, or the like) persisted in the non-volatile storage medium 122 from the one or more volatile memory pages, in response to recovery from a restart event, a power interruption event, and/or another trigger. The recovery module 1908, in certain embodiments, may be substantially similar to the commit agent 1020 and/or the commit module 1320 described above.

In one embodiment, the recovery module 1908 retrieves one or more transaction log records from the non-volatile storage medium 122 and stores the one or more transaction log records in the volatile memory 1013 after a restart event, a power interruption event, and/or another trigger. For example, the recovery module 1908 may return the volatile memory 1013 to its state prior to the restart event, power interruption event, and/or another trigger. In a further embodiment, the recovery module 1908 may receive an identifier for a transaction log, an identifier for one or more transaction log entries, an identifier of a storage client 116, or the like, from the storage client 116, from the storage module 1906, and/or from another entity, may retrieve one or more transaction log entries from the non-volatile memory medium 122 based on the identifier, and may provide the retrieved one or more transaction log entries to the requesting entity (e.g., the storage client 116, the storage module 1906, and/or another entity), for storage in the second/different non-volatile storage device 121, or the like.

The recovery module 1908, in one embodiment, may map a received identifier to a location (e.g., a logical address such as an LBA, a physical address, or the like) in the non-volatile storage medium 122 (e.g., using a hash function or other predefined transform, using a logical-to-physical mapping structure or other metadata 135, or the like) from which to retrieve the one or more transactional log entries. In a further embodiment, the recovery module 1908 may scan data persisted from the volatile memory 1013 into the non-volatile storage medium 122 (e.g., most recently written data, a range of data flushed and/or committed after a restart event or other trigger, or the like) to locate data associated in the non-volatile storage medium 122 with the received identifier. By retrieving one or more transaction log entries from the non-volatile storage medium 122 after a restart event, power interruption event, and/or another trigger, the recovery module 1908 may enable the storage module 1906 to send the one or more transaction log entries to the non-volatile storage device 121, even if the storage module 1906 failed to send the one or more transaction log entries to the non-volatile storage device 121 prior to the trigger.

In embodiments where the recovery module 1908 sends one or more unique identifiers to the non-volatile storage device 102 from the host computing device 110, at least a portion of the recovery module 1908 may be part of, integrated with, and/or in communication with the storage management layer 130, a device driver for the non-volatile storage device 102 and/or for the non-volatile storage device 121 or other controller executing on the host computing device 110, a filter driver, an operating system, a file system, or the like executing on the host computing device 110. In a further embodiment, the recovery module 1908 may be at least partially disposed on the non-volatile storage device 102, as part of the non-volatile storage medium controller 104, the ACM 1011, or the like (e.g., hardware logic, firmware, microcode, computer executable instructions stored on a non-transitory computer readable medium, an FPGA, an ASIC, or the like) to receive a unique identifier (e.g., in cooperation with the identifier module 1910), to retrieve one or more transaction log entries from the non-volatile storage medium 122, or the like.

In one embodiment, the identifier module 1910 is configured to associate a transaction log, one or more transaction log records, a storage client 116 (e.g., a database system 116a), or the like with a unique identifier. As described above, the recovery module 1908, in certain embodiments, may be configured to receive and/or retrieve one or more persisted transaction log records from the non-volatile storage medium 122 and/or the volatile memory 1013 based on a unique identifier assigned and/or maintained by the identifier module 1910. The identifier module 1910 may assign unique logical identifiers to transaction logs, to transaction log entries, and/or to storage clients 116.

The volatile memory buffer 1013 and/or the non-volatile storage medium 122 may receive and/or store different transaction log entries (e.g., database log entries) from multiple different storage clients 116 (e.g., database systems 116a), over the network 115 or the like, and the identifier module 1910 may associates the different transaction log entries (e.g., database log entries) in the volatile memory buffer 1013 and/or in the non-volatile storage medium 122 with different identifiers for the multiple different storage clients 116 (e.g., database systems 116a), different identifiers for the different transaction logs, different identifiers for the different transaction log entries, or the like.

In certain embodiments, the identifier module 1910 may be configured to initialize or open a new transaction log data structure. For example, the identifier module 1910 may initialize or open a transaction log data structure in response to a request received by the log module 1902, such as an open request or the like. The identifier module 1910, in certain embodiments, may associate a logical identifier with an opened or initialized transaction log data structure. For example, the identifier module 1910 may cooperate with the file system module 1558 to assign a filename to a transaction log data structure, may cooperate with the storage management layer 130 to assign a range of logical identifiers such as LBAs to a transaction log data structure, may cooperate with the auto-commit memory module 1011 to assign a persistent ACM identifier to a transaction log data structure, or the like. In certain embodiments, the log module 1902 may receive a logical identifier, such as a filename, a range of LBAs, a LUN ID, or the like for a transaction log data structure as a parameter of an open request, or the like. In a further embodiment, the identifier module 1910, the file system module 1558, the storage management layer 130, the auto-commit memory module 1011, or the like may assign a next available logical identifier to a transaction log data structure or may use another predetermined or known method to assign a unique logical identifier.

The identifier module 1910, in one embodiment, may allocate a region of memory of the auto-commit memory module 1011 (e.g., of volatile memory 1013 and/or non-volatile storage media 122) for storing a transaction log data structure. As used herein, a region of memory may comprise a memory page, a memory buffer, a range of memory addresses, a memory element, a memory module, and/or another subset of one or more ACM buffers 1013 and/or non-volatile storage media 122 available to the auto-commit memory module 1011. In one embodiment, the identifier module 1910 may allocate a region of memory of the ACM buffers 1013 and/or non-volatile storage medium 122 for each requested transaction log data structure. In a further embodiment, the identifier module 1910 may cooperate with the auto-commit memory module 1011 to dynamically allocate available memory of the ACM buffers 1013 and/or the non-volatile storage medium 122, allocating memory to transaction data structures as they are accessed, based on a frequency of access, a most recent access, an access history, an input rate or write rate, or the like for the different transaction log data structures.

In one embodiment, at least a portion of the identifier module 1910 may be part of, integrated with, and/or in communication with the storage management layer 130, a device driver for the non-volatile storage device 102 and/or for the non-volatile storage device 121 or other controller executing on the host computing device 110, a filter driver, an operating system, a file system, or the like executing on the host computing device 110. In a further embodiment, the identifier module 1910 may be at least partially disposed on the non-volatile storage device 102, as part of the non-volatile storage medium controller 104, the ACM 1011, or the like (e.g., hardware logic, firmware, microcode, computer executable instructions stored on a non-transitory computer readable medium, an FPGA, an ASIC, or the like).

In one embodiment, the migration module 1912 is configured to migrate a storage client 116 (e.g., an application 116, a database system 116a) associated with a transaction log to a different host computing device 110. For example, a storage client 116 (e.g., an application 116, a database system 116a) executing on a different host computing device 110 than a host computing device 110 from which a transaction log was opened and/or initiated, a user, or the like may send a unique identifier for the storage client 116 and/or for a transaction log of the storage client 116 to the migration module 1912, from the different host computing device 110, with an identifier or address for the different host computing device 110, or the like.

The migration module 1912 may retrieve configuration information for the storage client 116 based on the received unique identifier, such as one or more locations where data for the storage client 116 is stored in the non-volatile storage device 102 and/or the different/second non-volatile storage device 121 (e.g., settings, transaction log data, computer executable program code of the storage client 116, or the like). The storage client 116, in certain embodiments, may begin executing on the different host computing device 110, based on configuration information saved for the storage client 116 from the original host computing device 110. In this manner, in certain embodiments, the migration module 1912 may allow different host computing devices 110 to operate in a failover configuration, replacing another host computing device 110 by executing a storage client 116 with a saved execution state, transaction log, or the like; may allow for a simple upgrade and migration to a new host computing device 110; and/or another migration over the network 115.

In one embodiment, at least a portion of the migration module 1912 may be part of, integrated with, and/or in communication with the storage management layer 130, a device driver for the non-volatile storage device 102 and/or for the non-volatile storage device 121 or other controller executing on the host computing device 110, a filter driver, an operating system, a file system, or the like executing on the host computing device 110. For example, a user may install at least a portion of the migration module 1912 on the new or different host computing device 110, to assist in migrating the storage client 116. In a further embodiment, the migration module 1912 may be at least partially disposed on the non-volatile storage device 102, as part of the non-volatile storage medium controller 104, the ACM 1011, or the like (e.g., hardware logic, firmware, microcode, computer executable instructions stored on a non-transitory computer readable medium, an FPGA, an ASIC, or the like), in order to retrieve the configuration information for the storage client 116 based on the received unique identifier, or the like.

Figure 6:
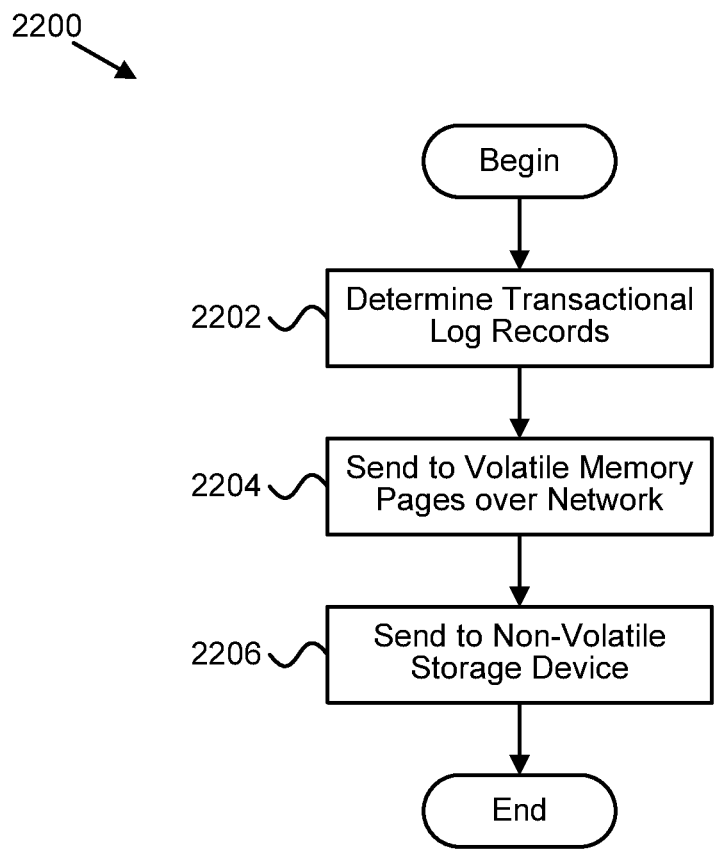
FIG. 6 is a schematic flow chart diagram illustrating one embodiment of a method for transaction log acceleration.

FIG. 6 depicts one embodiment of a method 2200 for transaction log acceleration. The method 2200 begins, and the log module 1902 determines 2202 one or more transactional log records, such as database log records or the like, for a storage client 116 (e.g., a database system 116*a*) executing on a host computing device 110. The commit module 1904 sends 2204 the determined 2202 one or more transactional log records to one or more volatile memory pages 1013 over the network 115. In response to the one or more volatile memory pages 1013 storing the one or more transactional log records, the storage module 1906 sends 2206 the determined 2202 one or more transactional log records to a non-volatile storage device 121 over the network 115 and the method 2200 ends.

Figure 7:
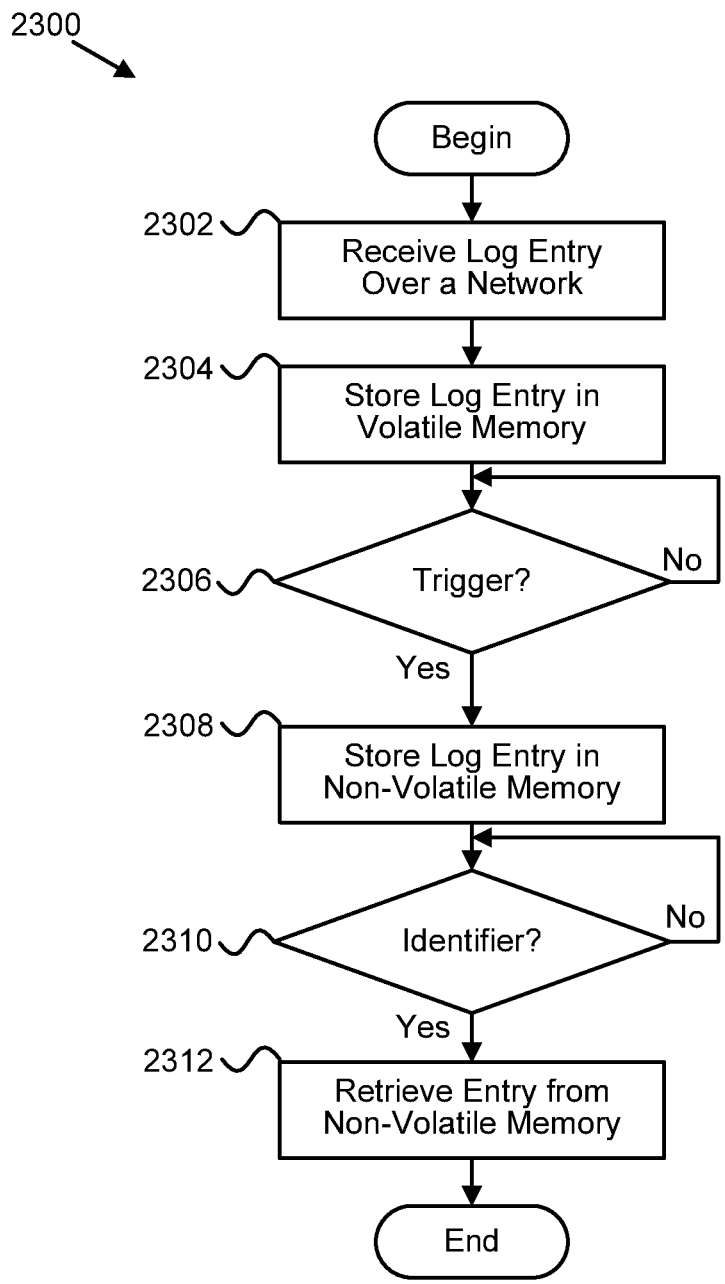
FIG. 7 is a schematic flow chart diagram illustrating a further embodiment of a method for transaction log acceleration.

FIG. 7 depicts another embodiment of a method 2300 for transaction log acceleration. The method 2300 begins, and the storage controller 104 receives 2302 a transaction log entry over the network 115. The storage controller 104 stores 2304 the received 2302 transaction log entry in volatile memory 1013 of the non-volatile storage device 102. In response to detecting 2306 a trigger, such as a power level failing to satisfy a threshold or another restart event, the storage controller 104 stores 2308 the received 2302 transaction log entry in the non-volatile memory medium 122 of the non-volatile storage device 102.

After the detected 2306 trigger (e.g., during a recovery stage for a restart event or the like), the storage controller 104 determines 2310 whether an identifier for the storage client 116 has been received. If the storage controller 104 determines 2310 that a valid identifier for the storage client 116 has been received, the storage controller 104 retrieves 2312 the transaction log entry from the non-volatile memory medium 122 of the non-volatile storage device 102 and the method 2300 ends. In certain embodiments, the storage controller 104 may provide the retrieved 2312 transaction log entry to the storage client 116, to the recovery module 1908, or the like for storage in a different non-volatile storage device 121.

Figure 8:
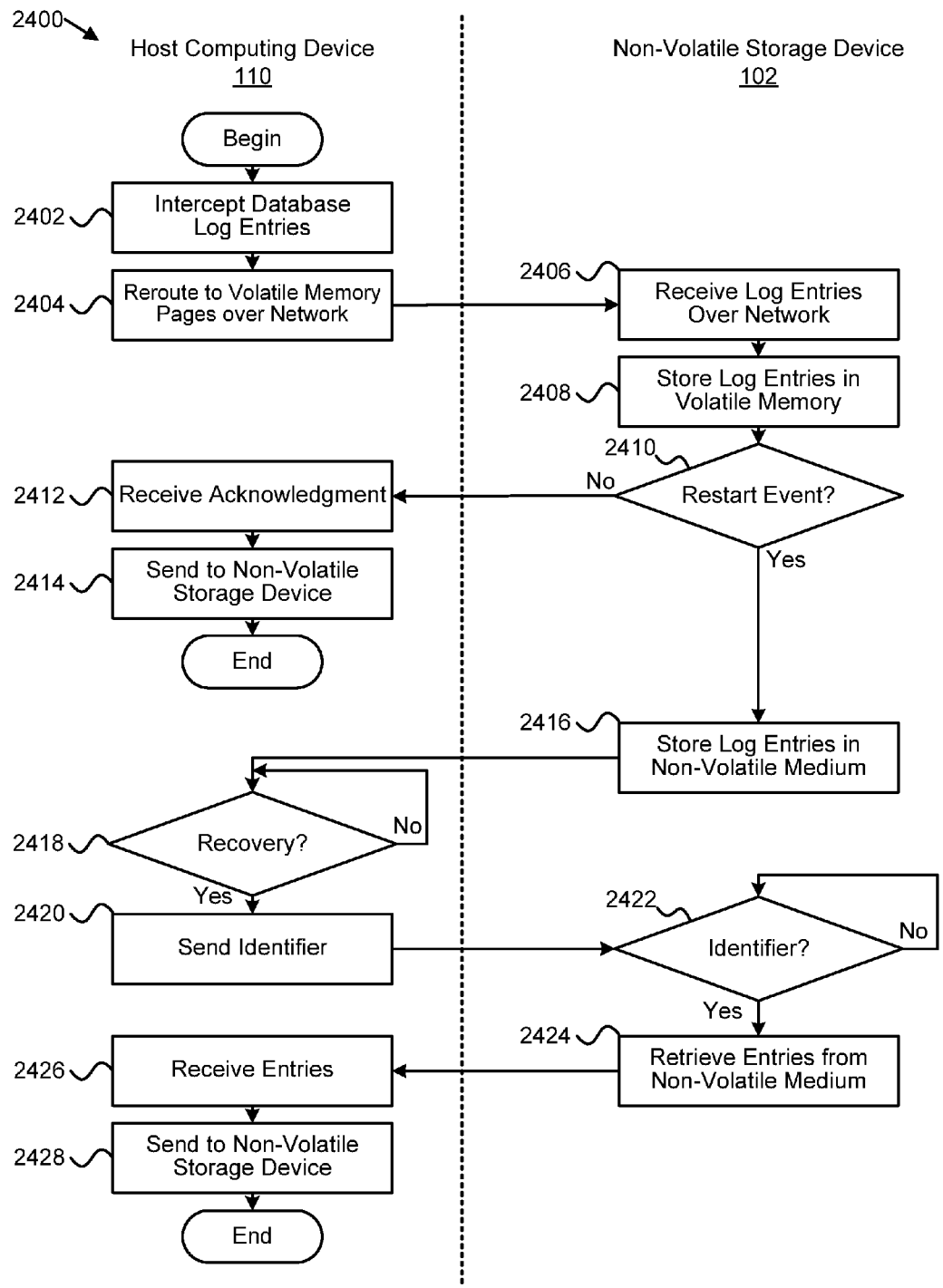
FIG. 8 is a schematic flow chart diagram illustrating another embodiment of a method for transaction log acceleration.

FIG. 8 depicts another embodiment of a method 2400 for transaction log acceleration. The method 2400 begins, and the log module 1902 executing on the host computing device 110 intercepts 2402 one or more database log entries from a database system 116*a* executing on the host computing device 110 (e.g., a controller executing on the host computing device 110, comprising the log module 1902, may filter 2402 the one or more database log entries sent to a different location). The commit module 1904 executing on the host computing device 110 reroutes 2404 the intercepted 2402 one or more database log entries over the network 115 to the volatile memory 1013 of the non-volatile storage device 102 (e.g., a controller executing on the host computing device 110, comprising the commit module 1904, may reroute 2404 the one or more database log entries sent to the volatile memory 1013).

The volatile memory 1013 of the non-volatile storage device 102 receives 2406 the one or more intercepted 2402 database log entries of the database system 116*a* over the network 115 and stores 2408 the one or more received 2406 database log entries. If the controller 104 (e.g., the ACM 1011, the commit agent 1020) does not detect 2410 a restart event or other trigger, the controller 104 acknowledges 2408 storage of the one or more database log entries and the storage module 1906 receives 2412 the acknowledgment on the host computing device 110 (e.g., a controller executing on the host computing device 110, comprising the storage module 1906, may receive 2412 the acknowledgment). The storage module 1906 sends 2414 the one or more database log entries from the host computing device 110 (e.g., from the database system 116*a*) to the different non-volatile storage device 121 over the network 115 (e.g., a controller executing on the host computing device 110, comprising the storage module 1906, may send 2414 the one or more database log entries to the second non-volatile storage device 102 in response to the database log entries being received 2406 by the volatile memory buffer 1013) and the method 2400 ends. In a further embodiment, the database system 116*a* sends 2414 the database log entries to the second non-volatile storage device 121 (e.g., a different location), instead of the storage module 1906 sending 2414 the one or more database log entries.

If the controller 104 (e.g., the ACM 1011, the commit agent 1020) detects 2410 a restart event or other trigger, the controller 104 (e.g., the ACM 1011, the commit agent 1020) stores 2416 the one or more database log entries in the non-volatile storage medium 122. The secondary power source 124 for the non-volatile storage device 102 may provide a power hold-up time to the non-volatile storage device 102 after the trigger 2410, during which the volatile memory 1013 may store 2408 the one or more database log entries in the non-volatile storage medium 122. Once the recovery module 1908 determines 2418 that the detected 2410 restart event is complete (e.g., after the restart event or other trigger), the recovery module 1908 sends 2420 an identifier for the database system 116*a* to the controller 104 of the non-volatile storage device 102. The controller 104 determines 2422 that the identifier for the database system 116*a* is received, and the controller 104 retrieves 2424 the one or more database log entries from the non-volatile storage medium 122.

The recovery module 1908 receives 2426 the one or more retrieved 2424 database log entries. The storage module 1906 sends 2428 the one or more received 2426 database log entries from the host computing device 110 (e.g., from the database system 116*a*) to the different non-volatile storage device 121 over the network 115 and the method 2400 ends. The non-volatile storage device 102 (e.g., the controller 104) may clear (e.g., delete, remove, invalidate, trim) the one or more database log entries from the non-volatile storage device 102 (e.g., from the volatile memory 1013 and/or the non-volatile memory medium 122) in response to the second non-volatile storage device 121 receiving and/or storing the one or more database log entries.

A means for storing journal transactions in volatile memory 1013 of a storage device 102, in various embodiments, may include an acceleration module 150, a storage management layer 130, a non-volatile storage device interface 139, a non-volatile storage medium controller 104, a commit module 1904, an ACM 1011, a commit agent 1020, a storage client 116, a database system 116*a*, a host computing device 110, a bus 127, a network 115, a device driver, a controller (e.g., a device driver, an SML 130, or the like) executing on a host computing device 110, a processor 111, other logic hardware, and/or other executable code stored on a computer readable storage medium. Other embodiments may include similar or equivalent means for storing journal transactions in volatile memory 1013 of a storage device 102.

A means for storing journal transactions in a second/different storage device 121 in response to confirming storage of the journal transactions in volatile memory 1013, in various embodiments, may include an acceleration module 150, a storage management layer 130, a non-volatile storage device interface 139, a storage module 1906, a storage client 116, a database system 116*a*, a host computing device 110, a network 115, a device driver, a controller (e.g., a device driver, an SML 130, or the like) executing on a host computing device 110, a processor 111, other logic hardware, and/or other executable code stored on a computer readable storage medium. Other embodiments may include similar or equivalent means for storing journal transactions in a second/different storage device 121.

A means for intercepting journal transactions addressed for a second/different storage device 121, in various embodiments, may include an acceleration module 150, a storage management layer 130, a non-volatile storage device interface 139, a log module 1902, a storage client 116, a database system 116*a*, a host computing device 110, a device driver, a filter driver, a controller (e.g., a device driver, an SML 130, or the like) executing on a host computing device 110, a processor 111, other logic hardware, and/or other executable code stored on a computer readable storage medium. Other embodiments may include similar or equivalent means for intercepting journal transactions addressed for a second/different storage device 121.

A means for accessing one or more journal transactions from a first storage device 102 for storing in a second/different storage device 121 in response to a power interruption event, in various embodiments, may include an acceleration module 150, a storage management layer 130, a non-volatile storage device interface 139, a non-volatile storage medium controller 104, a recovery module 1908, an identifier module 1910, an ACM 1011, a commit agent 1020, a host computing device 110, a bus 127, a network 115, a device driver, a controller (e.g., a device driver, an SML 130, or the like) executing on a host computing device 110, a processor 111, other logic hardware, and/or other executable code stored on a computer readable storage medium. Other embodiments may include similar or equivalent means for accessing one or more journal transactions from a first storage device 102 for storing in a second/different storage device 121 in response to a power interruption event.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
a non-volatile storage device configured to be in communication with a storage client executing on a host computing device, wherein the non-volatile storage device comprises;
a non-volatile storage medium; and
a volatile memory buffer configured to:
receive transaction log entries of the storage client over the network,
store the transaction log entries in the non-volatile storage medium in response to a trigger,
retrieve one or more of the transaction log entries from the non-volatile storage medium in response to receiving an identifier from the storage client after the trigger,
facilitate sending the retrieved one or more of the transaction log entries to the storage client, and
facilitate sending the retrieved one or more of the transaction log entries from the storage client to a second non-volatile storage device over the network; and
a controller for the non-volatile storage device, the controller configured to:
execute on the host computing device,
filter the transaction log entries sent to a different location, and
re-route the transaction log entries to the volatile memory buffer.

2. The system of claim 1, wherein the controller is further configured to send the transaction log entries to the second non-volatile storage device in response to the transaction log entries being received by the volatile memory buffer.

3. The system of claim 1, wherein the storage client is configured to send the transaction log entries to the different location, the different location comprising the second non-volatile storage device.

4. The system of claim 1, wherein the non-volatile storage device is further configured to clear the transaction log entries from the non-volatile storage device in response to the second non-volatile storage device receiving the transaction log entries.

5. The system of claim 1, wherein:
the host computing device comprises no non-volatile storage; and
the transaction log entries are sent to the volatile memory buffer of the non-volatile storage device from volatile memory of the host computing device.

6. The system of claim 1, wherein:
the host computing device comprises local non-volatile storage; and
storing data in the volatile memory buffer of the non-volatile storage device over the network has a lower latency than storing data in the local non-volatile storage.

7. The system of claim 1, further comprising a secondary power source for the non-volatile storage device, wherein:
the secondary power source is configured to provide a power hold-up time to the non-volatile storage device after the trigger; and
the volatile memory buffer is further configured to store the transaction log entries in the non-volatile storage medium during the power hold-up time.

8. The system of claim 1, wherein the volatile memory buffer is further configured to:
receive different transaction log entries of multiple different storage clients over the network; and
associate the different transaction log entries in the volatile memory buffer and in the non-volatile storage medium with identifiers of the multiple different storage clients.

9. The system of claim 1, wherein the trigger comprises electrical power for the non-volatile storage device failing to satisfy a threshold.

10. An apparatus comprising:
a non-volatile storage device configured to be in communication, over a network, with a storage client executing on a host device, wherein the non-volatile storage device comprises:
a non-volatile storage medium; and
a volatile memory buffer configured to:
receive transaction log entries of the storage client over the network,
store the transaction log entries in the non-volatile storage medium in response to a trigger, retrieve one or more of the transaction log entries from the non-volatile storage medium in response to receiving an identifier from the storage client after the trigger, facilitate sending the retrieved one or more of the transaction log entries to the storage client, and facilitate sending the retrieved one or more of the transaction log entries from the storage client to a second non-volatile storage device over the network, wherein:

the host computing device comprises local non-volatile storage, and storing data in the volatile memory buffer of the non-volatile storage device over the network has a lower latency than storing data in the local non-volatile storage.

11. The apparatus of claim 10, wherein the non-volatile storage device is further configured to clear the transaction log entries from the non-volatile storage device in response to the second non-volatile storage device receiving the transaction log entries.

12. The apparatus of claim 10, further comprising a secondary power source for the non-volatile storage device, wherein:

the secondary power source is configured to provide a power hold-up time to the non-volatile storage device after the trigger; and the volatile memory buffer is further configured to store the transaction log entries in the non-volatile storage medium during the power hold-up time.

13. The apparatus of claim 10, wherein the volatile memory buffer is further configured to:

receive different transaction log entries of multiple different storage clients over the network; and associate the different transaction log entries in the volatile memory buffer and in the non-volatile storage medium with identifiers of the multiple different storage clients.

14. The apparatus of claim 10, wherein the trigger comprises electrical power for the non-volatile storage device failing to satisfy a threshold.

15. An apparatus comprising:

a non-volatile storage device configured to be in communication with a storage client over a network, wherein the non-volatile storage device comprises:

a non-volatile storage medium; and a volatile memory buffer configured to:

receive transaction log entries of the storage client over the network, store the transaction log entries in the non-volatile storage medium in response to a trigger, retrieve one or more of the transaction log entries from the non-volatile storage medium in response to receiving an identifier from the storage client after the trigger, facilitate sending the retrieved one or more of the transaction log entries to the storage client, and facilitate sending the retrieved one or more of the transaction log entries from the storage client to a second non-volatile storage device over the network; and a secondary power source for the non-volatile storage device, the secondary power source configured to provide a power hold-up time to the non-volatile storage device after the trigger, wherein the volatile memory buffer is further configured to store the transaction log entries in the non-volatile storage medium during the power hold-up time.

16. The apparatus of claim 15, wherein the non-volatile storage device is further configured to clear the transaction log entries from the non-volatile storage device in response to the second non-volatile storage device receiving the transaction log entries.

17. The apparatus of claim 15, wherein:

a host computing device configured to execute the storage client comprises no non-volatile storage; and the transaction log entries are sent to the volatile memory buffer of the non-volatile storage device from volatile memory of the host computing device.

18. The apparatus of claim 15, wherein:

a host computing device configured to execute the storage client comprises local non-volatile storage; and storing data in the volatile memory buffer of the non-volatile storage device over the network has a lower latency than storing data in the local non-volatile storage.

19. The apparatus of claim 15, wherein the volatile memory buffer is further configured to:

receive different transaction log entries of multiple different storage clients over the network; and associate the different transaction log entries in the volatile memory buffer and in the non-volatile storage medium with identifiers of the multiple different storage clients.

20. The apparatus of claim 15, wherein the trigger comprises electrical power for the non-volatile storage device failing to satisfy a threshold.

\* \* \* \* \*